(12) United States Patent
Ando

(10) Patent No.: US 6,678,715 B1
(45) Date of Patent: Jan. 13, 2004

(54) SYSTEMS AND APPARATUS FOR SWITCHING EXECUTION OF A PROCESS IN A DISTRIBUTED SYSTEM

(75) Inventor: Takanobu Ando, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/383,963

(22) Filed: Aug. 27, 1999

(30) Foreign Application Priority Data

Aug. 28, 1998 (JP) .......................................... 10-243614

(51) Int. Cl.⁷ ................................................ G06F 9/00
(52) U.S. Cl. ........................ 709/105; 709/101; 709/102; 709/104; 709/201; 709/205
(58) Field of Search ................................. 709/101, 102, 709/104, 105, 201, 205

(56) References Cited

U.S. PATENT DOCUMENTS

| | | | |
|---|---|---|---|
| 5,457,797 A | | 10/1995 | Butterworth et al. |
| 5,774,660 A | * | 6/1998 | Brendel et al. ............. 709/201 |
| 6,026,425 A | * | 2/2000 | Suguri et al. ............... 709/105 |
| 6,209,018 B1 | * | 3/2001 | Ben-Shachar et al. ...... 709/105 |
| 6,223,205 B1 | * | 4/2001 | Harchol-Balter et al. ... 709/105 |
| 6,314,447 B1 | * | 11/2001 | Lea et al. ................... 709/105 |
| 6,324,580 B1 | * | 11/2001 | Jindal et al. ................ 709/228 |
| 6,385,636 B1 | * | 5/2002 | Suzuki ........................ 709/105 |
| 6,405,241 B2 | * | 6/2002 | Gosling et al. ............. 709/203 |

* cited by examiner

*Primary Examiner*—Saleh Najjar
(74) *Attorney, Agent, or Firm*—Finnegan, Henderson, Farabow, Garrett & Dunner, L.L.P.

(57) ABSTRACT

In a distributed system where a client is connected to a server via a network, the client is provided with a basic part that issues a request for a process, and the server comprises a server component manager for executing the process requested by the basic part, an execution position decision portion that receives the request from the basic part and decides whether the server component should be executed on the client or the server, and a server component handover portion that obtains the server component from the server component manager and hands over the obtained server component to the client or the server according to the result of decision at the execution position decision portion. The execution position of the requested process is changed dynamically, thereby varying the system configuration flexibly.

16 Claims, 40 Drawing Sheets

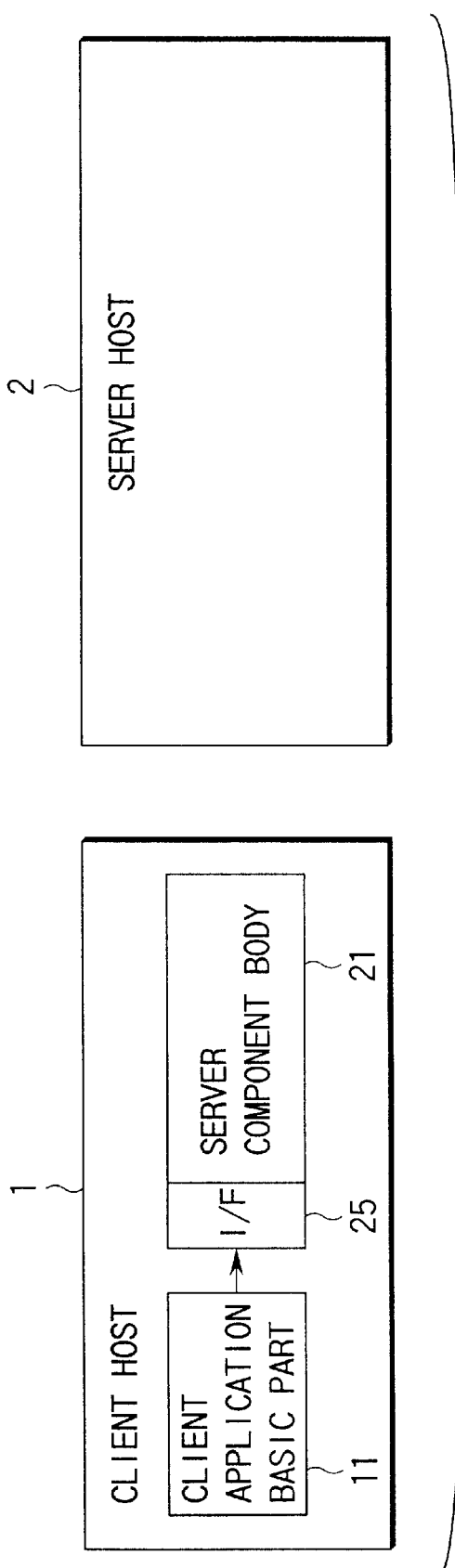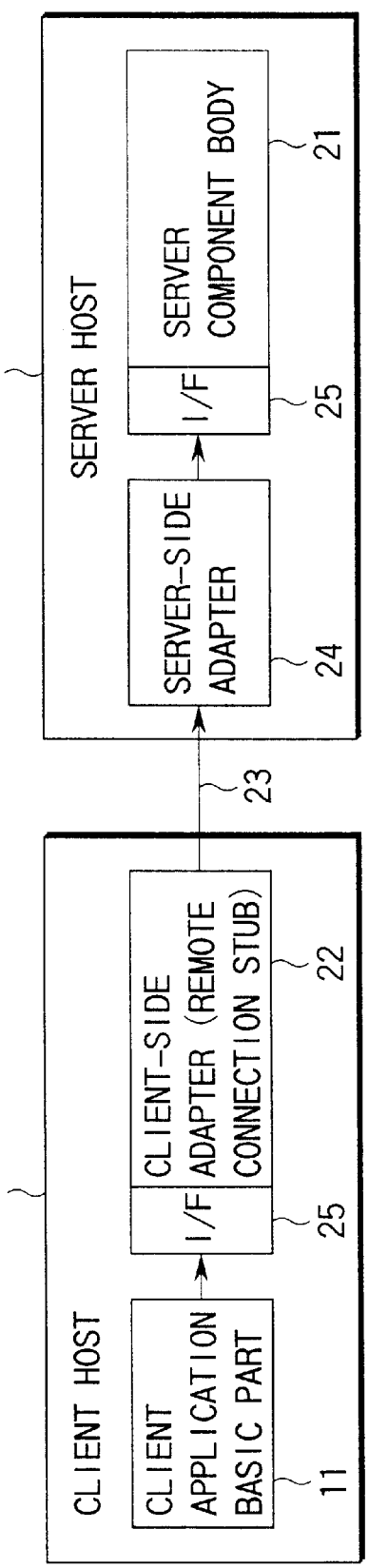
FIG. 5A
FIG. 5B

WHEN PROCESSING IS DONE ON SERVER SIDE

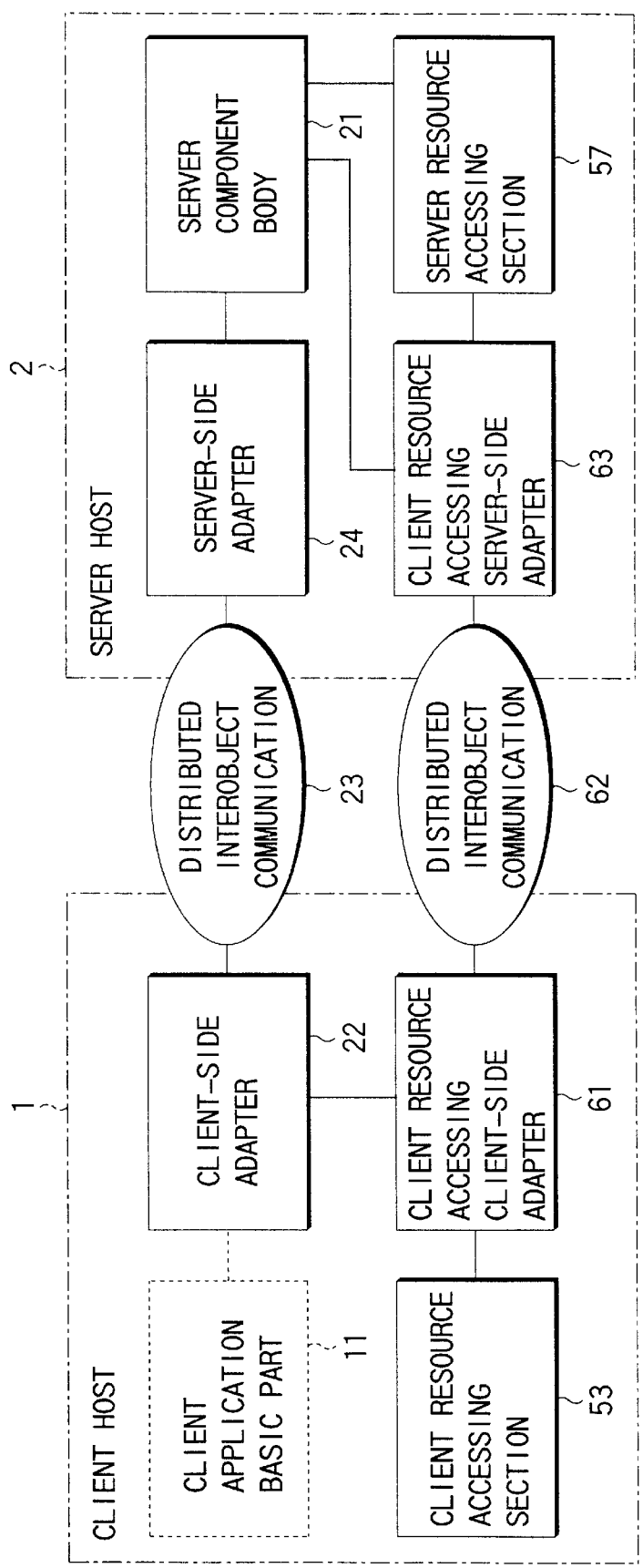
FIG. 20 WHEN PROCESSING IS DONE ON SERVER SIDE

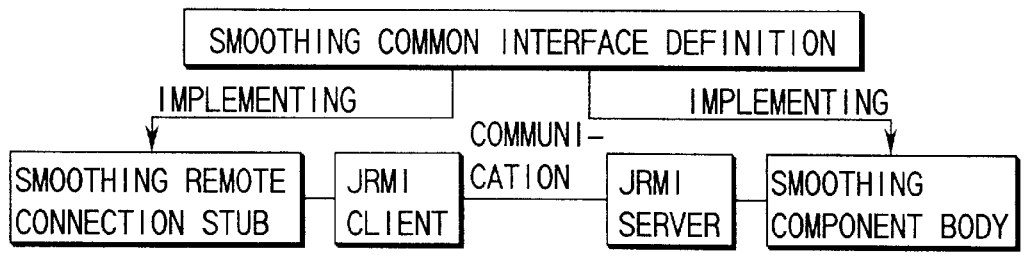
FIG. 21A
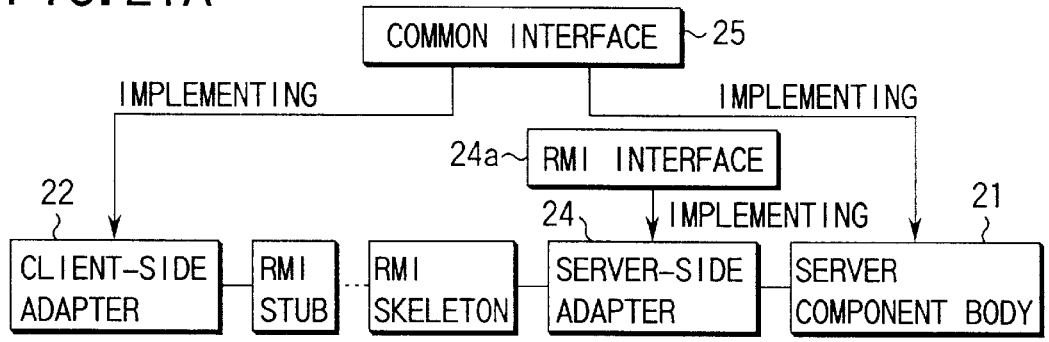
FIG. 21B  CONFIGURATION OF SERVER COMPONENT WHEN JAVA RMI IS USED
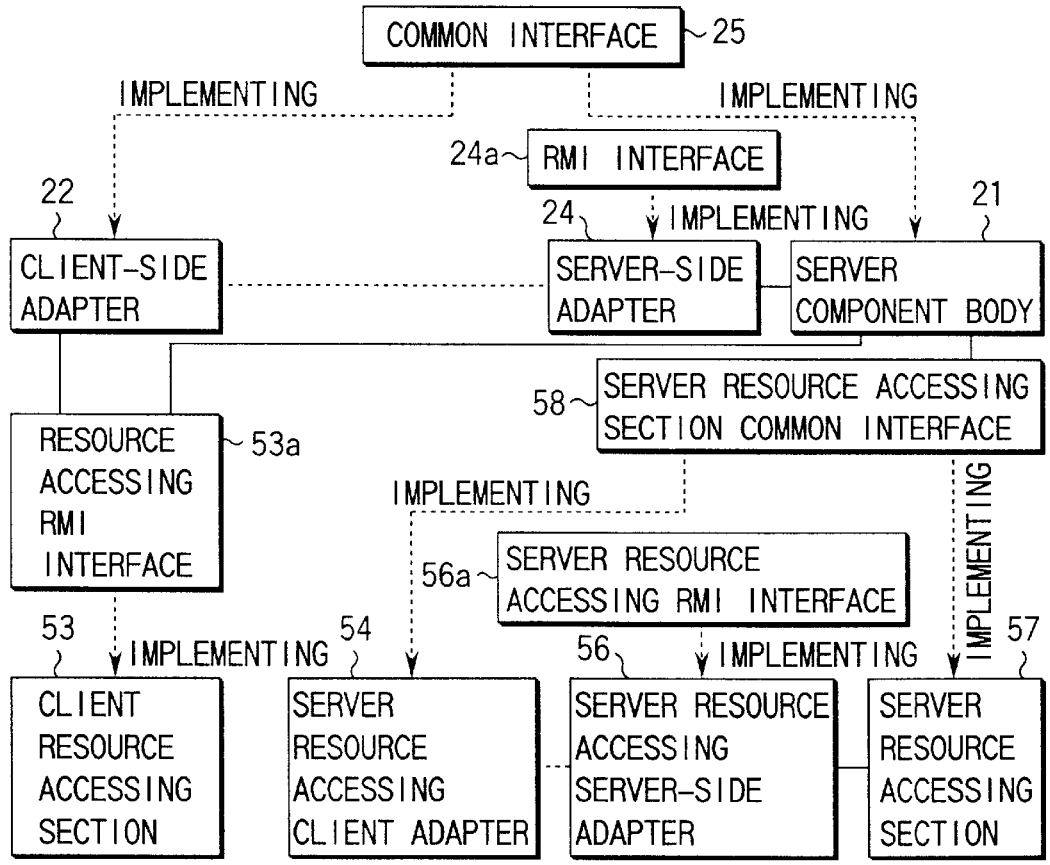
FIG. 21C  CONFIGURATION OF SERVER COMPONENT WHEN JAVA RMI IS USED

OVERALL FLOW OF AUTOMATIC CREATION

CREATION OF SKELETON FOR SERVER COMPONENT BODY

AUTOMATIC CREATION OF COMMON INTERFACE

AUTOMATIC CREATION OF SERVER-SIDE ADAPTER CLASS

EMBEDDING RELAY METHOD IN ADAPTER CLASS DEFINITION

FIG. 29  OVERALL FLOW OF AUTOMATIC CREATION

CREATION OF EACH FILES AT SERVER-SIDE
RESOURCE ACCESSING SECTION

FIG. 31 CREATION OF SKELETON FOR SERVER COMPONENT BODY

AUTOMATIC CREATION OF COMMON INTERFACE

AUTOMATIC CREATION OF SERVER-SIDE ADAPTER CLASS

CREATION OF RELAY METHOD DEFINITION

AUTOMATIC CREATION OF CLIENT-SIDE ADAPTER FILE

AUTOMATIC CREATION OF SERVER-SIDE
RESOURCE ACCESSING SECTION COMMON INTERFACE

SERVER COMPONENT INFORMATION

· COMPONENT NAME
· EXECUTION PLACE OF SERVER-SIDE
  RESOURCE ACCESSING SECTION
· PRESENCE OR ABSENCE OF CLIENT-SIDE
  RESOURCE ACCESSING SECTION

FIG. 40

| PURCHASER'S NAME | ITEMS PURCHASED | PRICE (YEN) |
|---|---|---|
| TARO | PENCIL | 200 |
| HANAKO | ERASER | 100 |
| TARO | DESK PAD | 300 |
| ⋮ | ⋮ | ⋮ |

FIG. 41

DATABASE ACCESSING APPLICATION

PURCHASER'S NAME [_____] ~502

AMOUNT OF MONEY SPENT FOR PURCHASE: [____] ~504 YEN

[RETRIEVAL] ~506      508~ [END]

FIG. 42

SYSTEMS AND APPARATUS FOR SWITCHING EXECUTION OF A PROCESS IN A DISTRIBUTED SYSTEM

BACKGROUND OF THE INVENTION

This invention relates to a distributed system composed of computers connected to each other, and more particularly to the determination of the execution position of a requested process.

This application is based on Japanese Patent Application No. 10-243614, filed Aug. 28, 1998, the entire content of which is incorporated herein by reference.

With the recent advances in computer and communication technology, rather than using computers in a stand-alone manner, more and more users have been constructing various types of network systems, such as LAN, WAN, or the Internet, and sharing resources in the network. A network system where a computer (server host) carries out a specific process at the request of another computer (client host) is known as a client-server system or a distributed system (hereinafter, referred to as a distributed system). With such a distributed system, the process requested by the client host can be executed by a server host other than the client host, depending on the state of the network system or the contents of the process at that time.

Conventional distributed systems are broadly classified into three types as follows.

A first type of distributed system is a vertical-type distributed system, represented by a mainframe. In the vertical-type distributed system, a client host requests a server host to carry out a process, the server host executes the process, and the client host receives the result of the process from the server.

The vertical-type distributed system has the following problems.

(1) When many client hosts are connected to a server host, the overload on the server host decreases the throughput of the entire process.

(2) Because communication is effected through the network each time a process is requested, the network traffic increases.

A second type of distributed system is a horizontal-type distributed system. In the horizontal-type distributed system, the necessary data is requested from the database management system (DMBS) existing in the server host and a client host processes the information obtained from the DMBS. By doing this, the problems of the vertical-type distributed system in items (1) and (2) can be overcome to some degree.

In this system, however, the following problems arise:

(3) The client host requires some degree of processing capability and a certain numbers of resources.

(4) The system has a low flexibility in dealing with the modification of the database management system, because the client host is closely related to the database management system.

(5) Application program management has to be carried out for each client host.

A third type of distributed system is a distributed network system composed of network computers (NCs) without a secondary memory (such as a HDD) or mobile-environment-oriented mobile network computers (MNCs). In the distributed network system, ordinary personal computers (PCs) and workstations (WSs) can serve as terminals. With the distributed network system, when a client requests a process from a server, the server component for executing the process is sent to the client host. The process is executed on the client host. Today's Java applets correspond to the component.

This system overcomes the problem of the horizontal-type distributed system in item (5). The problem in item (3), however, becomes more serious. If the client host were a powerful personal computer or workstation, the problem in item (3) would be overcome. The reason is that network computers and mobile network computers have lower processing capabilities. This leads to the following problem:

(6) When a client has a low load, processing is done on the server host rather than on the client host. This improves the throughput of the entire processing.

Besides these problems, the systems of the first to third types have the following problems in common:

(7) Since the software structure (the execution position of a process component) has been determined statically, the systems lack flexibility in a dynamically changing network environment.

(8) Since the systems are difficult to design (in deciding what process which host should execute) and lack flexibility, a problem can arise in making a change later or adding a new specification.

In a load distributed system or a mobile-environment-oriented agent system in a distributed environment, there is a conventional example of dynamically moving and arranging process components on a network to improve the flexibility of the system. The system of this type, however, has the following problem:

(9) In execution on the client host, the components have to communicate with each other because client components differ from server components in type. The overhead in the communication becomes a problem.

In such conventional distributed systems, the execution position of a component that provides a specific process has been determined statically by the system developer. Therefore, a certain component is always executed on the client host and another component is always executed on the server host.

In the prior art, as the system has advanced from the first type, second type, and to third type, the number of problems seems to have decreased. This is not necessarily true. Specifically, in the network system, the computer environment changes dynamically. The dynamic change of the computer environment combines with the fixation of the component execution position to make it difficult to improve the processing efficiency.

Therefore, The distributed system of any one of the first to third type does not necessarily perform the process in an ideal state because of the dynamically changing environment and cannot achieve the performance it essentially has. For example, a large number of clients are connected to a server, which makes the load of the server heavy. Even if the vertical-type system is changed to a horizontal-type system or to a distributed network system, distribution goes too far, which makes the load on the server so low that the execution of a certain process on the server host may improve the throughput of the entire process.

To improve the throughput of the process while coping with such dynamic changes in the computer environment, it is preferable to form a system capable of dynamically changing the execution position of a component for carrying out the process.

In developing various types of network systems taking into account the scalablility of the system, it is desirable that the execution position should be changed dynamically, rather than being determined statically.

To determine the execution position of the process dynamically, it is necessary to implement programs including processes (in executable form) in all the relevant computers beforehand. This makes it possible to select the execution position of the process from the computers and cause the selected computer to execute the process. Such a distributed system can be constructed, taking into account fault tolerance or load distribution.

It is hard work to implement programs in all the computers and manage them. Thus, this approach is not feasible.

There is what is called a mobile agent for changing the execution position of a process after the execution of the process. This is intended for the specified computers on a distributed system. The mobile agent carries out processes while going around the specified computers. Specifically, after having carried out a process on a computer, the mobile agent moves to another computer and carries out a similar process. From this time on, it repeats a similar process on each of the remaining computers specified. Such a distributed system is used mainly for the purpose of acquiring information or monitoring the system.

In the mobile agent, however, the programs related to the process are put together into a unit and all the unit is moved (delivered) to the relevant computer, which executes the unit. Therefore, the mobile agent itself cannot have such a structure as makes use of resources in a specific computer.

Furthermore, there has been a system in which a server host that offers processing programs delivers a processing program to the client host that has requested a process, as with Java applets explained in the third type of system, and the client host executes the program. This enables the processing programs to be implemented in only one place, which facilitates not only the maintenance and management of the processing programs but also implementing work.

In this system, too, the execution position of the process has been determined statically and the configuration of the distributed system (which computer should execute the process in the distributed system) cannot be changed flexibly. Therefore, the system cannot be used for load distribution.

In the above conventional examples, the place once executed basically cannot be changed in the middle of the process. In the case of a mobile agent, it cuts off the connection with the client that has requested the process until a series of movements and processes has been completed. Namely, because the mobile agent is not connected constantly, it is difficult for the client host to give a certain instruction during the process.

BRIEF SUMMARY OF THE INVENTION

It is, accordingly, an object of the present invention to overcome the above-described problems by providing a distributed system capable of changing the system configuration flexibly by dynamically switching the execution position of a process requested by a client between the client host and the server host.

To solve the problems and achieve the object, the present invention is as follows.

(1) A distributed system of the present invention comprises a client and a server, wherein the client includes means for requesting a process from the server, and the server includes means for receiving the request for a process from the client and decides whether the process should be executed on the client or on the server.

With this configuration, the execution position of the process can be switched, which increases the flexibility of the system.

(2) A distributed system of the present invention comprises a client and a server, wherein the client includes an application basic part that issues a request for a process, and the server includes management means that manages a server component for executing the process requested by the application basic part, execution position decision means that receives the request from the application basic part and decides whether a server component for executing the process should be executed on the client or the server, and server component handover means that obtains the server component for executing the process requested by the application basic part from the management means and hands over the obtained server component to the client or the server according to the result of the decision at the execution position decision means.

With this configuration, too, the execution position of the process can be changed dynamically, which enables the system configuration to be varied flexibly.

(3) The distributed system in item (2) further comprises network monitor means that acquires at least one of load information about the server and the client, information on the processing capability of the server and the client, the data transfer speed of a network connecting the server and the client, size information about the server component, and information on the amount of calculation at the server component, and offers the acquired information to the execution position decision means, wherein the execution position decision means determines the execution position of the server component on the basis of the information offered by the network monitor means.

With this configuration, at the client's request for a process, the execution position of the server component can be switched so as to obtain the result of processing faster, which improves the throughput.

(4) The distributed system in item (2) is characterized in that the server includes access control monitoring means that judges whether or not to accept the request for a process issued by the application basic part, on the basis of user information about the client or identification information in the application basic part, and the execution position decision means decides whether or not the server component should be executed, on the basis of the result of judgment at the access control monitoring means.

With this configuration, access to the server component can be controlled on the basis of user information about the client and client host information.

(5) The distributed system in item (2) is characterized in that the server component includes a server component body in which the requested process has been implemented, a client-side adapter that communicates with the server, a server-side adapter that communicates with the client, and a common interface that defines an interface between the server component body and the client-side adapter.

Since this configuration requires only one server component body, the server component developer has only to implement the same program once. Furthermore, because the common interface is implemented in both of the server component body and client-side adapter, the client can access both of them in a similar manner. When the server component body is executed on the client-host side, no adapter for communication between the client host application basic part and the server component body is used, which leads to no overhead in requesting a process.

(6) The distributed system in item (5) is characterized in that the server component further includes a client resource accessing section that accesses a client resource, a server resource accessing section that accesses a server resource, and a server resource accessing client-side adapter and a server resource accessing server-side adapter that are for communicating with the server resource accessing section when the server component body is executed on the client host.

With this configuration, the process body is movable. In addition, such a movable process component as accesses a resource on the client host or a resource on the server host can be developed.

(7) The distributed system in item (5) is characterized in that the server component further includes a client resource accessing section that accesses a client resource, a server resource accessing section that accesses a server resource, and a server resource accessing client-side adapter and a server resource accessing server-side adapter that are for communicating with the server resource accessing section when the server component body is executed on the client host, and a client resource accessing client-side adapter and a client resource accessing server-side adapter that are for communicating with the client resource accessing section when the server component body is executed on the server host.

With this configuration, the process body is movable. In addition, such a movable process component as accesses a resource on the client host or a resource on the server host can be developed. Moreover, processes can be concentrated on the server component body, which facilitates the development of server components.

(8) A server component creating device of the present invention creates a server component used in a distributed system including a client having an application basic part that issues a request for a process, and a server including management means that manages a server component for executing the process requested by the application basic part, execution position decision means that receives the request from the application basic part and decides whether a server component for executing the process should be executed on the client or the server, and server component handover means that obtains the server component for executing the process requested by the application basic part and hands over the obtained server component to the client or the server according to the result of the decision at the execution position decision means. The server component creating device comprises template offering means that offers templates for the server component, information offering means that offers information on the server component, and program creating means that creates a server component by combining the templates or applying the information to the templates.

(9) A distributed system of the present invention comprises a main server which determines an arbitrary computer before execution as the execution position of a process requested by a client, obtains a server component for executing the process from management means for managing a server component for executing the process, hands over the acquire server component to the determined computer, receives the result of processing from the determined computer, and hands over the result to the main server.

(10) The distributed system in item (9) is characterized in that the main server includes means that determines the execution position temporarily and changes the execution position of the server component being executed on the determined computer to another computer.

(11) A computer-readable recording medium of the present invention records a program for controlling a distributed system composed of a client and a server. The program comprises a management program code that manages a server component for executing the process requested by the application basic part of the client, an execution position decision program code that receives the request from the application basic part and decides whether the server component should be executed on the client or the server, and a server component handover program code that obtains the server component from the management means and hands over the obtained server component to the client or the server according to the result of the decision at the execution position decision means.

(12) A computer-readable recording medium of the present invention records a program for controlling a distributed system composed of a client and a server and capable of dynamically changing the decision whether the process requested by the application basic part on the client should be executed on the client or the server. The program comprises a server component program code that enables the process requested by the application basic part on the client to be executed on both of the client and the server, and a communicating program code that is for securing communication with the application basic part when the server component means is executed on the server.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A shows a structure in a case where the server component body is executed on the client host;

FIG. 5B shows a structure in a case where the server component body is executed on the server host;

FIG. 20 shows the configuration of the server component in a case where the server component body is run on the server host;

FIGS. 21A, 21B, and 21C show cases where server components have been developed using a specific programming language;

FIG. 40 shows an example of server component information;

FIG. 41 shows an example of a database to be accessed by a database application program;

FIG. 42 shows an example of GUI for the client host of the database application program;

DETAILED DESCRIPTION OF THE INVENTION

Hereinafter, referring to the accompanying drawings, embodiments of a distributed system according to the present invention will be explained.

First Embodiment

Figure 1:
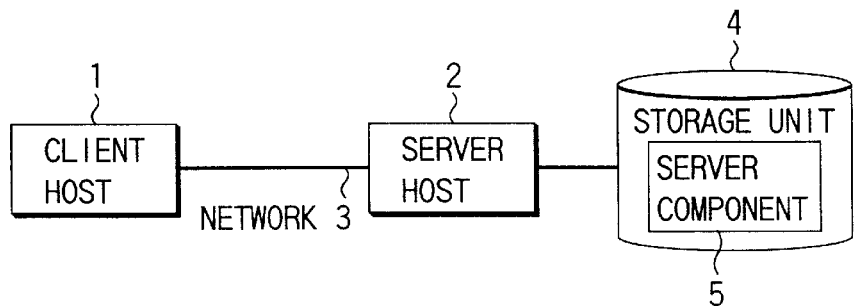
FIG. 1 is a block diagram showing an example of the hardware configuration of a distributed system according to a first embodiment of the present invention.

FIG. 1 is a block diagram showing an example of the hardware configuration of a distributed system according to a first embodiment of the present invention.

The distributed system is composed of a client host 1 and a the server host 2 connected to each other via a network 3. The client host 1 is a host machine in which a client application program exists and which issues a request for a process. The server host 2 is a host machine that receives the request from the client and executes the process. The number of client hosts 1 and server hosts 2 is not limited one and may be more than one. When more than one host machine exists, all the host machines except for the client host may act as server hosts. A personal computer, a workstation, a network computer (NC), or a mobile network computer (MNC) is used as the client host 1. A personal computer, a workstation, or a large-scale computer (mainframe) is used as the server host 2.

A high-speed LAN, a low-speed public communication network, or a wireless LAN is used as the network 3. Therefore, the network system is composed of LANs, WANs, VPNs (virtual private networks), or the Internet. In the system, the client host 1 need not be constantly connected to the server host 2.

The server host 2 is connected to a storage unit 4 composed of a hard disk (HDD). In the storage unit 4, a server component 5 made up of a large number of processing programs is stored, which provides a kind of database. The database is also called a component repository. The storage unit 4 may be connected directly to the server host 2 via SCSI as shown in FIG. 1. It may be connected to the server host 2 via another host provided with a storage unit management server. Moreover, the storage unit 4 may be connected to the server host 2 via the network 3.

The server component 5, which will be explained in detail later, is in short a process or a group of processes that execute the process requested by the client host 1. The main object of the first embodiment is to automatically decide whether the requested process part in the server component 5 should be executed on the server host or the client host and to create a state in which the process can be executed actually according to the decision.

Next, the system logical configuration (system software resource) in the distributed system will be explained.

Figure 2:
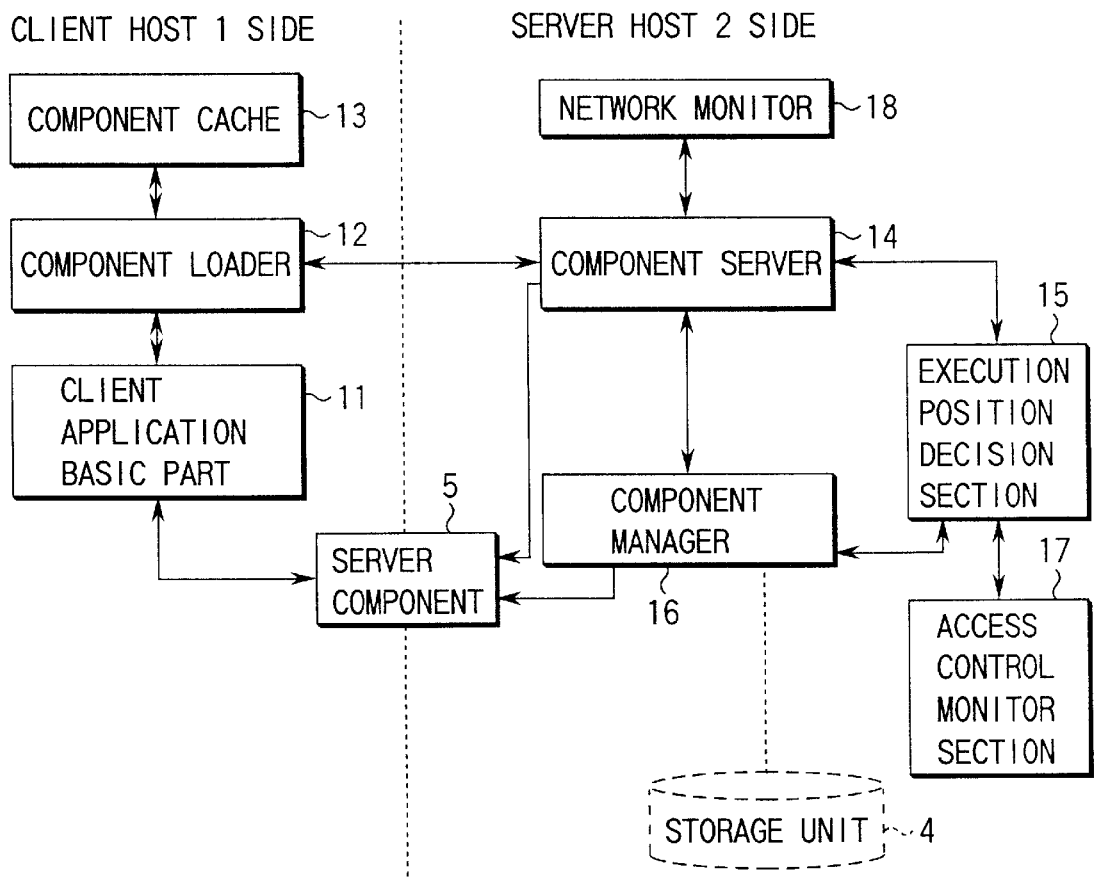
FIG. 2 shows the software logical configuration of the distributed system according to the first embodiment.

FIG. 2 shows the software logical configuration of the distributed system in the first embodiment.

In FIG. 2, the left-hand side of the central broken line represents the client host 1 and the right-hand side indicates the server host 2. Because the server component 5 can be executed on both of the client host 1 and the server host 2, it is placed on the broken line as shown in FIG. 2.

The client host 1 includes a client application basic part 11, a component loader 12, a component cache 13, and a server component 5 set to be executed on the client host 1.

On the other hand, the server host 2 includes a component server 14, an execution position decision section 15, a component manger 16, an access control monitoring section 17, a network monitor 18, and a server component 5 set to be executed on the server host 2. The network monitor 18 may be provided in another host on the network system. In that case, the server host 2 acquires the necessary information from the network monitor 18 via the network 3. The storage unit 4 is connected to the component manager 16.

The client application basic part 11 requests the component server 14 via the component loader 12 for the server component 5. The component server 14 decides whether the requested server component 5 should be executed on the server host 2 or the client host 1.

Before explaining each section in detail, the process the client host 1 requests and how the server component 5 is designed to realize the process will be explained.

The client host 1 realizes various processes according to the user's request. In many cases, an application program is composed of not a single process but more than one process. Therefore, the programs can be divided into the most basic part and the other processing part.

Figure 3A:
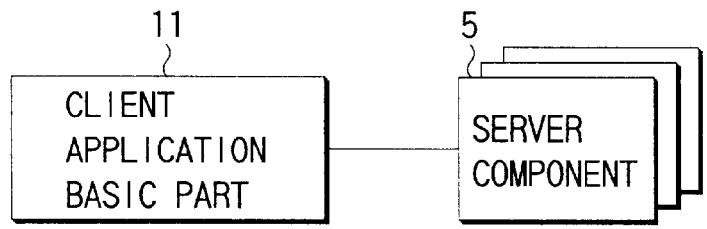
FIGS. 3A and 3B show examples of the structure of an application program in the first embodiment.
Figure 3B:
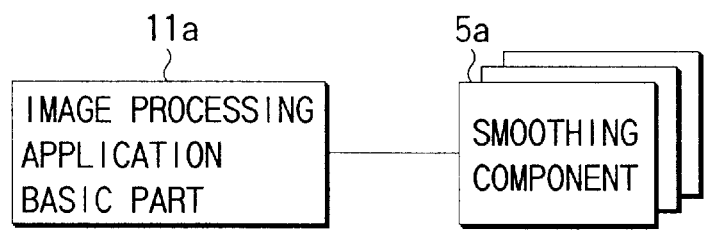

FIGS. 3A and 3B show examples of application programs in the first embodiment.

In the system of the first embodiment, the application program is divided into the client application basic part 11 and the server component 5 as shown in FIG. 3A. More than one server component 5 may be used.

Here, the client application basic part 11 is the most basic part of the application program. It starts up the application program, has the minimum function, issues a request for the server component 5, and displays the results of the processes using the server component 5. As shown in FIG. 2, the basic part 11 is placed on the client host 1. On the other hand, the server component 5 is the substantial processing part of the application program. The place in which it is placed is variable.

FIG. 3B shows a configuration in a case where an application program is an image processing software program. In this example, the client application basic part 11 is an image processing application basic part 11a and a smoothing component 5a is provided as the server component 5.

To avoid developing both a process running on the client host and a process running on the server host, the first embodiment is designed to enable the server component developer to implement similar processing logic only once (that is, prevent similar processing logic from being distributed in more than one place). To allow the client to execute a process, regardless of the execution position of the server component, the interface (a method of accessing the server component, more specifically, the method name, the type and the number of arguments, and the type of returned value, known as signature) of the server component viewed from the client host is made equal between the case where the server component runs on the server host and the case where it runs on the client host. Furthermore, when the process is executed on the server host, it is necessary to make communications between distributed objects using suitable communication means between the server component and the client. Additionally, when GUI is displayed (it basically always appears on the client host) or when the database management system on the server host is accessed, such a server component as accesses a unique host resource can be considered. Moreover, asynchronous communication with an application program on the client host can be considered.

To realize such requirements, a mobile server component of the present invention is divided into elements.

Figure 4:
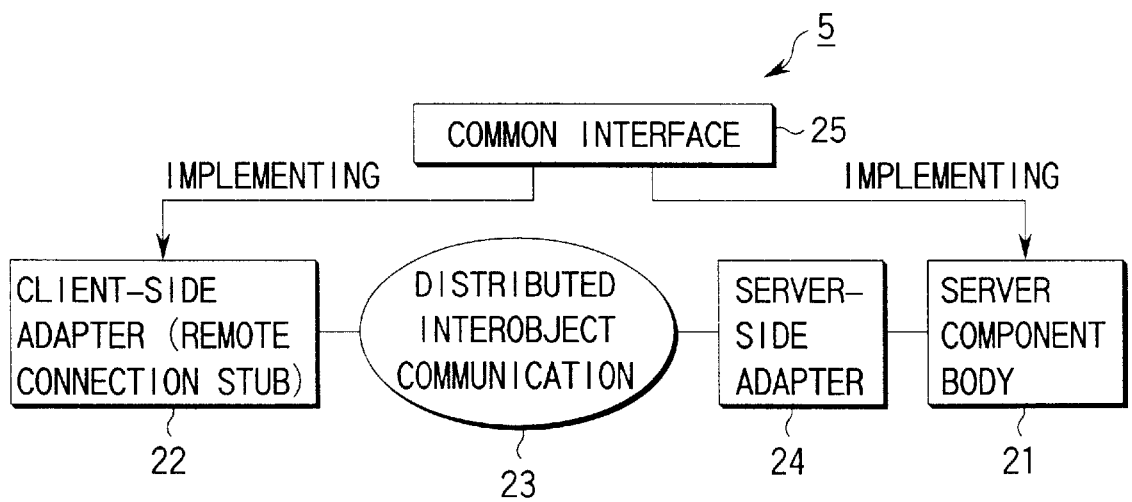
FIG. 4 shows an example of the structure of the server component in the first embodiment.

FIG. 4 shows an example of the configuration of the server component 5 in the first embodiment.

As show in FIG. 4, the server component 5 includes a server component body 21, a client-side adapter (remote connection stub) 22, and a server-side adapter 24. The client-side adapter 22 and server-side adapter 24 is connected to each other by distributed interobject communication 23. A common interface 25 is implemented in the server component body 21 and client-side adapter 22. The server-side adapter 24 may be provided with an interface. In the storage unit 4 in the server host 2, files corresponding to the individual parts excluding the distributed interobject communication 23 have been stored as the server component 5.

The server component body 21 is a part that executes the process requested by the client application basic part 11. It is the substantial processing part of an application. Namely, the process supplied by the server component 5 is implemented in the server component body 21. When the process is executed on the client host, the body 21 is sent to the client host. After having been made executable, the body 21 accepts the process from the client host. In this case, because the component body 21 is called directly from the client host, there is no overhead in passing the adapter 22. In contrast, when the process is executed on the server host, the body 21 and the server-side adapter 24 connected to the body are made executable on the server host. The client-side adapter 22 is sent to the client host 1. The client-side adapter 22 is made executable on the client host, connects with the server-side adapter 24, and prepares for communication. The client host 1 causes the component body 21 to be executed via the client-side adapter 22 and server-side adapter 24.

Namely, both of the adapters 22, 24 are parts that just relay the call of the process using the distributed interobject communication. Therefore, only one server component body 21 is needed. This avoids developing both the process running on the client host and the process running on the server host redundantly.

In the definition of the common interface 25, an accessing method (method (function) name, the type and number of arguments, and returned values) for causing the server component to execute a process is defined. The client-side adapter 22 (remote connection stub) is a stub for making a remote connection with the server component body 21. The common interface 25 never fails to be implemented in the server component body 21 and client-side adapter 22, which will not be referred to hereinafter. This enables the client application basic part 11 to directly access both of the server component body 21 and the client-side adapter 22 in the same manner according to the accessing method determined in the common interface definition. Therefore, the client host can execute the process, regardless of the execution position of the server component.

Any technique may be used for the distributed interobject communication 23. For instance, CORBA, Java RMI, or PDO may be used. The difference between these implementations is absorbed by the adapters in both of the hosts. This enables the present system to be implemented independently of a specific interobject communication technique. Additionally, the instrumentation of communication can be modified easily, if necessary.

All the individual elements in FIG. 4 are not always used. The combination of them is changed dynamically, depending on whether the server component body 21 is executed on the client host 1 or the server host 2.

FIGS. 5A and 5B show configurations in the cases where the server component body 21 is executed on the client host 1 and where it is executed on the server host 2.

FIG. 5A shows the case where the server component body 21 is executed on the client host 1. In this case, the common interface 25 and server component body 21 are provided in the client host 1. The common interface 25, and server component body 21 constitute the server component 5. The client application basic part 11 issues a request to the server component body 21 via the common interface 25.

FIG. 5B shows the case where the server component body 21 is executed on the server host 2. In this case, the client-side adapter 22 in which the common interface 25 is implemented, the server-side adapter 24, and the server component body 21 in which the common interface 25 is implemented constitute the server component 5. The client-side adapter 22 and the server-side adapter 24 are connected to each other by the distributed interobject communication 23. The client application basic part 11 issues a request via the sections 25, 22, 23, 24, 25 to the server component body 21 provided in the server host 2.

The initial state of the server component 5 stored in the storage unit 4 and managed by the component manager 16 is as shown in FIG. 4. When each element of the server component 5 in the initial state is taken out of the storage unit 4 and combined on the client host 1 and the server host 2 to produce executable functions as shown in FIGS. 5A and 5B, these are the server component 5 as a whole. The component elements and the locations of them in the client host 1 and server host 2 differ, depending on the situation.

The individual sections 12, 13, 14, 15, 16, 17, 18, 4 in FIG. 2 determine the execution position of the server component 5 that can be modified dynamically as shown in FIGS. 5A and 5B, specifically the location of the server component body 21, and carries out the process of creating either the state of FIG. 5A or the state of FIG. 5B. Although the component cache 13 is included in the component loader 12 and the execution position decision section 15 and access control monitoring section 17 are included in the component server 14, they are shown as independent means in FIG. 2 for the sake of explanation given later. Hereinafter, these configurations will be explained.

Figure 6:
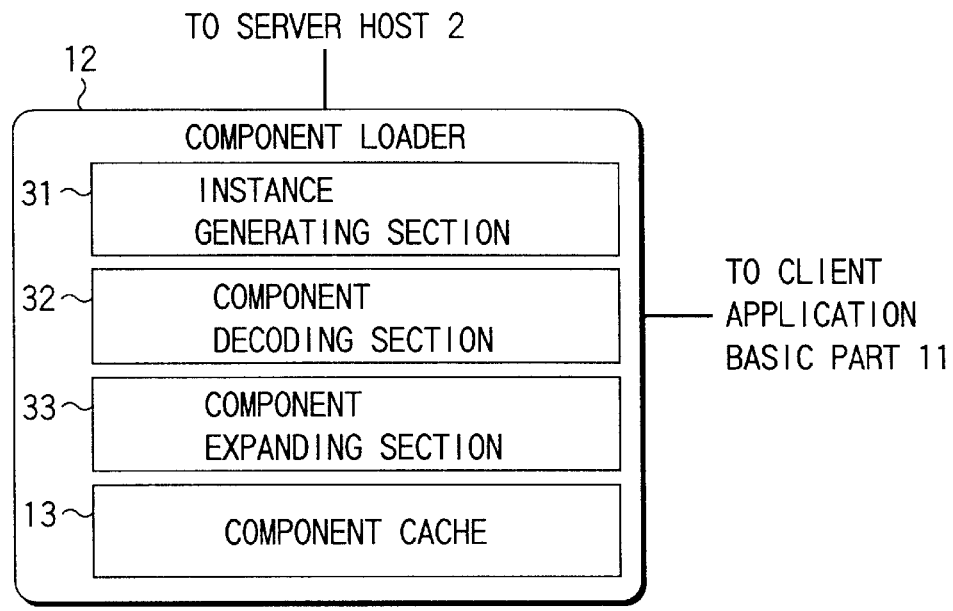
FIG. 6 shows an example of the structure of the component loader.

FIG. 6 shows an example of the configuration of the component loader 12.

The component loader 12 receives the server component body 21 or the client-side adapter 22 (remote connection stub) for connecting to the server component body according to the request for the server component 5 made by the client application basic part 11. Unless otherwise specified, it is assumed that the common interface 25 is implemented or has been already implemented in either the server component body 21 or client-side adapter 22.

The component loader 12 includes an instance generating section 31, a component decrypting section 32, a component expanding section 33, and a component cache 13. The component cache 13 is the same as that in FIG. 2.

The component cache 13 is used to prevent double loading by temporarily storing the server component 5 downloaded from the component server 14 to the client host 1.

Figure 7:
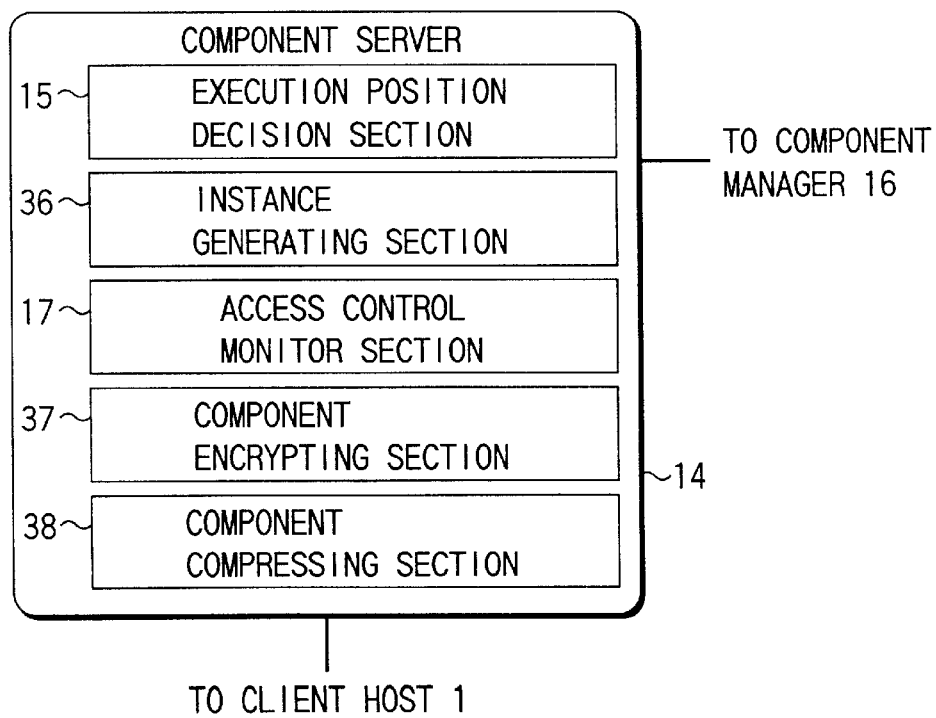
FIG. 7 shows an example of the structure of the component server.

FIG. 7 shows an example of the configuration of the component server 14.

The component server 14 causes the execution position decision section 15 to determine the execution position of the server component 5 requested by the component loader 12, prepares either the server component body 21 or the client-side adapter 22 according to the determination, and returns it to the component loader 12. When the server host 2 executes the server component body 21, the necessary server component body 21 is created on the server host 2.

The component server 14 includes the execution position decision section 15, an instance generating section 36, the access control monitoring section 17, a component encrypting section 37, and a component compressing section 38. The execution position decision section 15 and access control monitoring section 17 are the same as in FIG. 2.

The execution position decision section 15 acquires at least one of load information about the server host 2 and the client host 1, information on the processing capability of the server host and the client host, the transfer speed of the network 3 that connects the server host and the client host, size information about the server component 5, and information on the amount of calculation at the server component 5. On the basis of these pieces of information, the execution position decision section 15 judges whether the server component 5 should be run on the client host or the server host.

The access control section 17 is also called a user certification section and checks whether the present client host 1 (or its user) can use the server component 5 requested.

Figure 8:
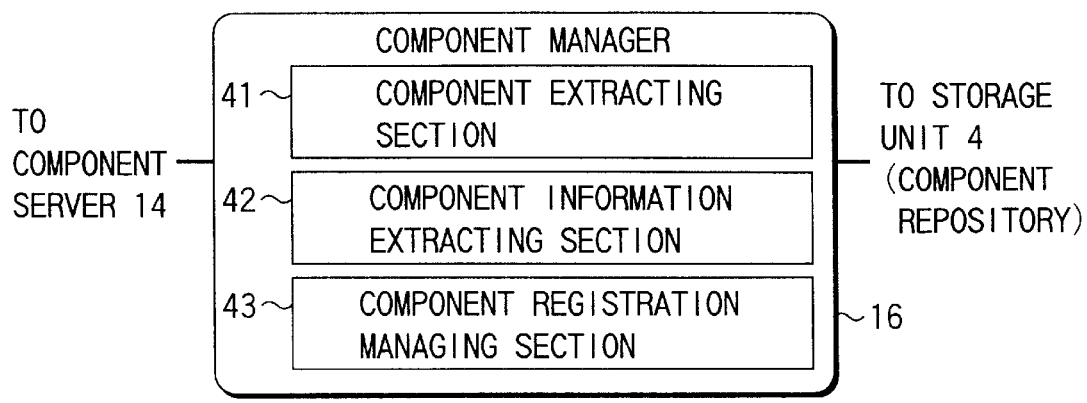
FIG. 8 shows an example of the structure of the component manager.

FIG. 8 shows an example of the configuration of the component manager 16.

The component manager 16 is designed to access the storage unit 4 and manages the server component 5 and information on the server component 5. Specifically, it registers, deletes, and retrieves the server component 5.

The component manager 16 includes a component extracting section 41, a component information extracting section 42, and a component registration managing section 43.

The network monitor 18 acquires load information about the server host 2 and the client host 1, information on the processing capability of the server host 2 and the client host 1, the transfer speed of the network, size information about the server component body 21, and information on the amount of calculation at the server component body 21. Then, the network monitor 18 supplies these pieces of information to the execution position decision section 15.

Next, the operation of the distributed system constructed as described above will be explained.

System Start-up

In the distributed system, no restriction is placed on how the client application basic part 11 in the client host 1 is started up. For example, at the time when the client host 1 is started up, the client application basic section 11 may have already existed in the client host 1. Alternatively, it may be downloaded from the server host 2 at the request of the user of the client host 1 and be started as an application program. Hereinafter, in the embodiment, it is assumed that the client application basic section 11 has already existed in the client host 1 and started up as an application program. On this assumption, explanation will be given.

Taking an image processing application program as shown in FIG. 3B as an example, explanation will be given. It is assumed that the image application program is divided into the image processing application basic part 11a and the smoothing component 5a as shown in FIG. 3B.

The image processing application basic part 11a displays images and calls and uses the smoothing component 5a. The smoothing component 5a effects smoothing on the basis of the image data and parameters received.

Next, how the server component 5 is called in the software configuration of FIG. 2 will be described by reference to FIGS. 9, 10, and 11. The flow of the processing will be explained using FIGS. 12 to 15.

Figure 9:
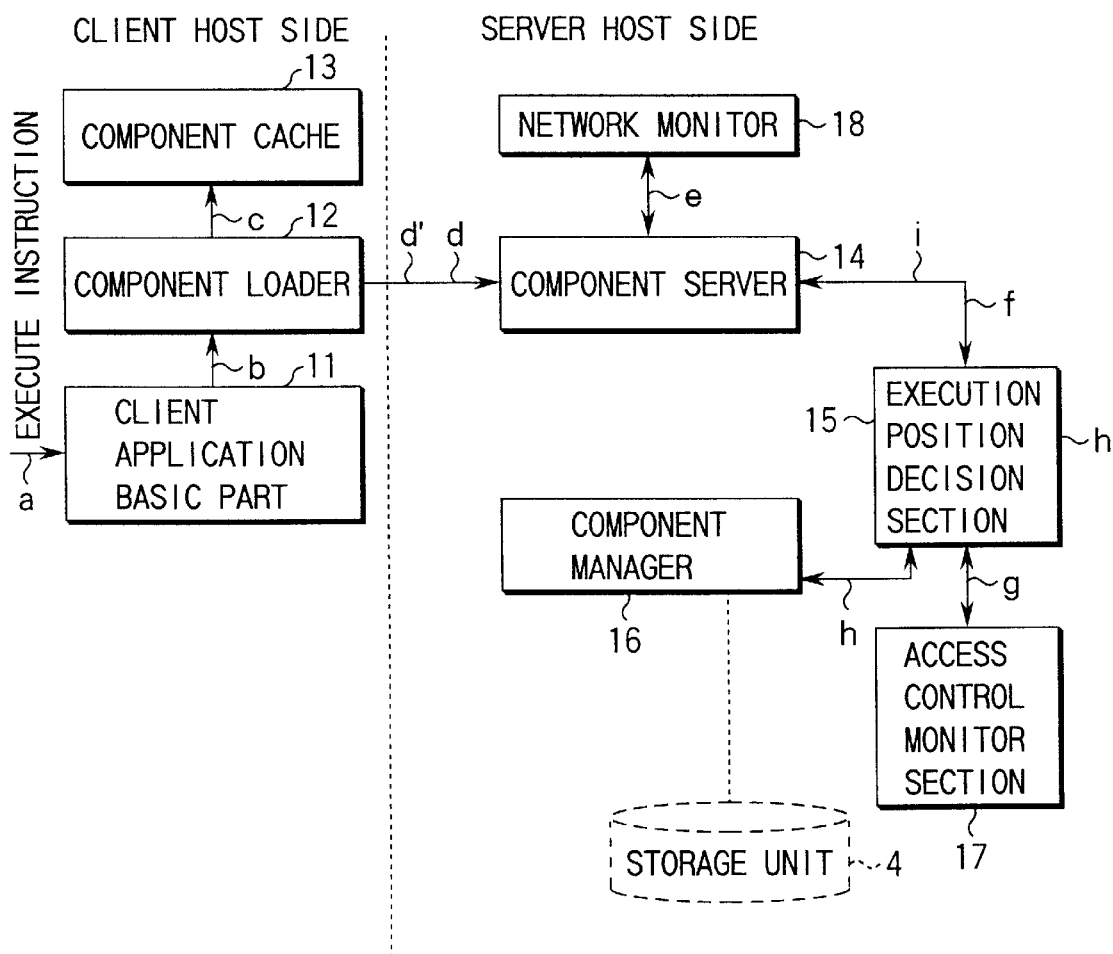
FIG. 9 shows the processes from requesting a server component to carry out the process to determining the execution position.

FIG. 9 shows the processes from requesting the server component 5 to carry out a process to determining the execution position.

Figure 10:
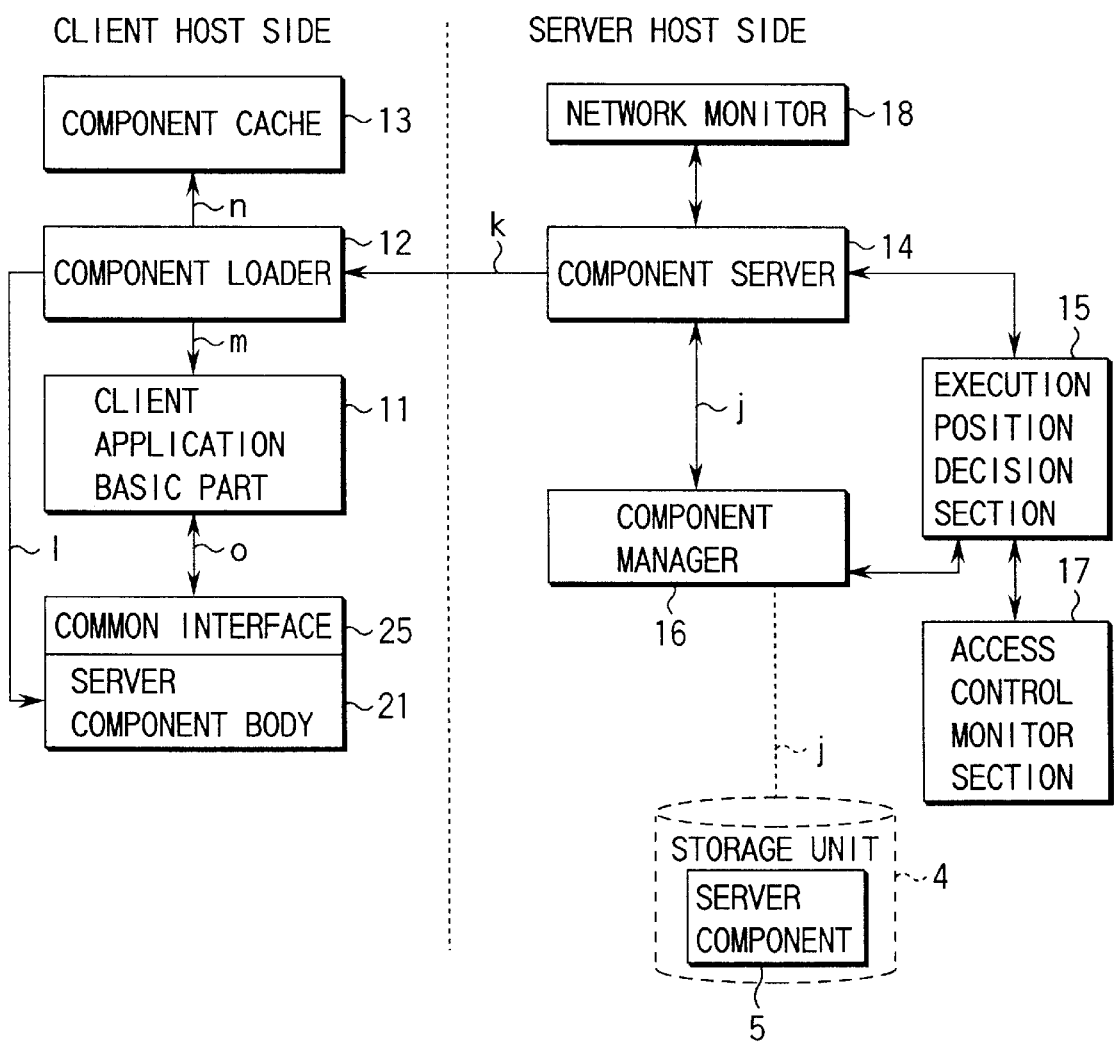
FIG. 10 shows the processes from determining the execution position to executing the server component in a case where the server component is executed on the client host.

FIG. 10 shows the processes from determining the execution position to executing the component 5 in a case where the server component 5 is executed on the client host 1.

Figure 11:
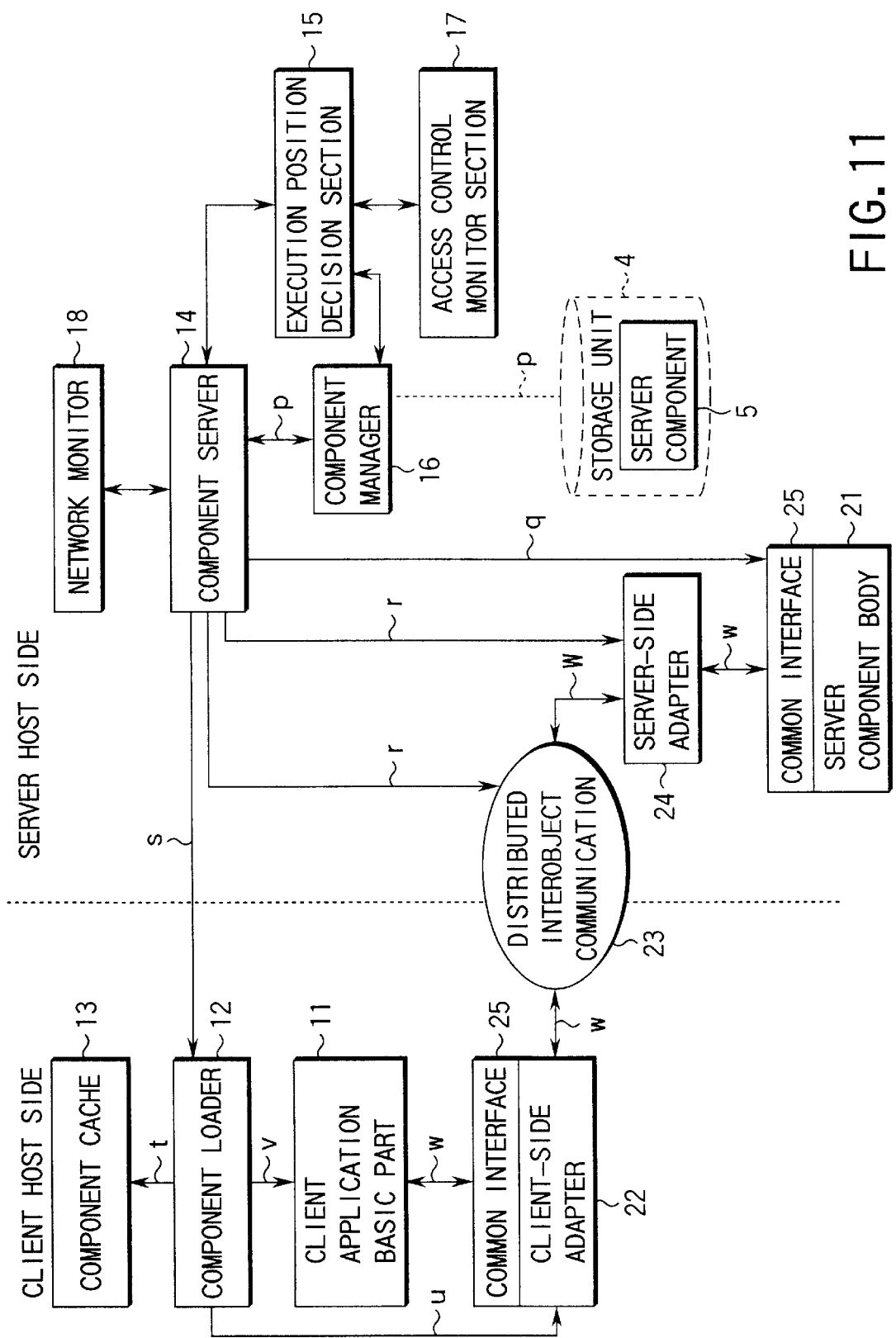
FIG. 11 shows the processes from determining the execution position to executing the server component in a case where the server component is executed on the server host.

FIG. 11 shows the processes from determining the execution position to executing the component 5 in a case where the server component 5 is executed on the server host 2.

Figure 12:
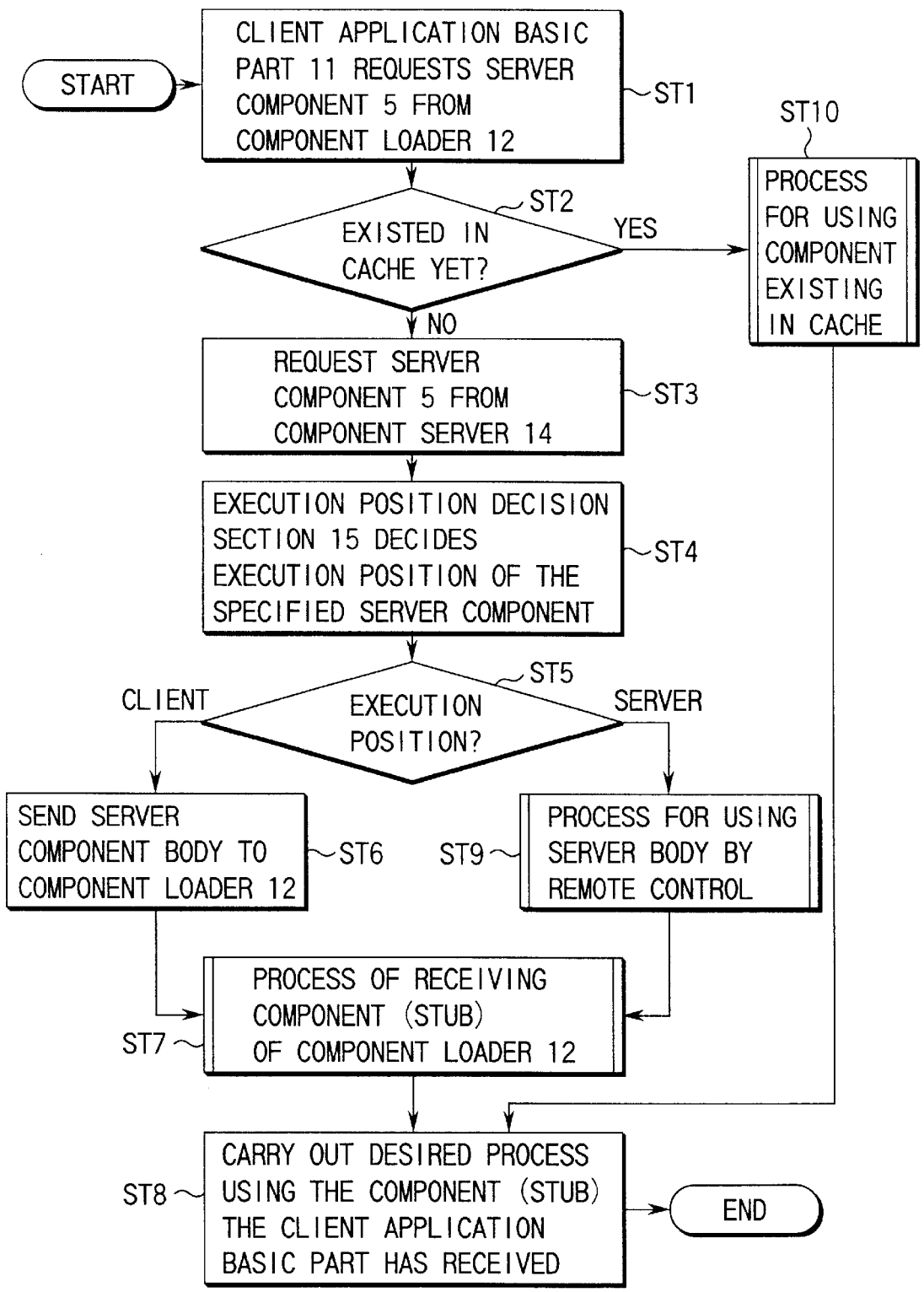
FIG. 12 is a flowchart for the entire processing from requesting the server component to carry out the process to executing the process.

FIG. 12 is a flowchart for the entire processing from requesting the server component 5 to carry out a process to executing the process.

Figure 13:
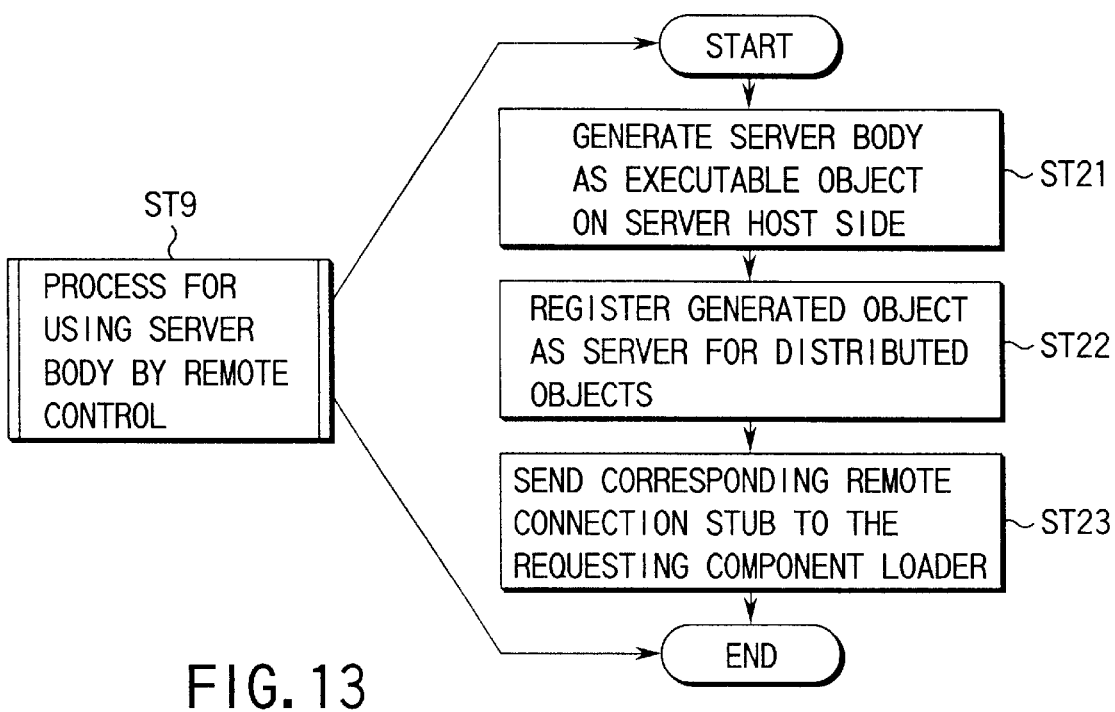
FIG. 13 is a flowchart for the process of using the server body in the remote mode in FIG. 12.
Figure 14:
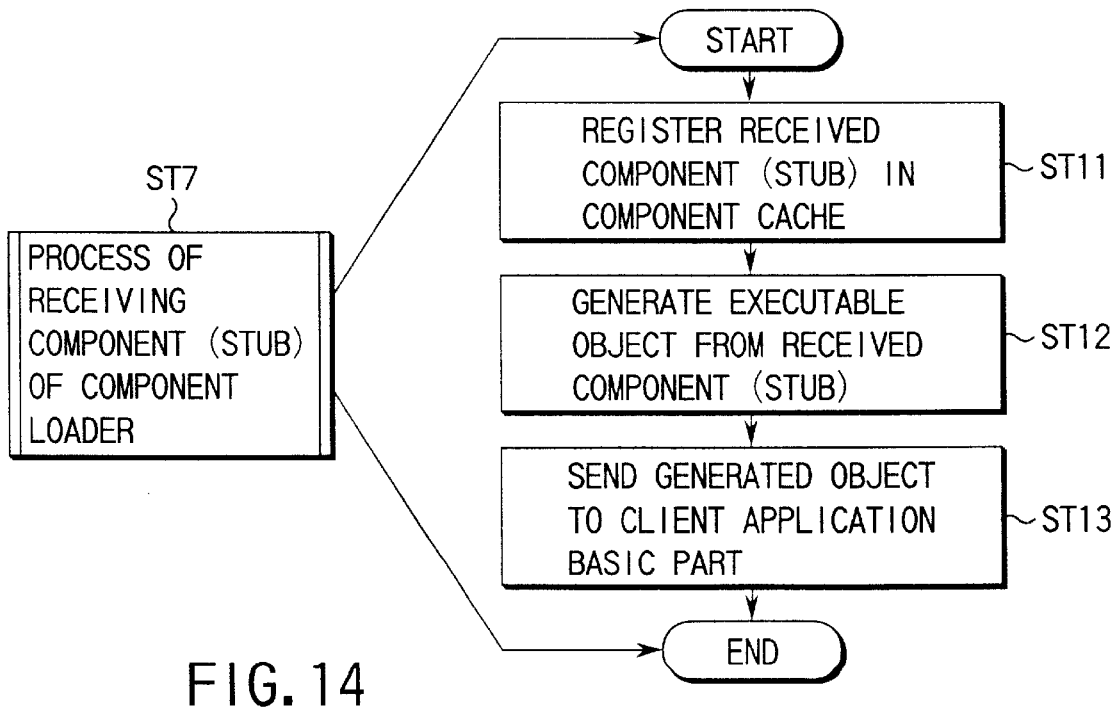
FIG. 14 is a flowchart for the process of receiving a component in the component loader in FIG. 12.

FIG. 13 is a flowchart for the process of using the server body 21 in the remote mode in FIG. 12;

FIG. 14 is a flowchart for the process in which the component loader 12 receives a component in FIG. 12.

Figure 15:
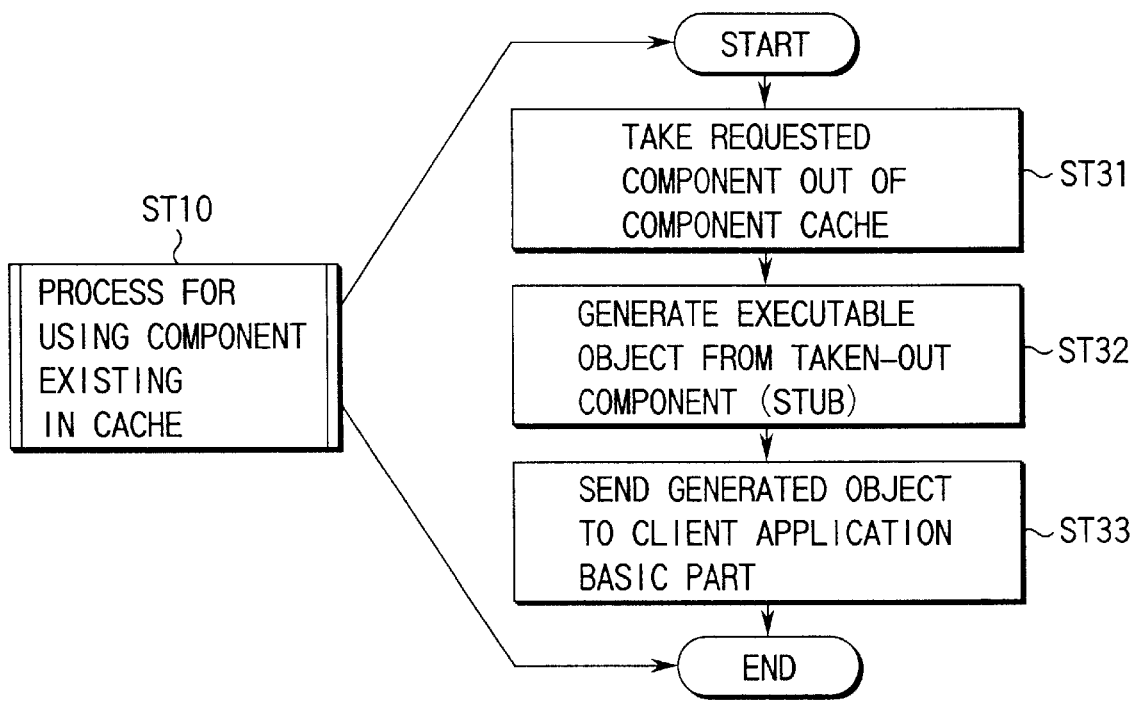
FIG. 15 is a flowchart for the process of using a component in the cache in FIG. 12.

FIG. 15 is a flowchart for the process of using a component in the component cache 13 in FIG. 12.

From Requesting the Server Component to Deciding the Execution Position

The process will be explained by reference to FIGS. 9 and 12.

(1) The user of the client application program gives an instruction to execute a process provided by the desired server component 5 through the client application basic part 11 (signal a in FIG. 9).

(2) The client application basic part 11 requests the specified server component 5 from the component loader 12 (signal b in FIG. 9, step ST1 in FIG. 12).

(3) The component loader 12 checks to see if the requested server component 5 has already been loaded into the component cache 13 (signal c in FIG. 9, step ST2 in FIG. 12). If it has not been loaded yet, the component loader 12 will communicate with the component server 14 existing in the remote server host 2 and request the specified server component 5 (signal d in FIG. 9, step ST3 in FIG. 12). At that time, pieces of information, including the load average of the client host 1, the remaining memory, and the enable/disable of swap (client host information), are created and notified to the component server 14 (signal d' in FIG. 9). A case where the requested server component 5 is equal to the server component 5 already loaded will be explained layer (step ST10 in FIG. 12, FIG. 15).

(4) The component server 5 acquires information on the server host 2 (server host information) and information on the network to which it is connected from the network monitor 18 (signal e in FIG. 9). The network monitor 18 acquires information on the network by checking, for example, the frequency of use of the circuit, the network information at that point of time on the basis of traffic, and the performance of devices, such as circuit speed determined by the ID of a network card. The information may be what the system manager has set beforehand.

The component server 5 notifies the acquired network information to the execution position decision section 15 and asks it whether the specified server component 5 should be executed on the client host or the server host (signal f in FIG. 9).

(5) In connection with the server component 5 specified by the access control monitoring section 17, the execution position decision section 15 first checks whether or not the requesting client host 1 (or its user) can use the server component 5 and there is a limitation on its use (signal g in FIG. 9). When either the client host or the server host is forced to execute the process because of the limitation on uses, the access control monitor 17 notifies the component server 14 of it. In this case, because the client host (or its user) is not qualified to use the server component 5, the subsequent processes will not be carried out.

(6) When the client host 1 is qualified to use the server component 5, the execution position decision section 15 acquires not only information on both hosts and network information delivered from the component server 14 but also information on the server component 5 specified by the component manager 6 (server component information). On the basis of these pieces of information, the execution position decision section 15 decides whether the specified server component 5 should be run on the client host or the server host (signal h in FIG. 9, step ST4 in FIG. 12). Various types of decision algorithm can be considered. Examples of them will be described later. After the decision, the execution position decision section 15 notifies the component server 14 of the determined execution position (signal i in FIG. 9, step ST5 in FIG. 12).

The above processes will be explained, taking an image processing application program as example. First, while the image processing application basic part 11a is displaying an image, the user instructs the image processing application basic part 11a to perform a smoothing process. Then, the image processing application basic part 11a requests the smoothing component 5a from the component loader 12. After having acquired the client host information, the component loader 12 requests the smoothing component 5a from the component server 14. The component server 14 acquires the server host information and network information and asks the execution position decision section 15 about the execution position of the smoothing component 5a. After having acquired component information on the smoothing component 5a from the component manager 16, the execution position decision section 15 determines the execution position on the basis of each piece of information and notifies the component server 14 of the execution position.

Next, an algorithm for determining the execution position in the execution position decision section 15 will be explained.

To improve the throughput, judgment is made using information on both the client host and the server host, the transfer speed of the network, and information on the server component. Specifically, the processing time considered necessary is calculated (or estimated) for both of the cases where the server component body 21 is executed on the client host 1 and where the server component body 21 is executed on the server host 2. Judgment is so made that the server component body 21 should be executed on the host with the shorter processing time.

In the example of the image processing application program, when the data size (the amount of transfer) of the image data to be smoothed is handed over at the request of the user, for example, the estimated processing time will be calculated using the following equation:

$$T = hpt\ (hw, cp, cc) + hst\ (hm, cs, ds, hsc) + ntt\ (ds, ts) \tag{1}$$

In the equation, T is the estimated processing time, the function hpt is a function that returns the processing time obtained from the present load hw and calculating capability cp of the host and the amount cc of calculation the server component does, the function hst is a function that returns the time required to calculate a swap from the remaining memory hm, component size cs, processing data size ds, and the cost hsc necessary for the swap, and the function ntt is a function that returns the time required for the transfer calculated from the processing data size (in a case the server component body 21 is executed on the server host, when the returned value is of the same size, it is doubled) or the component size (in a case where the server component body 21 is executed on the client host) and the transfer speed ts of the network. The time T is calculated in both of the cases where the server component body 21 is executed on the server host and where it is executed on the client host. The process will be executed on the host with the smaller T.

In other judging methods, the execution position may be judged by the amount of data transferred so that charges may be minimized in a measured rate network. Alternatively, because of the component developer's will or the environment of the client host, judgment may be so made that the server component body 21 is executed in fixed positions under certain conditions. In improving the throughput, too, calculations may be done using other values.

Processing When it is Decided That the Execution Should be Executed on the Client Host Next, a series of processes when it is decided that the server component 5 should be run on the client host 1 will be explained by reference to FIGS. 10, 12, and 14.

(1) Receiving the decision (signal i in FIG. 9) from the execution position decision section 15, the component server 14 receives the server component body 21 (executable object data) specified by the component manager 16 from the storage unit 4 (signal j in FIG. 10).

(2) The component server 14 sends the server component body 21 as the server component 5 to the component loader 12 requested by the server host 2 (signal k in FIG. 10, step ST6 in FIG. 12).

(3) The component loader 12 on the client host 1 creates an executable server component object from the obtained server component body 21 (signal l in FIG. 10, step ST7 in FIG. 12, step ST12 in FIG. 14) and hands over its pointer to the client application basic part 11 (signal m in FIG. 10, step ST7 in FIG. 12, step ST13 in FIG. 14). This enables the client application basic part 11 to cause the server component body 21 to execute the process. The common interface 25 is implemented in the server component body 21. To prevent the same server component to be loaded twice, the component loader 12 stores the received server component 5 in the component cache 13 at the same time that it receives it (signal n in FIG. 10, step ST7 in FIG. 12, step ST11 in FIG. 14).

(4) The client application basic part 11 makes use of the received server component body 21 and executes the process specified by the user (signal o in FIG. 10, step ST8 in FIG. 12).

The above processes will be explained, taking an image processing application program as example.

First, the component server 14 receives a byte train in the body of the smoothing component 5a via the component manager 16 from the storage unit 4 and sends it to the component loader 12. On the basis of the received byte train, the component loader 12 creates an executable object (server component 21) and hands over its pointer to the image processing application basic part 11a. The image processing application basic part 11a carries out a smoothing process by calling a smoothing method for the received object of the smoothing component 5a.

Processing When it is Decided That the Execution Should be Executed on the Server Host Next, a series of processes when it is decided that the server component 5 should be run on the server host 2 will be explained by reference to FIGS. 11, 12, 13, and 14.

(1) Receiving the decision (signal i in FIG. 9) from the execution position decision section 15, the component server 14 receives the client-side adapter 22 (remote connection stub) in the server component 5 specified by the component manager 16 and the server component body 21 (signal p in FIG. 11).

(2) The component server 14 creates an executable server component object from the server component body 21 on the server host 2 (signal q in FIG. 11, step ST9 in FIG. 12, step ST21 in FIG. 13).

(3) The component server 14 makes preparations according to the distributed interobject communication technique used (i.e., Java or CORVA) (signal r in FIG. 11, step ST9 in FIG. 12, step ST22 in FIG. 13). To do this, an object for the server-side adapter 24 is created and the process of establishing distributed interobject communication is carried out.

(4) Next, the component server 14 sends the client-side adapter 22 as the server component 5 to the component loader 12 requested by the server host 2 (signal s in FIG. 11, step ST9 in FIG. 12, step ST23 in FIG. 13). To avoid double loading, the component loader 12 of the client host 1 stores the server component 5 in the component cache 13 at the same time that it receives the server component 5 (signal t in FIG. 11, step ST7 in FIG. 12, step ST11 in FIG. 14).

(5) The component loader 12 creates an executable stub object from the received client-side adapter 22 (signal u in FIG. 11, step ST7 in FIG. 12, step ST12 in FIG. 14).

(6) The component loader 12 hands over the pointer of the created stub object to the client application basic part 11 (signal v in FIG. 11, step ST7 in FIG. 12, step ST13 in FIG. 14).

(7) In this way, the client application basic part 11 accesses the remote server component body 21 generated on the server host 2 through the stub object acting as the client-side adapter 22, and executes the process (signal w in FIG. 11, step ST8 in FIG. 12).

The above processes will be explained, taking an image processing application program as example.

First, the component server 14 receives the smoothing component stub 22 and a byte train in the body 21 from the component manager 16. The server host creates objects 21, 25 from the body 21 that carries out the smoothing process and registers them as server objects using the existing distributed interobject communication technique so that remote calls can be accepted. Moreover, the stub 22 is sent as it is to the component loader 12. The component loader 12 creates objects 22, 25 from the received stub 22. The created stub objects 22, 25 connect to the bodies 21, 25 on the server host at the creation and initialization stages. The created stubs 22, 25 are handed over to the image processing application basic part 11a. The image processing application basic part 11a accesses a remote object 5a (21, 25) that carries out the smoothing process, via the stubs 22, 25, and carries out the process.

Processing When the Server Component Exists in the Component Cache

Once the client host 1 has created the server component body 21 or the client-side adapter 22, the object can be used repeatedly until the client process has been completed or the object loaded from the server host 2 has been discarded. Namely, this is a case where control at step ST2 proceeds to step ST10 in FIG. 12. In this case, the server component 5 need not be loaded again from the server host 2 each time the process is carried out.

Specifically, the process is carried out through the following procedure:

(1) The client application basic part 11 sends the request of the server component 5 to the component loader 12 (signal b in FIG. 9, step ST1 in FIG. 12).

(2) The component loader 12 asks the component cache 13 if the specified server component 5 has been loaded yet (signal c in FIG. 9, steps ST2, ST10 in FIG. 12, step ST31 in FIG. 15).

(3) If the specified server component 5 has already been loaded, an object is created on the basis of the information (signal l in FIG. 10 or signal u in FIG. 11, step ST10 in FIG. 12, step ST32 in FIG. 15). The object is returned to the client application basic part 11 (signal m in FIG. 10 or signal v in FIG. 11, step ST10 in FIG. 12, step ST33 in FIG. 15).

(4) The client application basic part 11 carries out a desired process, making use of the returned object (signal o in FIG. 10 or signal w in FIG. 11, step ST8 in FIG. 12).

As described above, the distributed system according to the first embodiment includes the server component 5 composed of the server component body 21 that executes the process the client application basic part 11 requests and the client-side adapter 22 and server-side adapter 24 connected to each other by the distributed interobject communication 23. At the request of the client application basic part 11, the execution position decision section 15 judges whether the server component body 21 should be processed on the client host or the server host. The process is carried out using the server component body 21 on the host determined by the result of the judgment. This makes it possible to switch the execution place of the process dynamically, which improves the flexibility of the system.

Because the execution position decision section 15 determines the execution position on the basis of information on the hardware and network conditions from the network monitor 18, the execution position of the server component 5 can be switched at the request of the client host 1 so as to obtain the result of the processing faster. This improves the throughput.

Use of the access control monitoring section 17 makes it possible to judge whether the requesting client application basic part 11 has the authority to make a request, on the basis of the client user information and the client host information. This enables access to the server component 5 to be controlled.

Because the requested process is implemented only in the server component body 21, or in one place, the server component developer need not implement the same program twice. That is, in constructing a dynamic changing system for requested processes, programs need not be developed separately for execution on the server host and client host.

Furthermore, because the common interface 25 has been implemented in both the server component body 21 and the client-side adapter 24, the client host 1 can access both in the same manner. This simplifies the program (process) configuration, which makes the operation so much faster.

When the server component body 21 is executed on the client host, a communication adapter is not needed between the client application basic part 11 and the server component body 21. This eliminates overheads in requesting processes.

While in the first embodiment, one client host 1 and one server host 2 have been used, the present invention may be applied to a case where a plurality of hosts are placed in execution positions by using a hypothetical system that provides load distribution or centralized management in a multiserver environment where more than one server host exists in a network.

What is called the server host here is a host other than the client host. Specifically, in the first embodiment, the client application basic part 11 exists and a host that issues a request for a process is the client host 1. A host that executes the process except for the client host is called the server host 2. In general, a client host called a terminal, therefore, does not necessarily correspond to the client host in the first embodiment.

While in the embodiment, the execution position has been determined automatically, the execution position of the server component body 21 can be set manually by setting the execution position beforehand. The automatic setting may be combined with the manual setting.

Each of the following embodiments produces the above described effects at the sections where the functional configurations are the same.

Hereinafter, other embodiments of the present invention will be explained. In the following embodiments, the same parts as those in the first embodiment are indicated by the same reference symbols and a detailed explanation of them will not be given.

Second Embodiment

In a second embodiment of the present invention, the configuration of the server component 5 in the first embodiment is improved, with the remaining sections being the same as those in the first embodiment. Therefore, the same parts as those in FIGS. 1 to 15 are indicated by the same reference symbols and a detailed explanation of them will not be given.

The server component 5 of the first embodiment in FIG. 4 is the basic configuration for realizing the invention. The basic component configuration, however, may fail to realize the necessary functions the server component body 21 should achieve. What cannot be realized in the first embodiment are a component that accesses the host resource and a component that communicate with an application program on the client host asynchronously (a component communicates with an application program on the client host).

The server component 5 for accessing host resources comes in the following two types: one is a server component that accesses resources (including screen display (GUI) and local file systems) for the client host and the other is a server component that accesses resources (including file systems and databases on the server host) in and behind the server host 2.

For example, in the case of the server component 5 for displaying GUI, GUI has to be displayed on the client host 1, regardless of whether the server component body 21 is in the server host 2 or the client host 1. To solve this problem, the part accessing the client resource has to be moved to the client host 1, regardless of the position of the server component body 21.

Furthermore, for example, in the case of the server component 5 connected to the database management system on the server host 2, even when the server component body 21 is sent to the client host 1, the part exchanging data with the database management system has to be left in the server host 2 and keep ready to exchange data with the database management system.

Taking these requirements into consideration, the server component body in the above cases includes the following separate sections: the original function executing section (the server component body 21 in the first embodiment) and the section that accesses client resources and/or the section that accesses server (or lower-level) resources. Taking this into account, the server component 5 is constructed as shown in FIG. 16 in the second embodiment.

Figure 16:
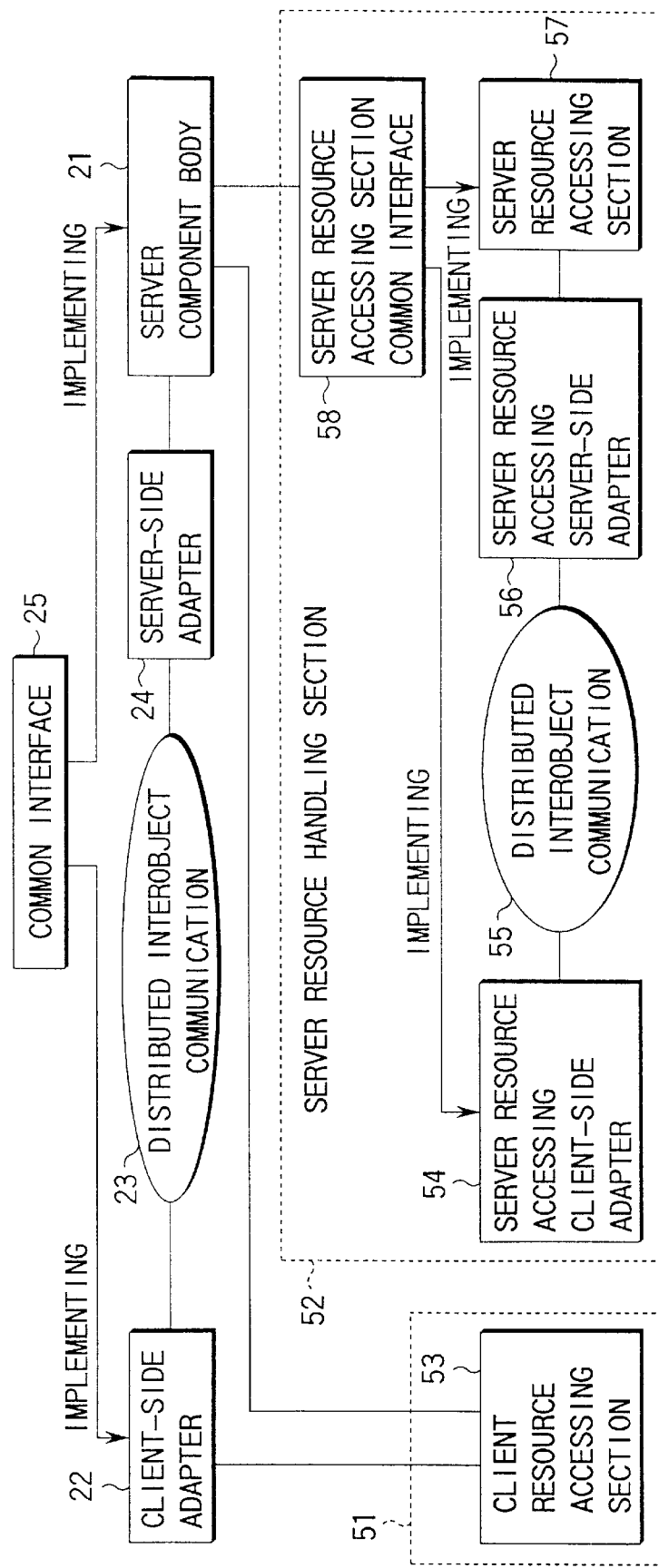
FIG. 16 shows an example of the configuration of a server component according to a second embodiment of the present invention.

FIG. 16 shows an example of the configuration of the server component 5 according to a second embodiment of the present invention.

The server component 5 is such that a client resource handling section 51 and a server resource handling section 52 are added to the configuration of FIG. 4.

The client resource handling section 51 is composed of a client resource accessing section 53. The server resource handling section 52 is composed of a server resource accessing client-side adapter 54, a server resource accessing server-side adapter 56, and a server resource accessing section 57. The server resource accessing client-side adapter 54 and server resource accessing server-side adapter 56 are connected to each other by distributed interobject communication 55. A server resource accessing section common interface 58 is implemented in the server resource accessing client-side adapter 54 and server resource accessing section 57.

The client resource accessing section 53 carries out the process of accessing resources in the client host 1. The server resource accessing section 57 carries out the process of accessing resources in the server host 2. The server resource accessing client-side adapter 54 and server resource accessing server-side adapter 56 are adapters used to establish distributed interobject communication 55.

The server resource accessing section 57 is a component that accesses host resources. The client resource accessing section 53 is a component that communicates with the application program 11 on the client host asynchronously.

As described above, in the second embodiment, the server component body 5 is divided into three sections: the section that accesses client resources (including asynchronous communication with the client application), the section that accesses server resources, and the section that can access both types of resources.

In the second embodiment, the server component 5 stored in the storage unit 4 is as shown in FIG. 16. Each process in FIG. 2 is the same as in the first embodiment. Each section in FIG. 2 differs only in that, when the server component body 21 is executed on either the client host or the server host, the movement of the section newly added to the server component 5 and the creation of the corresponding object are needed.

Next, the operation of the distributed system of the second embodiment constructed as described above will be explained.

When Processing is Done on the Server Host

Figure 17:
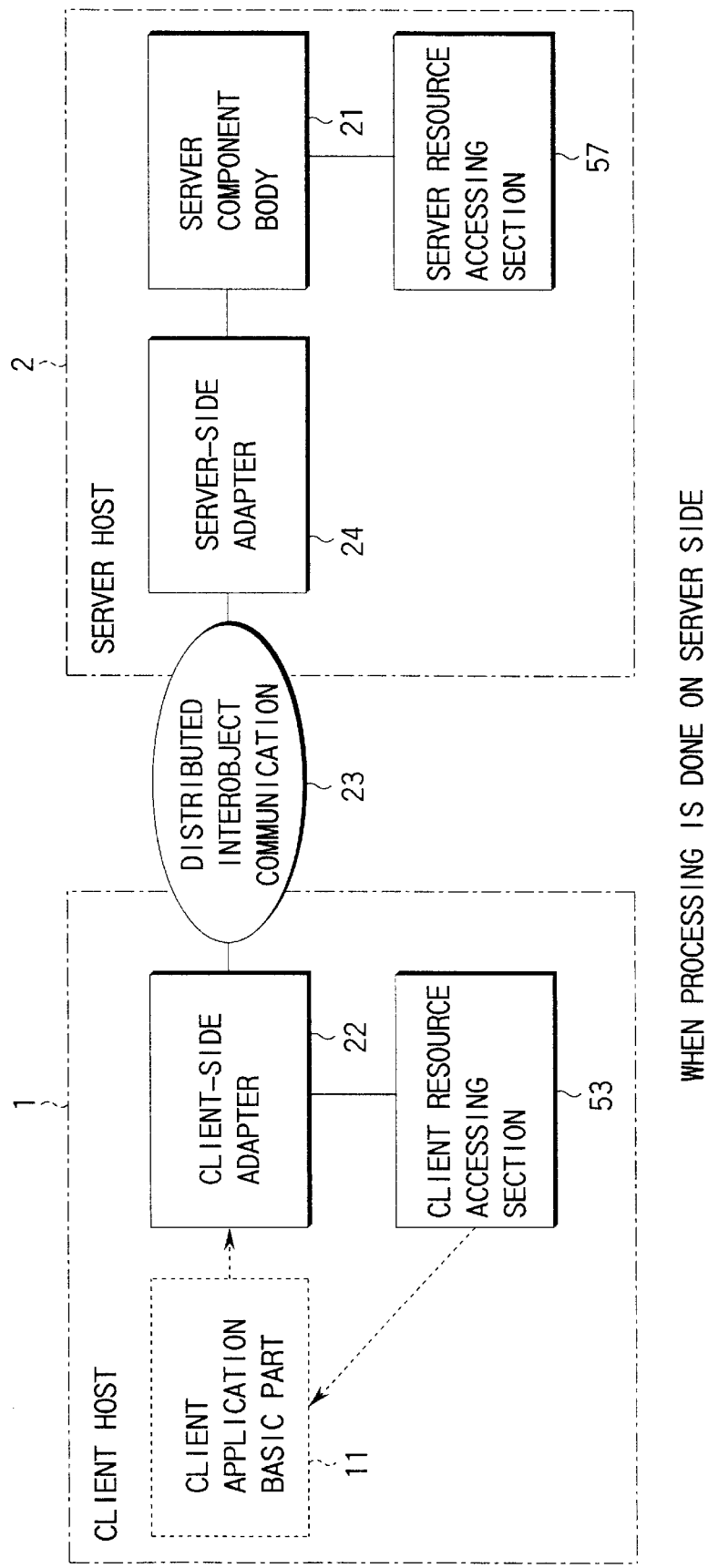
FIG. 17 shows the configuration of the server component in a case where the server component body is run on the server host.

FIG. 17 shows the configuration of the server component 5 in a case where the server component body 21 is run on the server host 2.

When the server component body 21 is run on the server host 2, the component server 14 sends the client-side adapter 22 and client resource accessing section 53 to the client host 1. After the component loader 12 on the client host 1 has created an instance for the client resource accessing section 53, the component loader 12 hands over its pointer to the server component body 21.

On the server host 2, the server component body 21 holds the server resource accessing section 57 directly and exchanges data.

The client-side adapter 22 may exchange data directly with the client resource accessing section 53, taking performance into account.

When Processing is Done on the Client Host

Figure 18:
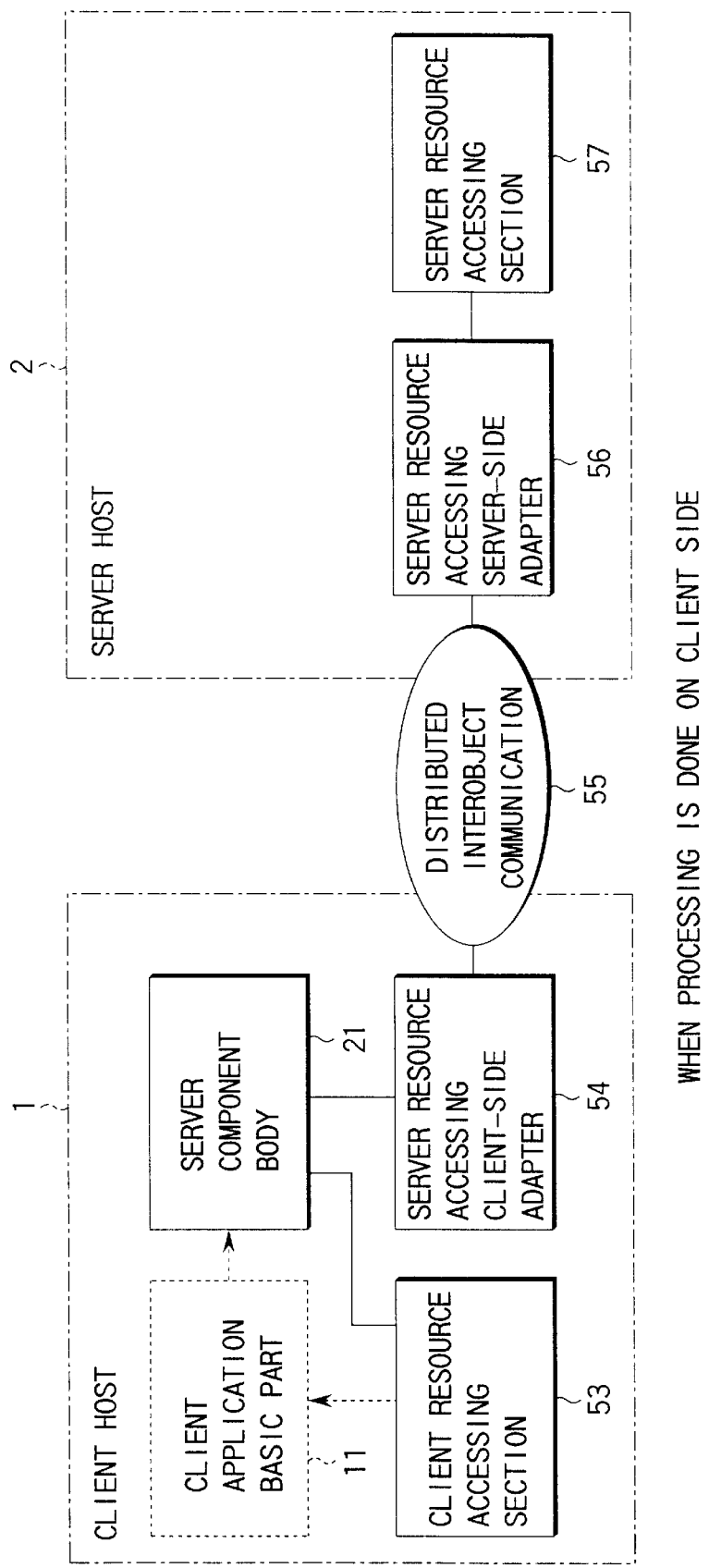
FIG. 18 shows the configuration of the server component in a case where the server component body is run on the client host.

FIG. 18 shows the configuration of the server component in a case where the server component body is run on the client host 1.

When the server component body 21 is run on the client host 1, the component server 14 sends the server component body 21, client resource accessing section 53, and server resource accessing client-side adapter 54 to the client host 1.

At this time, the server component body 21 created on the client host 1 has the client resource directly. The server resource accessing section 57 has to be left on the server host 2. To establish distributed interobject communication 55 between the server component body 21 and server resource accessing section 57, there is provided a configuration similar to that of the server component 5 in FIG. 5B. Specifically, as shown in FIG. 18, server resource accessing adapters 54, 56 are prepared for use on the server host 2 and client host 1.

Because, when viewed from the server component body 21, the server resource accessing client-side adapter 54 and server resource accessing section 57 should be accessed in the same manner, a common interface 58 for server resource accessing is implemented in both of them. The server component 5 holds these elements in the form compatible with the server resource accessing common interface.

Similarly, to access the server component body 21 and client-side adapter 22 in the same manner, the client resource accessing section 53 holds these in the form compatible with the common interface.

These possessive relationships are realized by initialization effected when the component loader 12 and server component 14 make each element executable. In this way, the configuration of FIG. 17 or 18 realizes a server component 5 capable of accessing resources in each of the client host 1 and the server host 2.

As described above, in the distributed system according to the second embodiment, the server component 5 is provided with the client resource accessing section 53, server resource accessing client-side adapter 54, distributed interobject communication 55, server resource accessing server-side adapter 56, and server resource accessing section 57, with the rest being the same as in the first embodiment. Even when the server component body 21 exists on either the client host or the server host, it is allowed to access resources in either the client host or the server host. Therefore, the second embodiment produces a similar effect to that of the first embodiment and further enables the server component 5 to realize not only processes requested from the application basic part 11 but also processes executable only through access to resources in the client or server host, such as access to GUI or database.

With the above configuration, various techniques can be applied to distributed interobject communication. When Java and RMI are used, an object serving as a server for distributed interobject communication must inherit java.rmi.Remote.

As for the client resource handling section 51 and server resource handling section 52, they have only to be added to the basic part only when the component requires them. When they are not needed, they may be eliminated.

Third Embodiment

In a third embodiment of the present invention, the configuration of the server component 5 in the second embodiment is improved, with the remaining sections being the same as those in the second embodiment. Thus, the same parts as those in FIGS. 1 to 18 are indicated by the same reference symbols and a detailed explanation of them will not be given.

The second embodiment makes it possible to realize a server component capable of accessing resources in both of the client host 1 and the server host 2. To realize this, the client host 1 has to be able to hand over reference to the server host 2 (hands over its pointer). The line connecting the client-side adapter 22 and the client resource accessing section 53 in FIG. 16 corresponds to reference handover. In a distributed environment where reference handover is impossible, another means (component configuration) has to be considered; otherwise, the server component body 21 cannot send a message to the client resource accessing section 53, which limits the types of realizable processes.

Taking these things into consideration, the configuration of the server component 5 is improved in the third embodiment.

Figure 19:
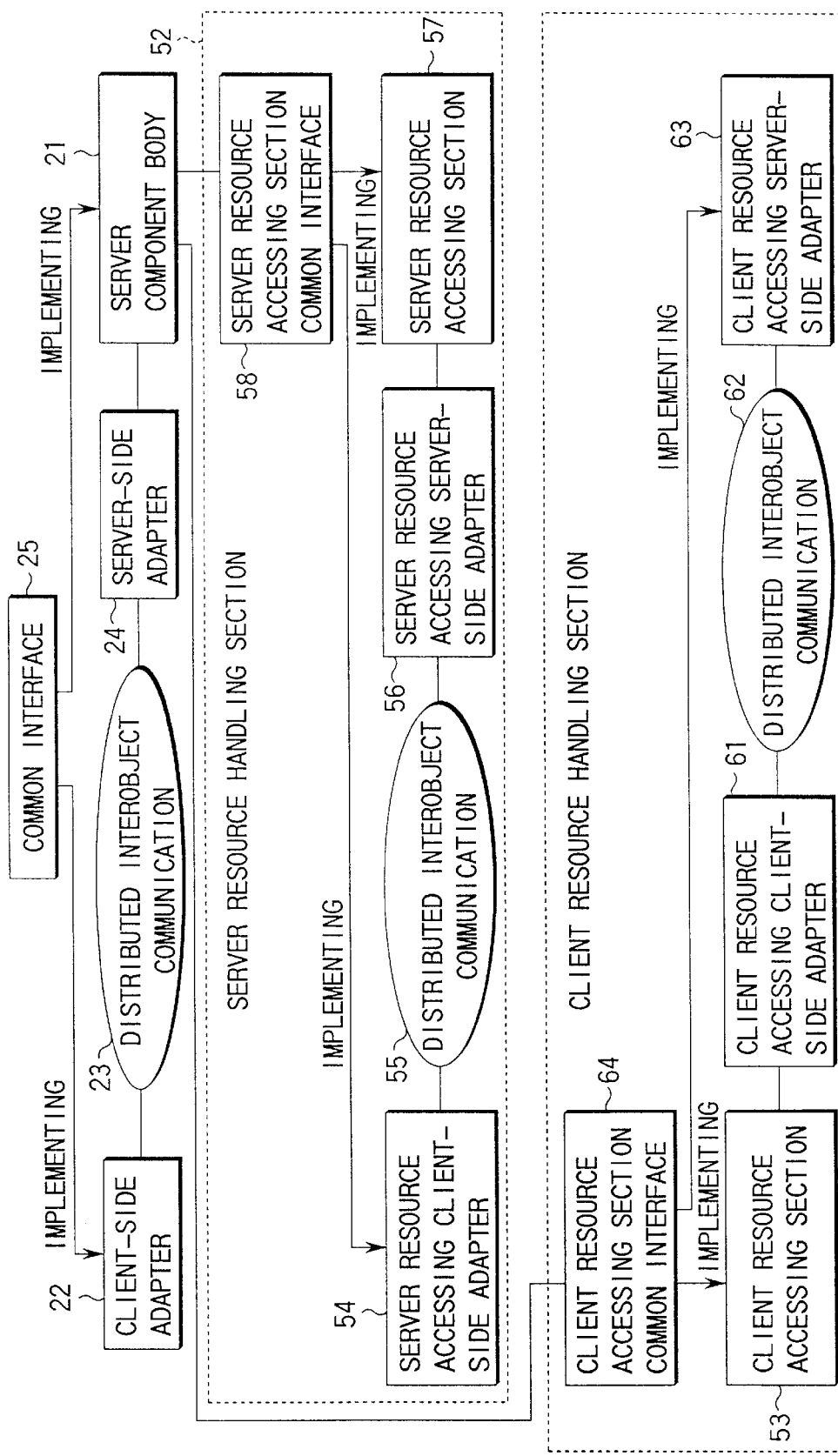
FIG. 19 shows an example of the configuration of a server component according to a third embodiment of the present invention.

FIG. 19 shows an example of the configuration of the server component 5 in the third embodiment.

The server component 5 has the same configuration as that of the server component 5 of the second embodiment in FIG. 16 except that a modification is made to the configuration of the client resource handling section 51.

The client resource handling section 51 is composed of a client resource accessing section 53 similar to that in the second embodiment, a client resource accessing client-side adapter 61, and a client resource accessing server-side adapter 63. The client resource accessing client-side adapter 61 and server-side adapter 63 are connected to each other through distributed interobject communication 62. A client resource accessing section common interface 64 is implemented in the client resource accessing server-side adapter 63 and client resource accessing section 53.

The client resource accessing section 53 carries out the process of accessing resources in the client host 1 as in the second embodiment. The client resource accessing client-side adapter 61 and client resource accessing server-side adapter 63 are adapters for establishing distributed interobject communication 62.

When the component exists on the client host, the client resource accessing section common interface 64 implements the component directly in the client resource accessing section 53. When the component exists on the server host, the server component body 21 implements the component in the client resource accessing section 53 via the client resource accessing section common interface 64, client resource accessing server-side adapter 63, distributed interobject communication 62, and client resource accessing client-side adapter 61.

Next, the operation of the distributed system according to the third embodiment constructed as described above will be explained.

FIG. 20 shows the configuration of the server component in a case where the server component body is run on the server host 2.

The procedure for creating such a server component configuration is the same as in the first and second embodiments. In the third embodiment, reference is not handed over from the client resource accessing section 53 to the server component body 21.

Specifically, the client resource accessing section 53 is related to the server component body 21 only through both adapters 61, 63 and through distributed interobject communication 62. As a result, although the client resource accessing section 53 cannot hand over reference to the server component body 21, communication between them is established.

When the server component body 21 is run on the client host 1, the problem of reference handover between the client host 1 and server host 2 will not arise. Consequently, the configuration of the server component 5 is the same as that of FIG. 18 in the second embodiment.

As described above, in the distributed system according to the third embodiment, the server resource accessing client-side adapter 61, distributed interobject communication 62, and client resource accessing server-side adapter 63 are added to the same configuration of that of the first embodiment. This produces a similar effect to that of the first embodiment. In addition, in a case where the server component body 21 exists on the server host 2, even when reference handover cannot be effected through the distributed interobject communication 62, communication between the server component body 21 and client accessing resource section 53 is established via the client resource accessing section common interface 64, client resource accessing server-side adapter 63, distributed interobject communication 62, and client resource accessing client-side adapter 61, which enables the client resource to be accessed. Therefore, the scope of application of the system using the server component 5 is improved more.

With this configuration, when reference handover is impossible, the process that should be provided in the client resource accessing section 53 can be concentrated in the server component body 21, which facilitates the development of the server component 5 more.

Fourth Embodiment

FIG. 21A shows a case where the basic server component 5 shown in FIG. 4 is applied to an image processing application program as shown in FIG. 3B. In this example, a hypothetical language J is used as a programming language and a hypothetical distributed object technique J RMI is used for communication.

Fifth Embodiment

FIG. 21B shows a case where the basic server component 5 is applied to not only an image processing application program but also an ordinary application program. Differently from the fourth embodiment, Java is used as a programming language and the distributed interobject communication technique Java RMI is used for communication.

Sixth Embodiment

FIG. 21C corresponds to the server component 5 in the second embodiment of FIG. 16 (that enables access to resources in the server host and client host). In the example, Java is used as a programming language and the distributed interobject communication technique Java RMI is used for communication.

Seventh Embodiment

In the above embodiments, the distributed system capable of dynamically switching the execution position of the server component body 21 between the client host 1 and the server host 2 using the server component 5 has been explained. In creating the server component 5, the software developer has to develop a large number of component elements (files).

In a seventh embodiment of the present invention, the technique for decreasing the burden on the developer by automatically creating each file of the server component 5. The server component 5 to be created will be explained, taking the fifth embodiment of FIG. 21B as example. In the seventh embodiment, the same parts as those in the figures related to the above embodiments are indicated by the same reference symbols, and explanation of them will not be given.

In FIG. 21B, five class files—a common interface 25, a client-side adapter 22, a server-side adapter 24, a server component body 21, and an RMI interface 24a—have to be created as the component elements of the server component 5 and registered in the storage unit 4.

Figure 22:
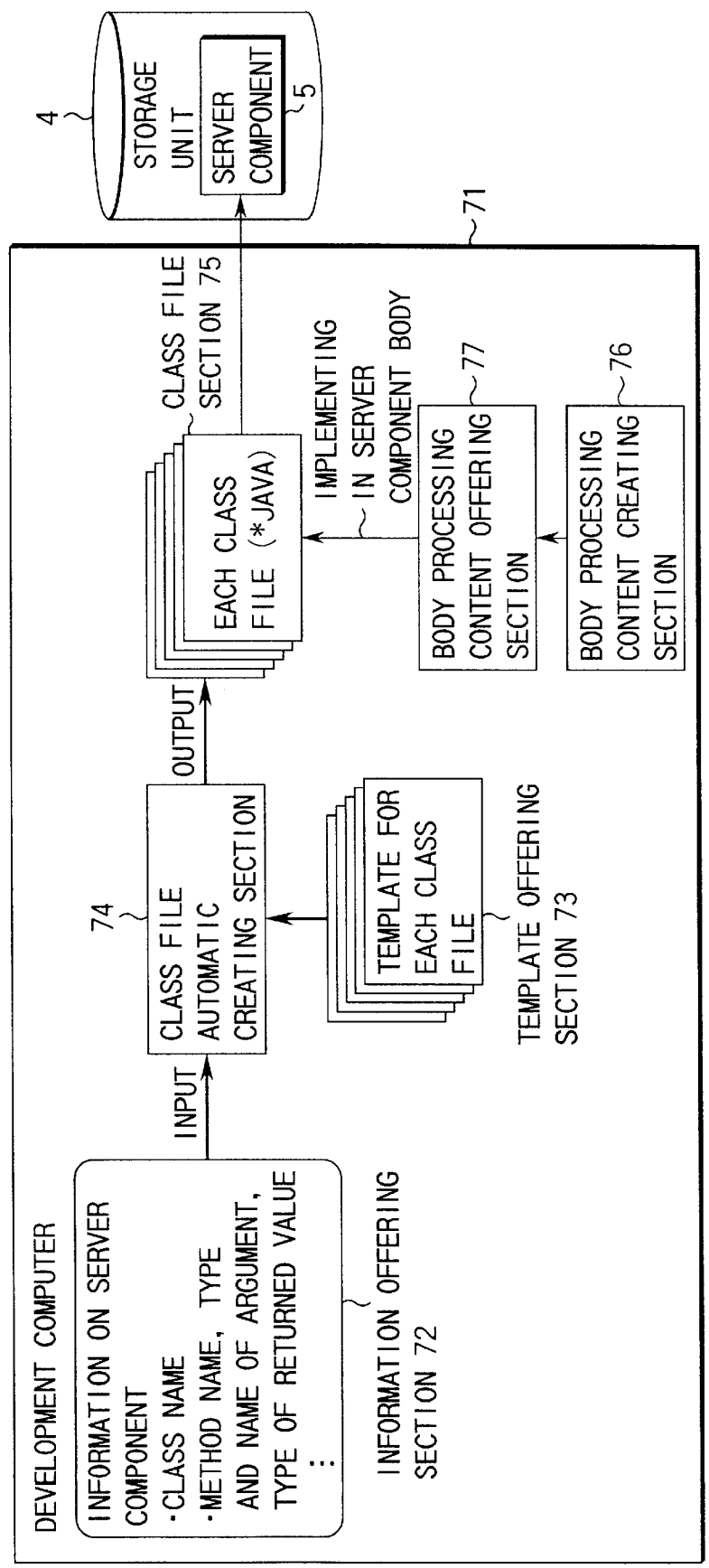
FIG. 22 is a block diagram showing an example of the configuration of a server component automatic creating system according to a seventh embodiment of the present invention.

FIG. 22 is a block diagram showing an example of the configuration of a server component automatic creating system according to the seventh embodiment of the present invention.

In the server component automatic creating system, a development computer 71 is composed of an information offering section 72, a template offering section 73, a class file automatic creating section 74, a class file section 75, a body processing content creating section 76, and a body processing content offering section 77.

The information offering section 72 stores each piece of information on the server component 5, including class name and method name, and inputs these to the class file automatic creating section 24.

The template offering section 73 holds templates corresponding to the following five class/interfaces: a common interface 25, a client-side adapter 22, a server-side adapter 24, a server component body 21, and an RMI interface 24a shown in LIST L-1 to LIST L-5 and offers the templates to the class file automatic creating section 24. LIST L-1 to LIST L-5 are examples of interfaces created on the basis of the templates.

LIST L-1 shows an example of the common interface in Java in the seventh embodiment.

```
        LIST L-1
public interf ace FooIF {
    //describe method (signature)
    public int fooMethod(char c);
}
        LIST L-2 shows an example of the server component
body 21 in Java in the seventh embodiment.
        LIST L-2
public class Foo extends Object implements FooIF {
    //constructor
    public Foo() {
       super();
       //initialization if necessary
    }
    //describe implementation of method
    public int fooMethod(char c) {
       : //implementation of processing logic
    }
}
        LIST L-3 shows an example of the server-side
adapter class in Java in the seventh embodiment.
        LIST L-3
import java.rmi. *;
import java.rmi.server.UnicastRemoteObject;
public class RSAFooImple extends UnicastRemoteObject
implements RSAFoo {
    //having main body for method relay as attribute
Foo foo;
    //constructor
    public REAFooImpl() throws RemoteExceprion {
       super ();
       //generate main body (held as attribute)
       foo = new Foo();
    }
    //description of relay method
    public int fooMethod(char c) throws RemoteException {
       return foo.fooMethod(c);
    }
}
        LIST L-4 shows an example of the server-side
adapter class RMI interface in Java in the seventh
embodiment.
        LIST L-4
public interf ace RSAFoo extends java.rmi.Remote {
    //list of relay methods(except constructor) provided
by server component
    //all methods throw RemoteException
    int fooMethod(char c) throws
java.rmi.RemoteException;
}
        LIST L-5 shows an example of the client-side
adapter in Java in the seventh embodiment.
        LIST L-5
import java. rmi.*;
public class RCAFoo extends Object implements FooIF {
    //having RMI server adapter as attribute
    RSAFoo foo;
    //constructor
    public RCAFoo() {
       //initialization
    }
    //connect RMI server adaptor
    //received argument is RMI registory registration
name of server object
    public void prepareRMI(String regName) {
       try {
          //acquisition of server object (casting of
interface type)
          foo = (RSAFoo)Naming.lookup(regName);
       } catch (Exception e) {
          System.out.println("Error:prepareRMI:" +
             e.getMessage ());
```

-continued

```
        e.printStackTrace();
      }
    }
    //description of relay method
    public int fooMethod(char c) {
    try {
      return foo.fooMethod(c);
    } catch (Exception e) {
      System.out.println("Error Message:" +
        e.getMessage ())
      e.printStackTrace();
    }
  }
 }
}
```

The class file automatic creating section 74 creates the five class files on the basis of the pieces of information offered from the information offering section 72 and template offering section 72 and outputs them to the class file section 75. The substantial contents of processing (the processing logic) of the server component body 24 have not been implemented in the class files outputted at this point of time.

The body processing content creating section 76 is a processing section for creating the substantial contents of processing, or the body processing content.

The body processing content offering section 77 implements the body processing content created at the body processing content creating section 76 in the one corresponding to the server component body 21 of the class files in the class file section 75.

Registration means (not shown) registers each class file thus created in the storage unit 4 as a component element of the server component 5.

Next, the operation of the server component automatic creating system according to the seventh embodiment constructed as described above will be explained.

First, a conceptual operation of the seventh embodiment shown in FIG. 22 will be described.

Apart from the body processing content of the server component body 21, the other class/interfaces merely relay a method call. Therefore, class/interfaces excluding the server component body 21 can be created automatically by doing as described below.

Class names can be determined automatically from the server component body 21 according to a predetermined naming rule.

Since both adapters 22, 23 merely relay methods, the client-side adapter 22 calls the method of the server-side adapter 23 and the server-side adapter 23 calls the method of the server component body 21. Here, attention should be given to returned values. Methods declared in a statement other than void, definition has to be made so as to return the result of relay methods. For a method with void declaration, nothing need not be returned.

It is possible for one server component 5 to offer more than one method.

Receiving information on the class name and method of the server component body 21 in the server component 5 from the information offering section 72 and the respective templates corresponding to LIST L-1 to LIST L-5 from the template offering section 73, the class file automatic creating section 74 can create all the five classes automatically.

FIG. 22 illustrates this concept. For example, in an example shown in LIST L-1 to LIST L-5, the class name is Foo, the number of methods is one, the method name is fooMethod, the type of argument is char, the argument name is c, the type of returned value is int.

The body processing content, the original processing logic, is, of course, coded by the software developer. For this reason, the development computer 71 is provided with a body processing content creating section 76. The body processing content offering section 77 implements the created body processing content in the class file of the server component body 21.

Finally, all the contents created are registered in the component manager 16 (or in the storage unit 4 from the viewpoint of hardware). At this time, the component information and information for access control are also registered.

Using a flowchart, the automatic creation of each element of the server component 5 using Java will be explained in detail.

The above-described LISTS L-1 to L-5 are the results obtained from the automatic creating system. LIST LC-1 to LIST LC-12 are lists called templates. LIST L-1 to LIST L-5 are created by inputting the conditions, including the class name Foo and the method name fooMethod, to the automatic creating system to embed them in the templates of LIST LC-1 to LIST LC-12.

The template offering section 73 offers the following templates: LIST LC-1 is a template for the class definition of component body, LC-2 a template for the method definition of component body, LC-3 a template for the interface definition of common interface, LC-4 a template for the method definition of common interface, LC-5 a template for the class definition of server-side adapter, LC-6 a template for the method definition of server-side adapter when the type of returned value is non-void, LC-7 a template for the method definition of server-side adapter when the type of returned value is void, LC-8 a template for the interface definition of server-side adapter RMI interface, LC-9 a template for the method definition of server-side adapter RMI interface, LC-10 a template for the class definition of client-side adapter, LC-11 a template for the method definition of client-side adapter when the type of returned value is non-void, and LC-12 a template showing the method definition of client-side adapter when the type of returned value is void.

```
    LIST LC-1
public class [component name] extends Object
    implements [ ] IF {
  public [component name] {
    super();
    //initialization if necessary
  }
}
    LIST LC-2
public [return value type][method name]([argument
type][argument name], ... ) {
  //implementation of processor logic
}
    LIST LC-3
public interface [component name]IF {
  //describe method name
}
    LIST LC-4
public[return value type][method name]([argument
type][argument name], ... );
    LIST LC-5
import java.rmi.*;
import java.rmi.server.UnicastRemoteObject;
public class RSA [component name] Impl extends
UnicastRemoteObject
      implements RSA [component name] {
  //having main body as attribute to relay method
```

-continued

```
    [component name] [component name (small letter)];
    //constructor
    public RSA [component name] Impl() throws
RemoteException {
        super ();
        //initialization if necessary
        [component name (small letter)] = new [component
name] ();
    }
}
        LIST LC-6
public [return value type][method name]([argument type
1][argument name 1], . . . )
        throws RemoteException {
    return[component name](small letter)].[method
name]([argument name 1], . . . ;
}
        LIST LC-7
public void [method name] ([method type 1][method name
1], . . . )
        throws RemoteException {
    [component name](small letters)]. [method
name]([argument name 1], . . . );
}
        LIST LC-8
public interface RSA [component name] extends
java.rmi.Remote {
}
        LIST LC-9
public [return value type][method name]([argument
type][argument name 1], . . . );
        LIST LC-10
import java.rmi.*;
public class RCA [component name] extends Object
        implements [component name]IF {
    //having RMI server adapter as attribute
    RSA [component name] [component name (small letter)];
    //constructor
    public RCA [component name] () throws {
        super();
        //initialization
    }
    //connect to RMI server adapter
    //received argument is RMI resistory registration
name of server object
    public void prepareRMI(String regName) {
        try {
            //acquisition of server object(casting of
interface type)
            [component name](small letters)] =
                (RSA[component name])Naming.lookup(regName);
        } catch (Exception e) {
            //exception processing
        }
    }
    //description of relay method
}
        LIST LC-11
public [return value type][method name] ([argument type
1] [argument name 1], . . . ) {
    try {
    return[component name](small letters)].[method
name]([argument name 1], . . . );
    } catch (Exception e) {
        //exception processing
    }
    return[default value of return value];
}
        LIST LC-12
public void [method name] ([argument type 1][argument
name 1], . . . ) {
    try {
        [component name](small letters)].[method
name]([argument name 1], . . . );
    } catch (Exception e) {
        //exception processing
    }
}
```

When the server component 5 is created, the information offering section 72 gives the following pieces of information to the class file automatic creating section 74:

Server component name

Method name

Type of returned value

Type of argument and argument name.

The class file automatic creating section 74 calls the template corresponding to the target file creation from the templates (also called skeletons) LC-1 to LC-12 for the aforementioned class/interfaces. The class file automatic creating section 74 automatically creates class files for the server component body 21 and others by replacing the information enclosed by [ ] in the template with the information from the information offering section 72. By repeating this, the class file automatic creating section 74 creates all of the files. Hereinafter, the processes carried out by the class file automatic creating section 74 will be described using the flowcharts in FIGS. 23 to 27.

Figure 23:
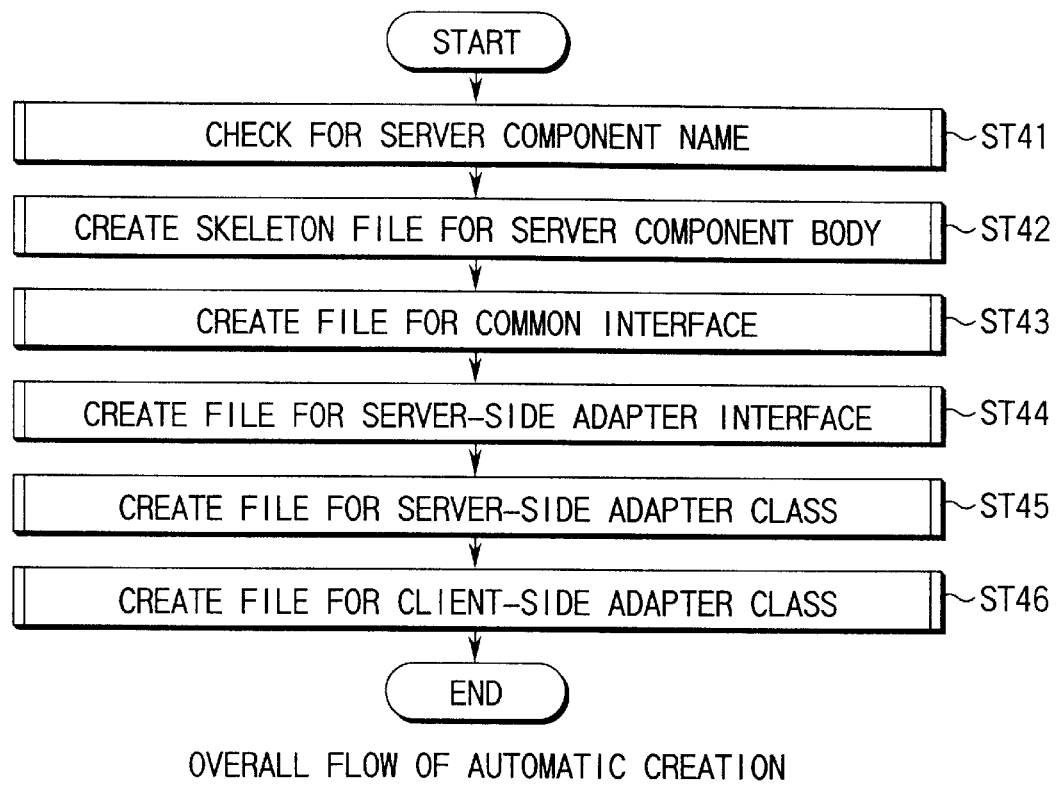
FIG. 23 is a flowchart for the entire processing of the class file automatic creation.

FIG. 23 is a flowchart for the overall process of creating class files.

Figure 24:
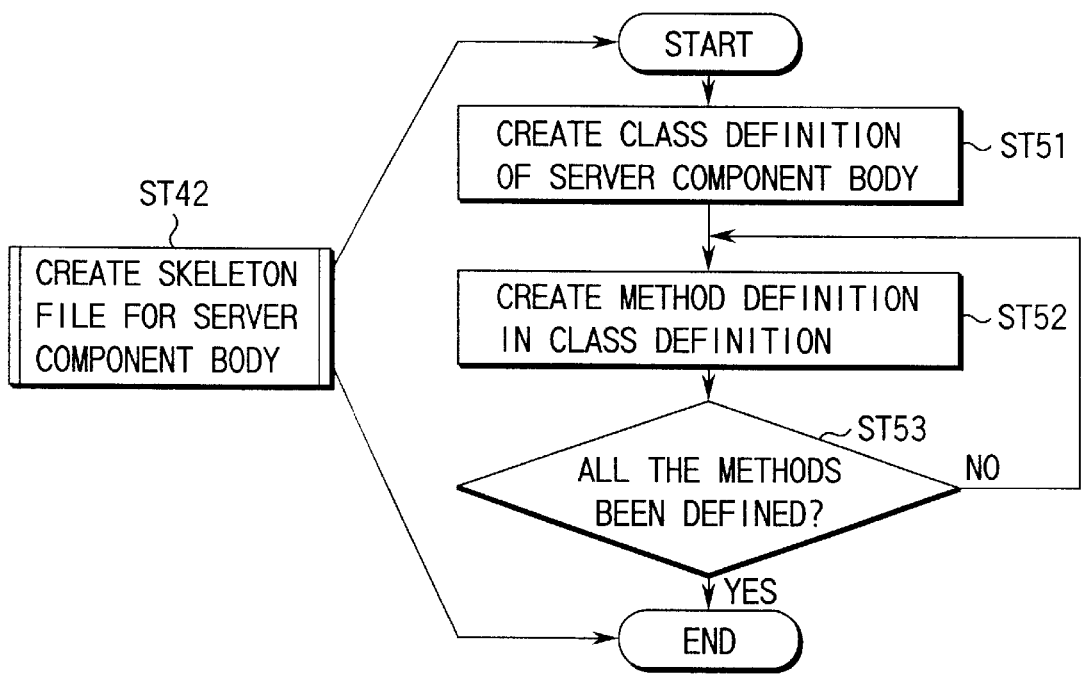
FIG. 24 is a flowchart for creating the skeleton of the server component body.

FIG. 24 is a flowchart for the process of creating the skeleton of the server component body 21.

Figure 25:
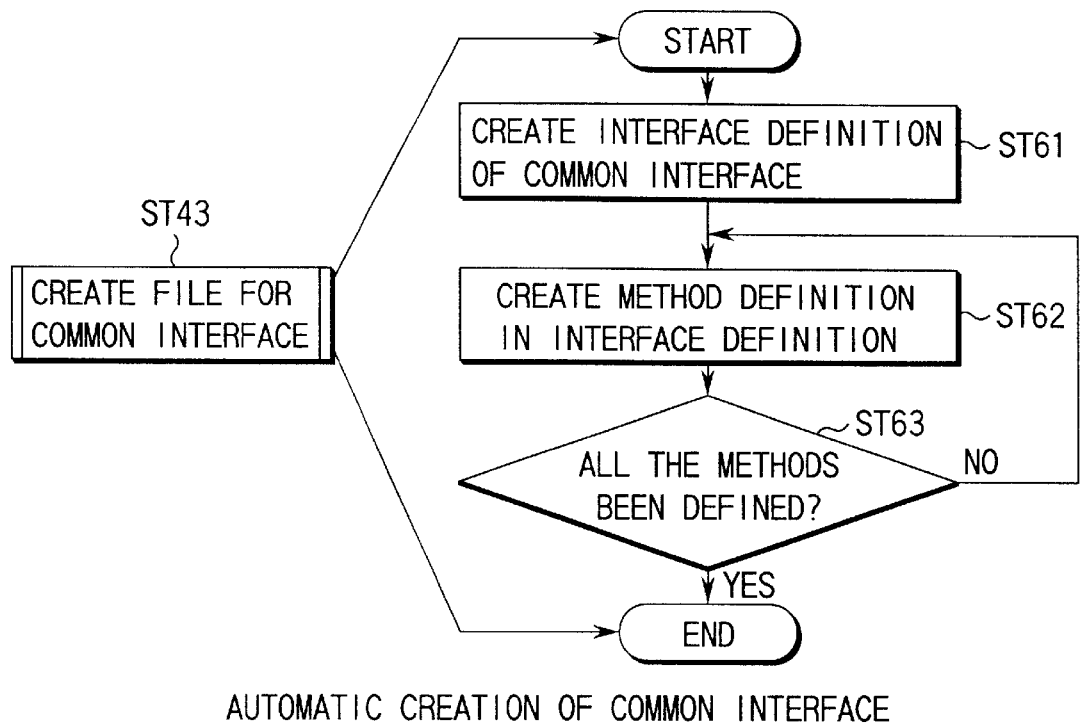
FIG. 25 is a flowchart for automatically creating the common interface.

FIG. 25 is a flowchart for the process of automatically creating the common interface.

Figure 26:
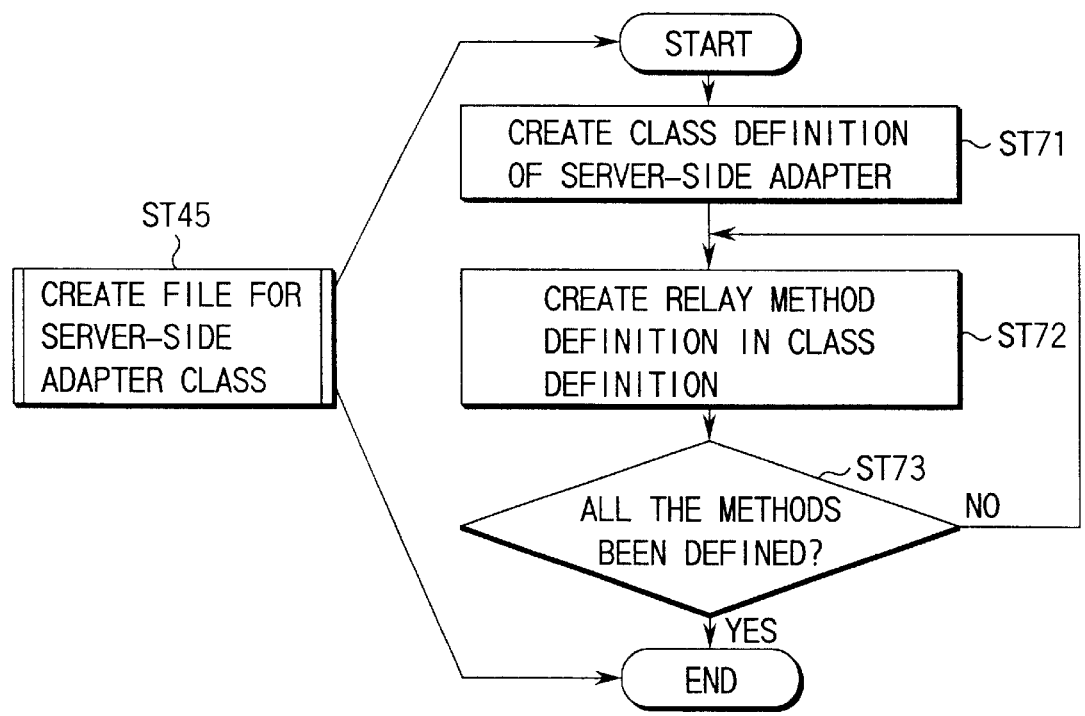
FIG. 26 is a flowchart for automatically creating the server-side adapter class.

FIG. 26 is a flowchart for the process of automatically creating the server-side adapter class.

Figure 27:
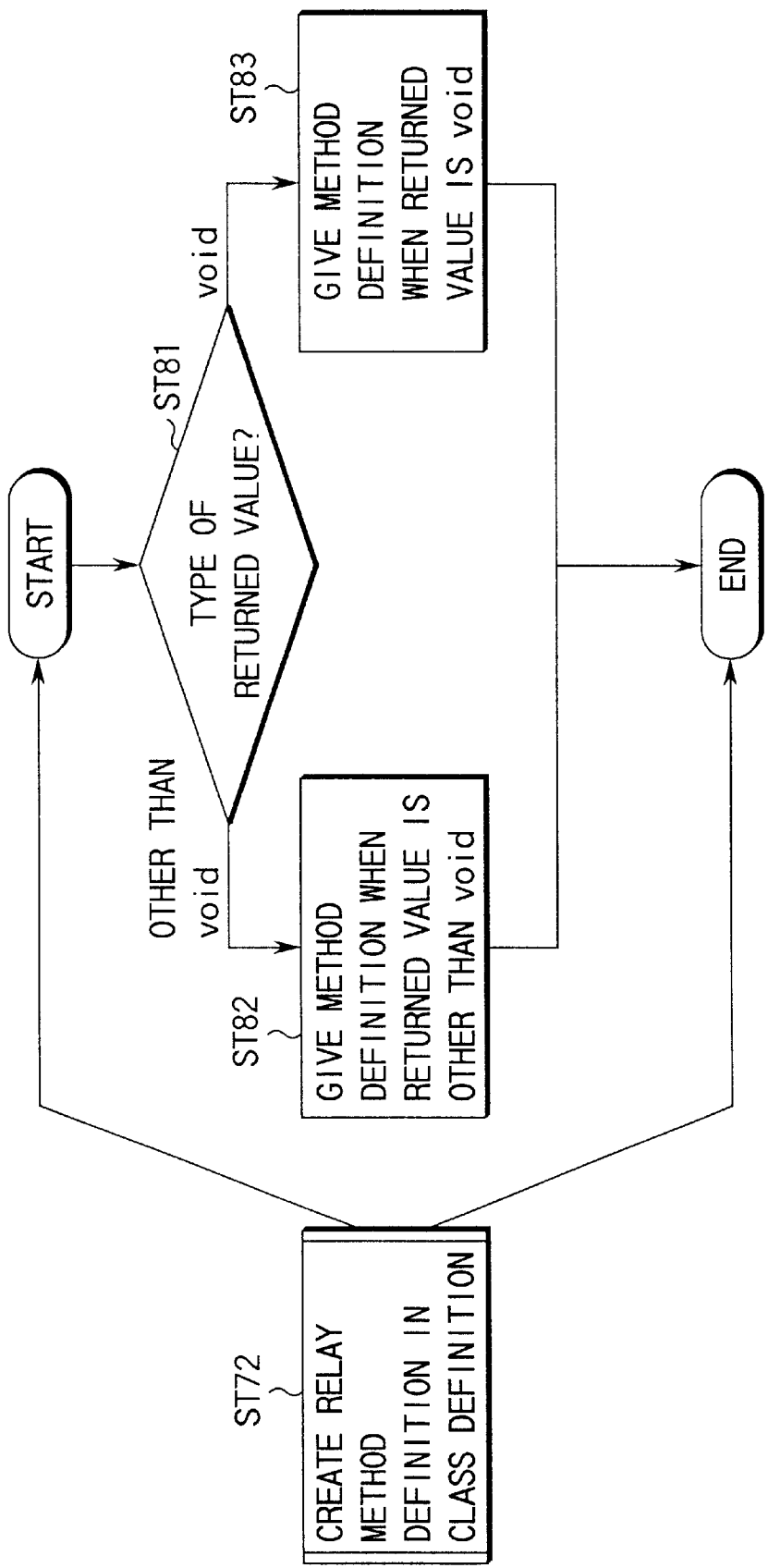
FIG. 27 is a flowchart for the process of embedding a relay method in the definition of an adapter class.

FIG. 27 is a flowchart for the process of embedding a relay method in the adapter class definition.

The overall processing flow will be described by reference to FIG. 23. First, the class file automatic creating section 74 checks the information from the information offering section 72 for the server component name (step ST41) and then creates a skeleton file for the server component body 21 (step ST42). Next, the automatic creating section 74 creates a file for the common interface 25 (step ST43) and then a file for the server-side adapter interface 24a (step ST44). Thereafter, the class file automatic creating section 74 creates a file for the server-side adapter class (step ST45) and a file for the client-side adapter class (step ST46) and then outputs these files to the class file section 75.

Figure 28:
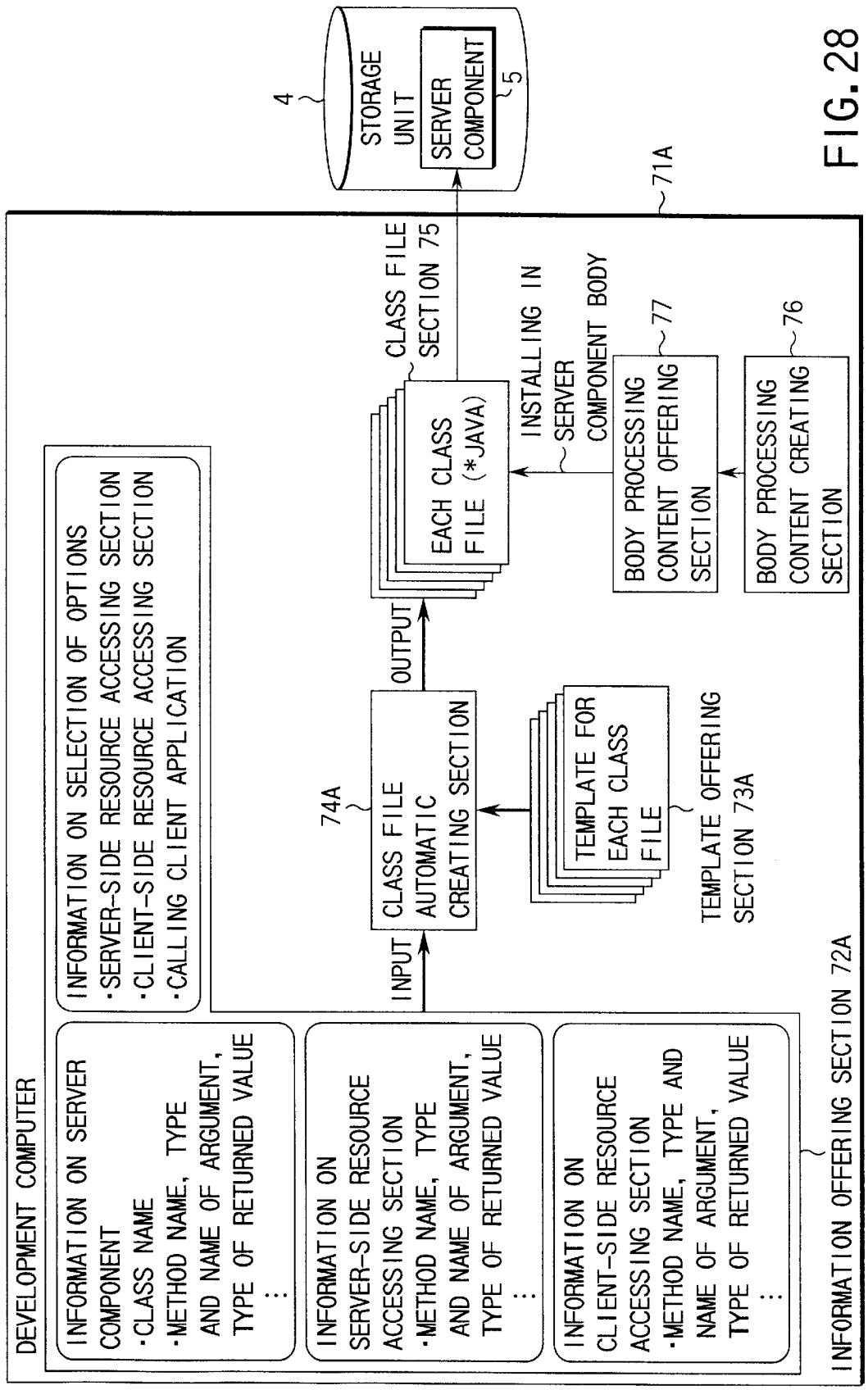
FIG. 28 is a block diagram showing an example of the configuration of a server component automatic creating system according to an eighth embodiment of the present invention.
Figure 29:
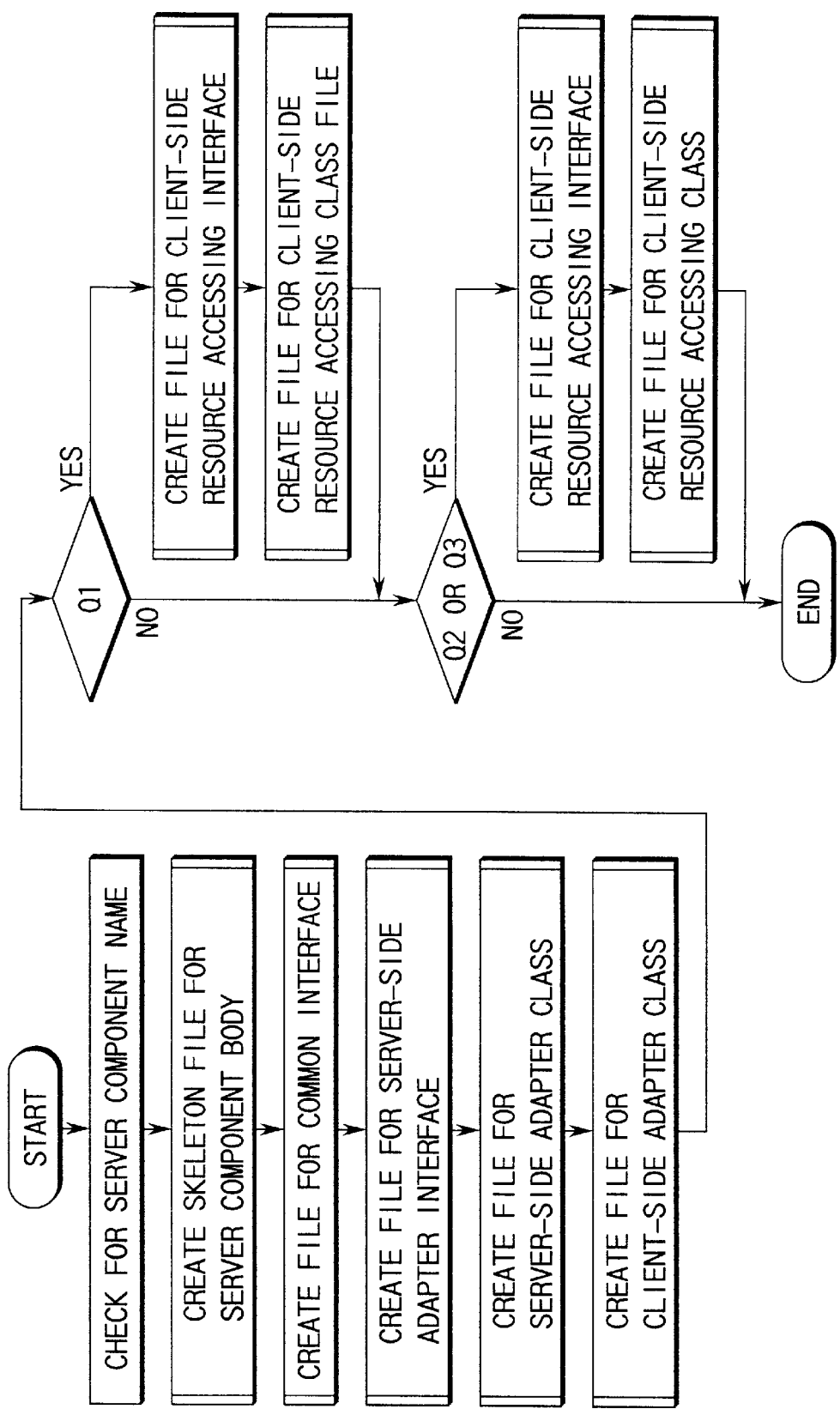
FIG. 29 is a flowchart for the entire process of automatic creation.
Figure 30:
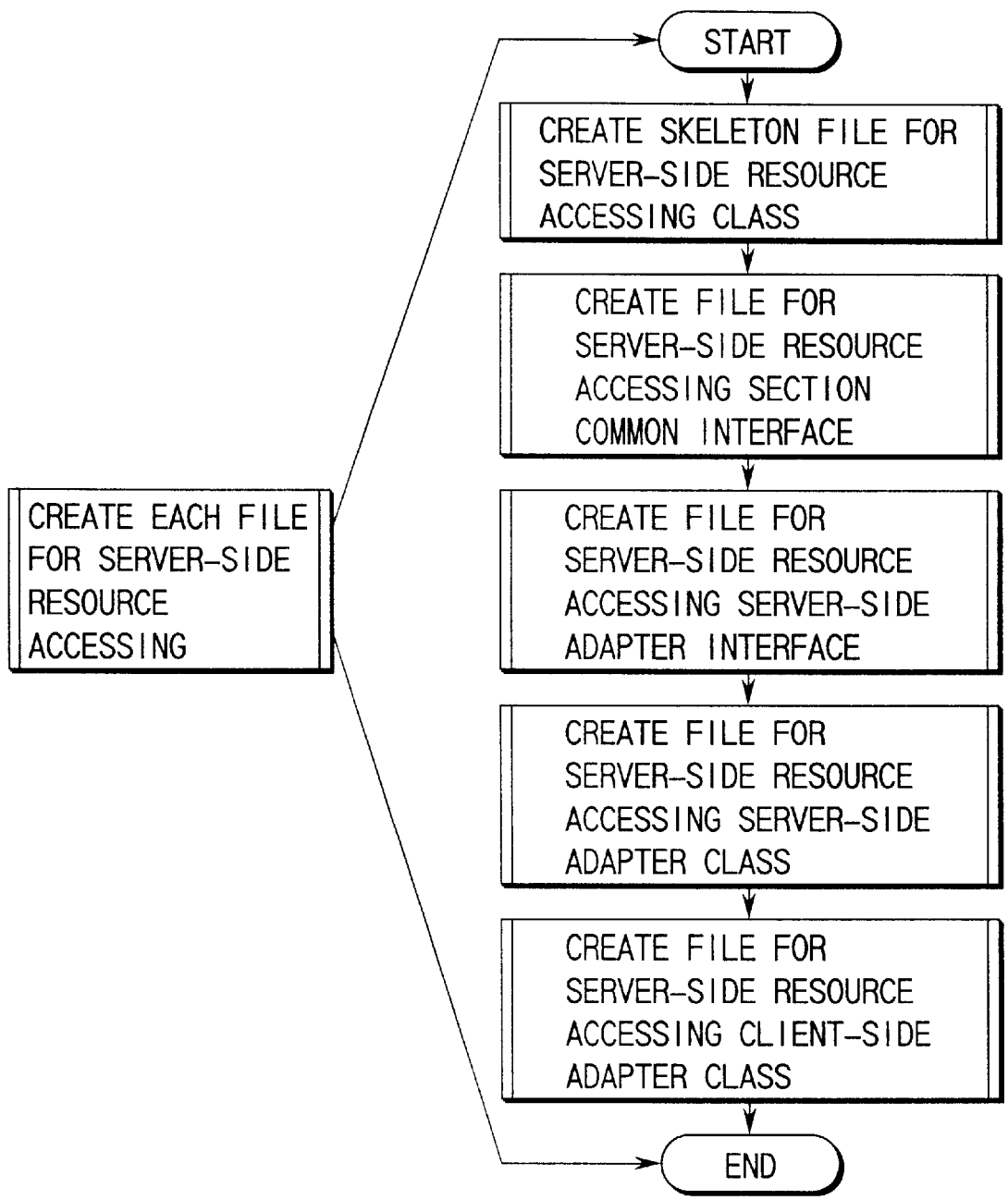
FIG. 30 is a flowchart for the process of creating each file in the server-side resource accessing section.
Figure 31:
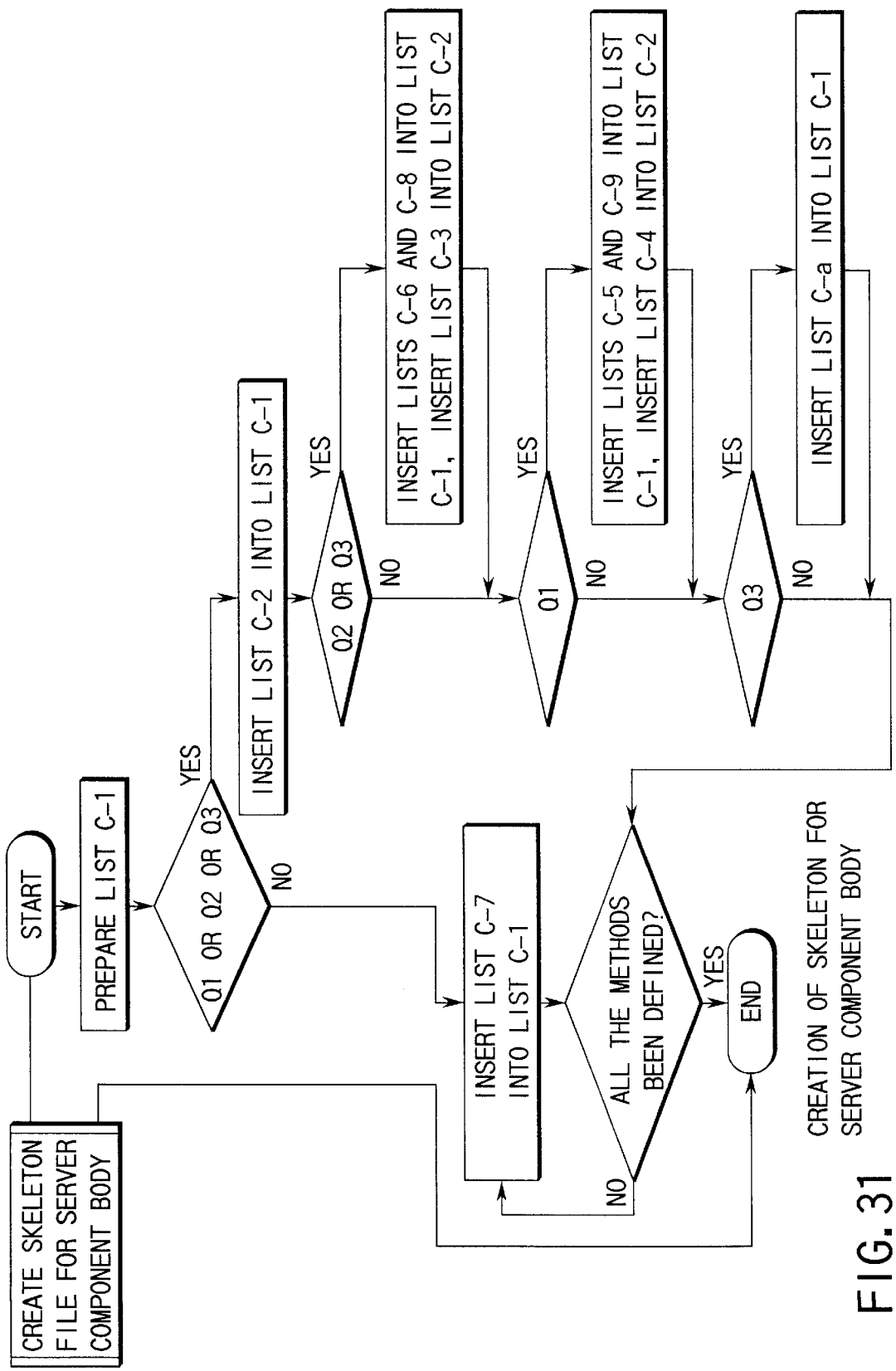
FIG. 31 is a flowchart for the process of creating the skeleton of the server component body.
Figure 32:
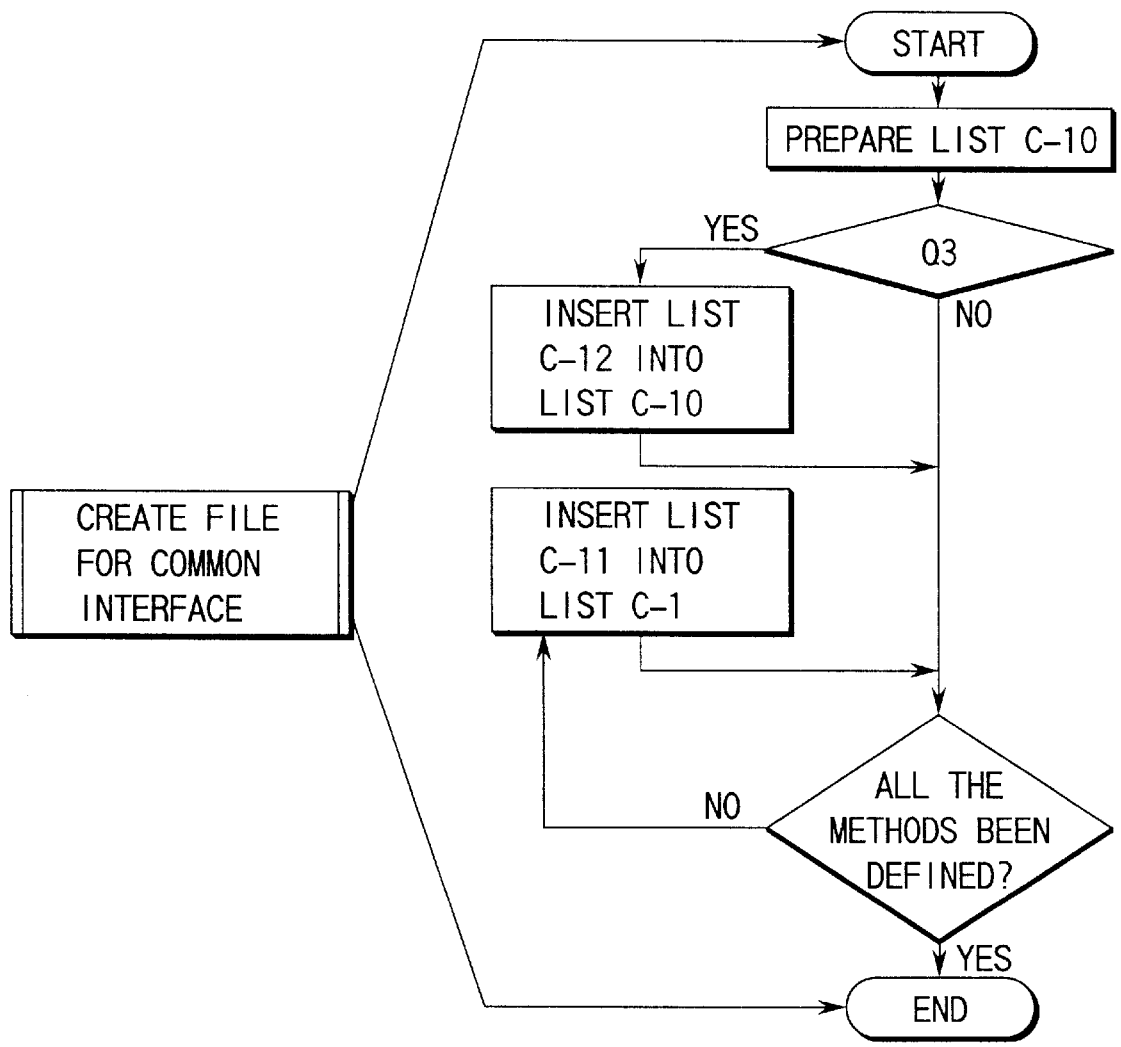
FIG. 32 is a flowchart for automatically creating the common interface.
Figure 33:
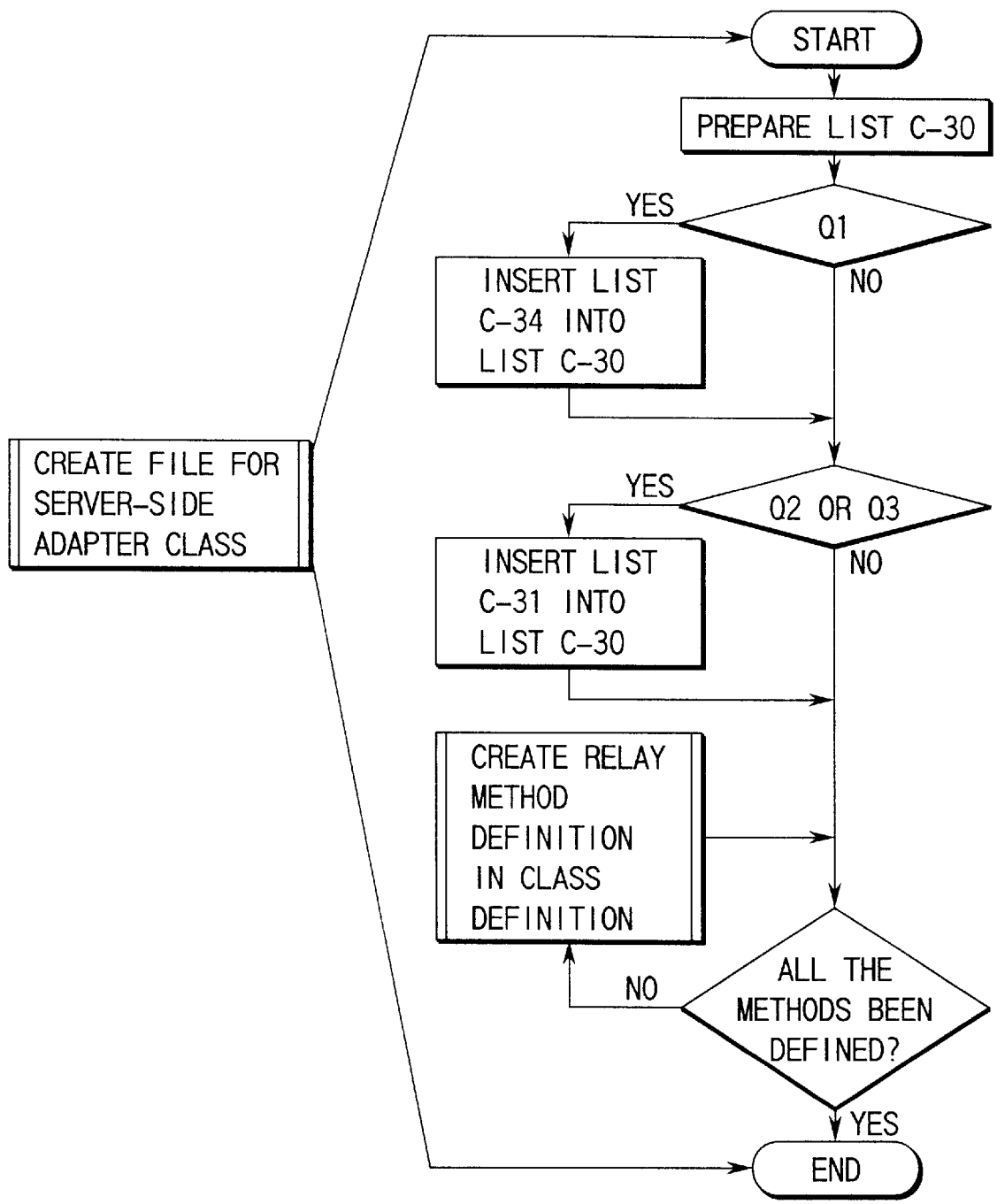
FIG. 33 is a flowchart for automatically creating the server-side adapter class.
Figure 34:
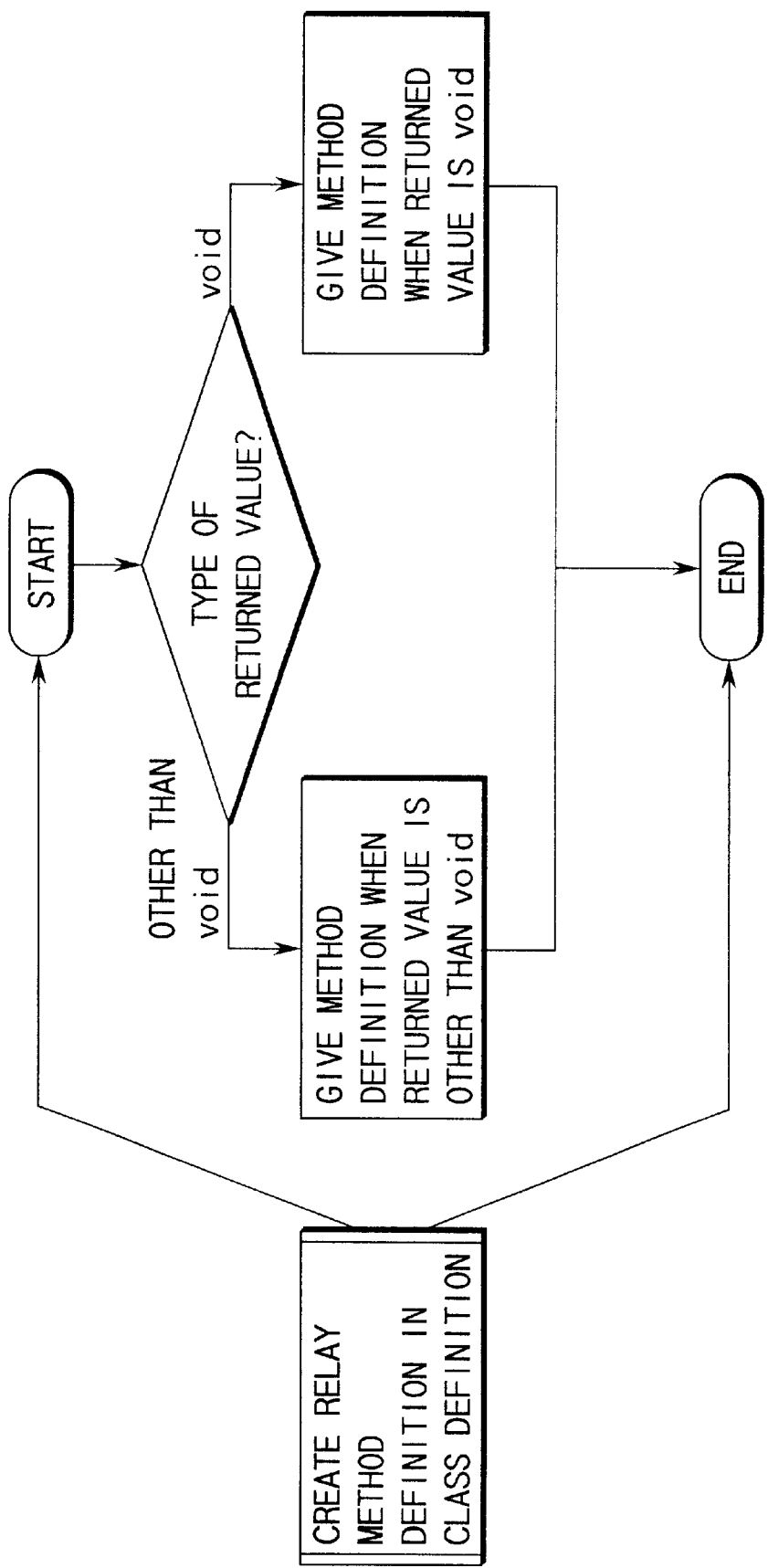
FIG. 34 is a flowchart for the process of creating the relay method definition.
Figure 35:
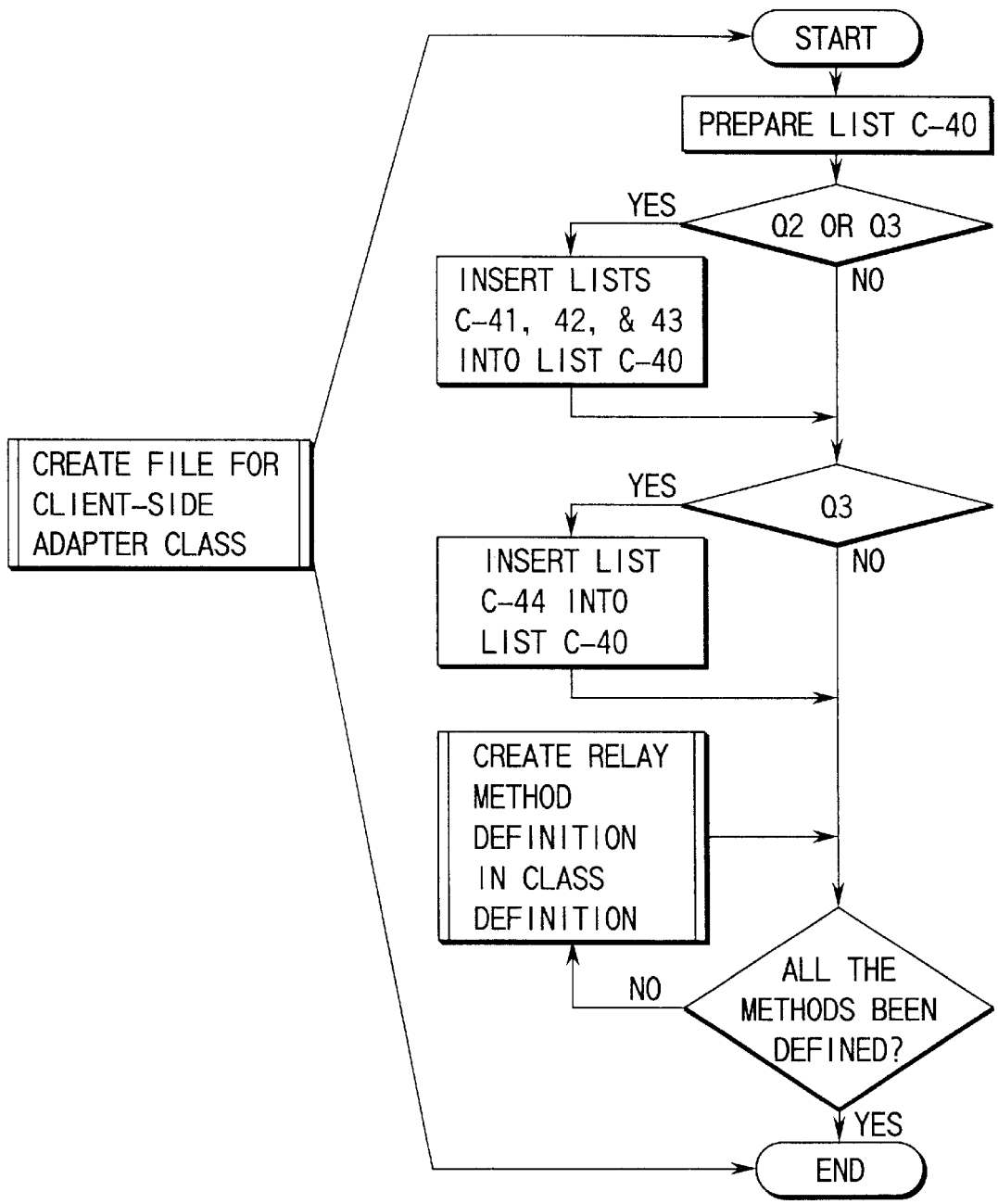
FIG. 35 is a flowchart for the process of automatically creating a client-side adapter file.
Figure 36:
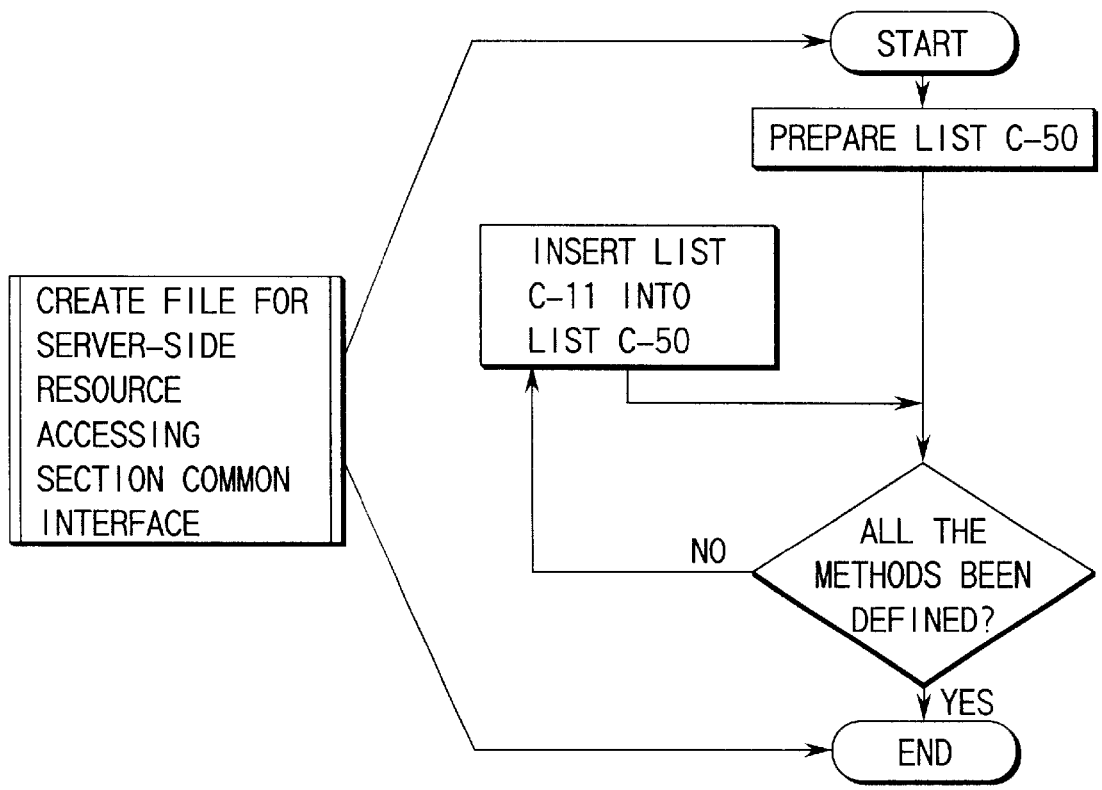
FIG. 36 is a flowchart for the process of automatically creating a common interface file in the server-side resource accessing section.

As shown in FIG. 24, when a skeleton for the server component body 21 is created, LIST LC-1 (the class definition of component body) of FIG. 28 is first called from the template offering section 73. Then, the information in the part [ ] in the template is replaced with the information from the information offering section 72 (step ST51). Next, LIST LC-2 (the method definition of component body) of FIG. 28 is called and information is replaced in a similar manner for all the methods (steps ST52, ST53). When the information has been replaced for all the methods, this means that the skeleton for the server component body 21 has been completed (step ST53).

Next, as shown in FIG. 25, when the common interface is created automatically, LIST LC-3 (the interface definition of common interface) of FIG. 28 is first called and information replacement is carried out (step ST61). Next, LIST LC-4 (the method definition of common interface) of FIG. 28 is first called and information replacement is carried out for all of the methods (steps ST62 and ST63). When information replacement has been completed for all of the methods, this means that the automatic creation of the common interface has been completed (step ST63).

Next, as shown in FIG. 26, when the server-side adapter class is created automatically, LIST LC-5 (the class definition of server-side adapter) of FIG. 28 is first called and information replacement is carried out (step ST71). Next, the LIST for the method definition of server-side adapter (LIST LC-6 (the method definition of server-side adapter when the type of returned value is non-void) or LC-7 (the method definition of the server-side adapter when the type of returned value is void) is called and information replacement is carried out for all of the methods (steps ST72 and ST73). When information replacement has been completed for all of the methods, the automatic creation of the server-side adapter class has been completed (step ST73). The process in step ST72 is described in further detail in FIG. 27. Specifically, the type of returned value is determined from the information from the information offering section 72 (step ST81). When the returned value is a value other than void, LIST LC-6 of FIG. 28 is called and information replacement is carried out (step ST82). When the returned value is void, LIST LC-7 of FIG. 28 is called and information replacement is carried out (step ST83).

As described above, the class file automatic creating section 74 creates files.

Because the creation of the client-side adapter class is the same as the server-side adapter class shown in FIGS. 26 and 27, explanation of it will be omitted.

In the above processes, it is assumed that the server component name is written in capital letter form (the beginning letter of a word is a capital letter and the rest are small letters. When more than one word is concatenated, the words are connected, with the beginning letter of each word being capital, such as Foo or ServerObject) and that the method name and argument name are written in capital letter form starting with a small letter (such as fooMethod). In addition, [server component name (small letters)] means a small-letter representation of all the server component name. [Default value of returned value] is an arbitrary default value of the type.

As described above, the server component automatic creating system according to the seventh embodiment can create the component elements of the server component 5 automatically because the class file automatic creating section 74 combines templates from the template offering section 73 and creates class files using the information from the information offering section 72.

Therefore, even when the server component 5 has a large number of component elements, use of the present invention enables almost all of the component parts to be created automatically, which decreases the burden on the software developer. Consequently, what the developer has to actually program is only the part (body processing content) related to implementing the processes requested from application programs.

Eighth Embodiment

In the seventh embodiment, the class file automatic creation in FIG. 21B, or when the basic server component 5 of FIG. 4 is constructed in Java RMI has been explained. Now, as an eighth embodiment of the present invention, an automatic creation of each element in the server component 5 in FIG. 21C, or when the server component 5 of FIG. 16 is constructed in Java RMI will be explained. For the server component of FIG. 19, too, each component element and class file can be created automatically by using the techniques in the eighth and seventh embodiments.

FIG. 28 is a block diagram showing the configuration of a server component automatic generating system according to the eighth embodiment of the present invention. In FIG. 28, the same parts as those in FIG. 22 are indicated by the same reference symbols and explanation of them will be omitted.

The automatic generating system comprises a development computer 71A, an information offering section 72A, a template offering section 72A, a class file automatic creating section 74A, a class file section 75, a body processing content creating section 76, and a body processing content offering section 77.

The information offering section 72A has the same configuration as in FIG. 22 except that the volume of information offered is increased as a result of the expansion of the server component 5's function.

The template offering section 73A has the same configuration as in FIG. 22 except that the number of templates offered is increased as a result of the expansion of the server component 5's function.

The class file automatic creating section 74A creates twelve class/interfaces shown in FIG. 21C in a similar manner to the class file automatic creating section 74 of FIG. 22. The concrete processes are shown in FIGS. 29 to 36.

An example of twelve class/interfaces automatically created are shown as LIST LL-1 (example of common interface in Java), LL-2 (example of server component body in Java), LL-3 (example of server-side adapter class in Java), LL-4 (example of server-side adapter class RMI interface), LL-5 (example of client-side adapter), LL-6 (example of server-side resource accessing section common interface), LL-7 (example of server-side resource accessing section), LL-8 (example of server-side resource accessing server-side adapter RMI interface), LL-9 (example of server-side resource accessing server-side adapter), LL-10 (example of server-side resource accessing client-side adapter), LL-11 (example of client-side resource accessing section RMI interface), and LL-12 (example of client-side resource accessing section).

```
        LIST LL-1
public interface FooIF {
    //describe method (signature)
    public int fooMethod(char c);
    //option to call back to client's application
    public void setClientApp(FooClient capp);
}
        LIST LL-2
public class Foo extends Object implements FooIF {
    //followings are options when CRA, SRA are included
    CRAFoo cra; //client resource access portion
    SRAFooIF sra; //server resource access portion
    //constructor
    public Foo( ) {
        super( );
        //initialization if necessary
    }
    //initialization to execute at client (option)
    public void prepareLocal(string regName) {
        //option (when CRA is included)
        try {
            cra = new CRAFooImpl(this);//create client resource access portion
        } catch (exception e) {
            //error processing
        }
        //option (when SRA is included)
        sra = new SRACAFoo( ); //create server resource access portion
        //initialization for RMI for server resource access portion
        try {
            Class[ ] cArgs = new Class[1];
            //prepare argument
            cArgs[0] = Class.forName("java.lang. String");
            Method mt =
```

-continued

```
(sra.getClass( )).getDeclaredMethod("prepareRMI",
cArgs);
            //connection method creation
        Object[ ] oArgs = new Object[1];
        oAgrs[0] = new String(regName);
        mt.invoke(sra.oArgs); //start method
        } catch (Exception e) {
            //error processing
        }
    }
        //initialization to execute at server (option)
        public void prepreServer(String regName) {
            //option (when SRA is included)
            sra = new SRAFoo( ); //create server resource
access portion
        }
        //option to call client resource access portion by
main body
        public void SetCRA(CRAFoo craFoo) {
            cra = craFoo;
        }
        //option to call back to client application
        public void setClientApp(FooClient capp) {
            cra.setClientApp(capp);
        }
        //describe implementation of method
        public int fooMethod(char c) {
            : //implementation of processing logic
        }
}
        LIST LL-3
import java.rmi.*;
import java.rmi.server.UnicastRemoteObject;
public class RSAFooImple extends UnicastRemoteObject
implements RSAFoo {
        //having main body to relay method as attribute
        Foo foo;
        //constructor
        public RSAFooImpl( ) throws RemoteException {
            super( );
            //main body creation (held as attribute)
            foo = new Foo( );
        }
        //option to call back to client application
        public void setCRA(CRAFoo craFoo) throws
java.rmi.RemoteException {mcm.setCRA(craFoo);
        }
        //description of relay method
        public int fooMethod(char c) throws RemoteException {
            return foo. fooMethod(c);
        }
}
        LIST LL-4
public interfaceRSAFoo extends java.rmi.Remote {
//option to call back to client application
        public void setCRA(CRAFoo craFoo) throws
java.rmi.RemoteException;
        //list of methods (except constructor) provided by
server component as relay
        //all methods throw RemoteException
int fooMethod(char c) throws java.rmi.RemoteException;
}
        LIST LL-5
import java.rmi.*;
public class RCAFoo extends Object implements FooIF {
        //having RMI server adapter as attribute
        RSAFoo rsa;
        //option when CRA is included
        CRAFoo cra;
        //constructor
        public RCAFoo( ) {
            //initialization
        }
        //connection to RMI server adapter
        //received argument is RMI resistory registration
```

```
name of server object
        public void prepareRMI(String regName) {
            try {
                //option when main body accesses CRA
                cra = new CRAFoo(this);
                //acquisition of server object (casting of
interface type)
                rsa = (RSAFoo)Naming.lookup(regName);
                //option to call back to client application
                rsa.setCRA(cra);
            } catch (Exception e) {
                //error processing
            }
        }
        //option to call back to client application
        public void setClientApp(FooClient capp) {
            cra.setClientApp(capp);
        }
        //description of relay method
        public int fooMethod(char c) {
            try {
                return rsa.fooMethod(c);
            } catch (Exception e) {
                //error processing
            }
        }
}
        LIST LL-6
public interface SRAFooIF {
        //describe method (signature)
        public void accessServerRes( );
}
        LIST LL-7
public class SRAFoo extends Object implements SRAFooIF
{
        //constructor
        public SRAFoo( ) {
            super( );
            //initialization if necessary
        }
        //description of method implementation
        public void accessServerRes( ) {
            //implementation of processing
        }
}
        LIST LL-8
public interface SRASAFoo extends java.rmi.Remote {
        //list of server resource access methods (except
constructor)
        //all methods throw RemoteException
        public void accessServerRes( ) throws
java.rmi.RemoteException;
}
        LIST LL-9
import java.rmi.*;
import java.rmi.server.UnicastRemoteObject;
public class SRASAFooImpl extends UnicastRemoteObject
implements SRASAFoo {
        //having RMI server adapter as attribute
        SRAFoo sra;
        //constructor
        public SRASAFooImpl( ) throws RemoteException {
            super( );
            //main body creation (held as attribute)
            sra = new SRAFoo( );
        }
        //description of relay method
        public String accessServerRes( ) throws
java.rmi.RemoteException {
            return sra.accessServerRes( );
        }
}
        LIST LL-10
import java.rmi.*;
public class SRACAFoo extends Object implements
SRAFooIF {
        //having RMI server adapter as attribute
```

```
                    -continued
SRASAFoo srasa;
    //constructor
    public SRACAFooImpl( ) {
        //initialization (unnecessary at present)
    }
    //connection to RMI server adapter
    public void prepareRMI(String regName) {
        try {
            //acquisition of server object (casting of
interface type)
            srasa = (SRASAFoo)Naming.lookup(regName);
        } catch (Exception e) {
            //error processing
        }
    }
    //description of relay method
    public String accessServerRes( ) {
        try {
            srasa. accessServerRes( );
        } catch (Exception e) {
            //error processing
        }
    }
}
        LIST LL-11
public interface CRAFoo extends java.rmi.Remote {
    //list of server resource access methods (except
constructors)
    public void accessClientRes( ) throws
java.rmi.RemoteException;
    //setting to call back to client application (option)
    public void setClientApp(FooClient capp);
}
        LIST LL-12
import java.rmi
import java.rmi.server.UnicastRemoteObject;
public class CRAFooImpl UnicastRemoteObject implements
CRAFoo {
    FooIF foo; // pointer to main body or RCA
    FooClient cApp; // client application (option)
    //constructor
    public CRAFooImpl(FooIF oooif) throws RemoteException
    {
        //reception of interface type of main body
        ooo = oooif;
        cApp = null; //option
    }
    //setting to call back to client application (option)
    public void setClientApp(FooClient capp) {
        cApp = capp;
    }
    //description of method implementation
    public void accessClientRes( ) throws RemoteException
    {
        //implementation of processing
    }
}
```

The template offering section 73A offers templates (skeletons) represented by the following lists: LIST C-1 shows the class definition of component body, LIST C-2 an execution initialization method on the LIST C-1 client side, LIST C-3 the LIST C-2 client-side resource accessing section creating section, LIST C-4 the LIST C-2 server-side resource accessing section creating section, LIST C-5 an execution initialization method on the C-1 server side, LIST C-6 the C-1 client resource section setting method, LIST C-7 the C-1, C-60, C-b0 method definition, LIST C-8 the C-1 client-side resource accessing section attribute, LIST C-9 the C-1 server-side resource accessing section attribute, LIST C-a the C-1 client application setting method, LIST C-10 the interface definition of common interface, LIST C-11 the C-10 and C-50 method definition, LIST C-12 the C-10 and C-a0 client application setting method, LIST C-20 the server-side adapter RMI interface definition, LIST C-21 the C-20 relay method definition, LIST C-22 the C-20 client resource accessing section setting method, LIST C-30 the class definition of the server-side adapter, LIST C-31 the C-30 client-side resource accessing section setting method, LIST C-32 the relay method definition of the C-30 and C-80 server-side adapter when the type of returned value is non-void, LIST C-33 the relay method definition of the C-30 and C-80 server-side adapter when the type of returned value is void, LIST C-34 the C-30 server initialization, LIST C-40 the class definition of client-side adapter, LIST C-41 the C-40 client-side resource accessing section attribute, LIST C-42 the creation of the C-40 client-side resource accessing section, LIST C-43 the setting section for the C-40 client-side adapter, LIST C-44 the C-40 client application setting section, LIST C-45 the relay method definition of C-40 and C-90 client-side adapters when the type of returned value is non-void, LIST C-46 the relay method definition of C-40 and C-90 client-side adapters when the type of returned value is void, LIST C-50 the server-side resource accessing section common interface definition, LIST C-60 the class definition of server-side resource accessing section, LIST C-70 the RMI interface definition of server-side resource accessing server-side adapter, LIST C-80 the class definition of server-side resource accessing server-side adapter, LIST C-90 the class definition of server-side resource accessing client-side adapter, LIST C-a0 the RMI interface definition of client-side resource accessing section, LIST C-a1 the C-a0 client application setting method, LIST C-b0 the class definition of client-side resource accessing section, LIST C-b1 the C-b0 client application attribute, and LIST C-b2 the C-b0 client application setting method. The list numbers shown in FIGS. 29 to 36 are the list numbers described above.

```
        LIST-C1
public class [component name] extends Object
            implements [component name] IF {
    //<<LIST-C8>>
    //<<LIST-C9>>
    public [component name] {
        super ( );
        //initialization if necessary
    }
    //<<LIST-C2>>
    //<<LIST-C5>>
    //<<LIST-C6>>
    //<<LIST-C7>>
    //<<LIST-Ca>>
}
        LIST-C2
public void prepareLocal(String regName) {
    //<<LIST-C3>>
    //<<LIST-C4>>
}
        LIST-C3
try {
    //create client resource access portion
    cra = new CRA [component name] Imple(this);
} catch (Exception e) {
    //error processing
}
        LIST-C4
//create server resource access portion
sra = new SRACA [component name] ( );
//initialization RMI of server resource access portion
try {
    Class [ ] cArgs = new Class [1];
    cArgs[0] = Class.forName("java.lang.String");
    Method mt =
(sra. getClass( )).getDeclareMethod("prepareRMI", cArgs);
    Object [ ] oArgs = new Object[1];
    oArgs[0] = new String(regName);
    mt.invoke(sra, oArgs);
```

```
} catch (Exception e) {
    //error processing
}
        LIST-C5
public void prepareServer(String regName) {
    sra = new SRA[component name]( );
}
        LIST-C6
public void setCRA(CRA [component name] cra[component
name]) {
    cra = cra[component name];
}
        LIST-C7
public [return value type] [method name] ([argument
type] [argument name], . . .) {
    //processing logic implementation
}
        LIST-C8
CRA[component name] cra;
        LIST-C9
SRA[component name] IF sra;
        LIST-Ca
public void setClientApp([client application type]capp)
{
    cra.setClientApp(capp);
}
        LIST-C10
public interface[component name]IF {
    //<<LIST-C11>>
    //<<LIST-C12>>
}
        LIST-C11
public [return value type] [method name] ([argument
type] [argument name], . . .);
        LIST-C12
public void setClientApp([client application
type]capp);
        LIST-C20
public interface RSA[component name ]extends
java.rmi.Remote {
    //<<LIST-C21>>
    //<<LIST-C22>>
}
        LIST-C21
public[return value type] [method name] ([argument type
1] [argument name 1], . . .)
    throws java.rmi.RemoteException;
        LIST-C22
public void setCRA(CRA[component name]cra[component
name])
    throws java.rmi.RemoteException;
        LIST-C30
import java.rmi.*;
import java.rmi.server.UnicastRemoteObject;
public class RSA[component name]Impl extends
UnicastRemoteObject implements RSA[component name] {
    //having main body for method relay as attribute
    [component name] [component name (small letters)];
    //constructor
    public RSA[component name]Impl( ) throws
RemoteException {
        super ( );
        //initialization if necessary
        [component name (small letters)] = new [component
name] ( );
        //<<LIST-C34>>
    }
    //<<LIST-C31>>
    //<<LIST-C32>>
    //<<LIST-C33>>
}
        LIST-C31
public void setCRA(CRA[component name] cra [component
name])
    throws java.rmi.RemoteException {
    [component name (small letters)].setCRA(cra
[component name]);
}
        LIST-C32
public [return value type] [method name] ([argument type
1] [argument name 1], . . .)
    throws RemoteException {
    return [component name (small letters)].[method
name]([argument name 1], . . .);
}
        LIST-C33
public void [method name] ([argument type 1] [argument
name 1], . . .)
    throws RemoteException {
    [component name (small letters)].[method
name] ([argument name 1], . . .);
}
        LIST-C34
[component name (small letters)].prepareServer(null);
        LIST-C40
import java.rmi.*;
public class RCA[component name]extends Object
implements[component name]IF {
    //having RMI server adapter as attribute
    RSA[component name] [component name (small letters)];
    //<<LIST-C41>>
    //constructor
    public RCA[component name]( ) {
        //initialization
    }
    //connection to RMI server adapter
    public void prepareRMI(String regName) {
        try {
            //<<LIST-C42>>
            //acquisition of server object (casting of
interface type)
            [component name (small letters)] =
(RSA[component name])Naming.lookup(regName);
            //<<LIST-C43>>
        } catch (Exception e) {
        } //error processing
    }
    //<<LIST-C44>>
    //<<LIST-C45>>
    //<<LIST-C46>>
}
        LIST-C41
CRA[component name]cra;
        LIST-C42
cra = new CRA[component name]Impl(this);
        LIST-C43
//set client adapter to main body
[component name (small letters)].setCRA(cra);
        LIST-C44
public void setClientApp([client application type]capp)
{
cra.setClientApp(capp);
}
        LIST-C45
public [return value type] [method name] ([argument type
1] [argument name 1], . . .) {
    try {
        return [component name (small letters)].[method
name]([argument name 1], . . .);
    } catch (Exception e) {
        //exception processing
    }
    return [default value of return value];
}
        LIST-C46
public void [method name] ([argument type 1] [argument
name 1], . . .) {
    try {
        [component name (small letters)].[method name]
([argument name 1], . . .);
    } catch (exception e) {
        //exception processing
    }
}
```

-continued

```
        LIST-C50
public interface SRA[component name]IF {
    //<<LIST-C11>>
}
        LIST-C60
public class SRA[component name]extends Object
        implements [component name]IF {
    //constructor
    public SRA[component name]( ) {
        super( );
        //initialization if necessary
    }
    //<<LIST-C7>>
}
        LIST-C70
public interface SRASA[component name]extends
java.rmi.Remote {
    //list of server resource access methods (except
constructor)
    //<<LIST-C21>>
}
        LIST-C80
import java.rmi.*;
import java.rmi.server.UnicastRemoteObject;
public class SRASA[component name]Impl extends
UnicastRemoteObject
        implements SRASA[component name] {
    //having main body for method relay as attribute
    SRA[component name] [component name (small letters)];
    //constructor
    public SRASA[component name]Impl( ) throws
RemoteException {
        super ( );
        [component name (small letters)] = new
SRA[component name] ( );
    }
    //<<LIST-C32>>
    //<<LIST-C33>>
}
        LIST-C90
import java.rmi.*;
public class SRACA[component name] extends Object
        implements SRA[component name]IF {
    //having RMI server adapter as attribute
    SRASA[component name] [component name (small
letters)];
    //constructor
    public SRACA[component name] ( ) {
        //initialization processing
    }
    //connection to RMI server adapter
    public void prpareRMI(String regName) {
        try {
            //acquisition of server object (casting of
interface type)
            [component name (small letters)] =
                (SRASA[component name])Naming.lookup(regName):
        } catch(Exception e) {
            //error processing
        }
    }
    //<<LIST-C45>>
    //<<LIST-C46>>
}
        LIST-Ca0
public interface CRA[component name] extends
java.rmi.Remote {
    //list of server resource access methods (except
constructor)
    //<<LIST-C21>>
    //<<LIST-Ca1>>
}
        LIST-Ca1
public void setClientApp([client application type]
capp)
        throws java.rmi.RemoteException;
        LIST-Cb0
import java.rmi.*;
import java.rmi.server.UnicastRemoteObject;
```

-continued

```
public class CRA[component name]Imple
UnicastRemoteObject
        implements CRA[component name] {
    //pointer to main body or RCA
    [component name]IF [component name (small letters)];
    //<<LIST-Cb1>>
    //constructor
    public CRA[component name]Impl([ ]IF[component name
(small letters)]if)
        throws RemoteException {
        [component name (small letters)] = [component name
(small letters)]if;
    }
    //<<LIST-C32>>
    //<<LIST-Cb2>>
}
        LIST-Cb1
//client application
[client application type]cApp;
        LIST-Cb2
public void setClientApp([client application type]capp)
{
    cApp = capp;
}
```

Next, the process of automatically creating these twelve class/interfaces will be explained.

When the server component 5 is created, the information offering section 72A gives the following pieces of information to the class file automatic creating section 74A:

1. Server component name
2. Accessing the server-side resource?
3. Accessing the client-side resource?
4. Does the component body call a client application program?
5. Method name (allocated to the above items 1, 2, and 3, if necessary)
   Type of returned value
   Type of argument and argument name.

On the basis of these pieces of information, each class and interface are automatically created by replacing the part enclosed by [ ] in the template (skeleton) of each class and interface with the offered pieces of information or adding an optional section. It is assumed that the server component name is written in capital letter form and that the method name and argument name are written in capital letter form, starting with a small letter. In addition, [server component name (small letters)] means a small-letter representation of all the server component names. [Default value of returned value] is an arbitrary default value of the type.

Specifically, the process of automatically creating classes and interfaces follows the flowcharts of FIGS. 29 to 36 showing the processing of the class file automatic creating section 74A.

In these flowcharts, the server-side adapter RMI interface and the client-side resource accessing section RMI interface resemble the common interface; the server-side resource accessing section and the server-side resource accessing server-side adapter RMI interface resemble the server-side resource accessing common interface; the server-side resource accessing server-side adapter and the client-side resource accessing section resemble the server-side adapter; and the sever-side resource accessing client-side adapter resembles the client-side adapter (the difference in conditions, inserted lists, and insert positions are as described above and later). For this reason, the flowcharts for these parts will be omitted.

In addition, because the flowcharts for the client-side adapter class, each class/interface in the server-side resource accessing section, and each class/interface in the client-side resource accessing section are similar to those for the server-side adapter class, they will be omitted. Moreover, Q1, Q2, and Q3 at branches in the flowcharts mean the following:

Q1: Accessing the server-side resource?
Q2: Accessing the client-side resource?
Q3: Does the component body call a client application program?

Hereinafter, the creation of each component element will be explained in detail.

First, for the source in the server component body 21, LIST C-1 (the class definition of component body) is prepared. Next, when setting is done to one of the optional items 2, 3, 4, LIST C-2 (execution initialization method on the C-1 client side) is inserted in the corresponding place of LIST C-1. The insert position is the place where it reads "//<<LIST C-n>>." In this case, LIST C-n is inserted in the place. Next, in the case of optional item 3 (accessing the client-side resource) or item 4 (the component body calls a client application program), LIST C-3 (C-2 client-side resource accessing section creating section) is inserted in LIST C-2, and LIST C-6 (C-1 client resource section setting method) and LIST-8 (C-1 client-side resource accessing section attribute) are inserted in LIST C-1. In the case of optional item 2 (accessing the server-side resource), LIST C-4 (C-2 server-side resource accessing section creating section) is inserted in LIST C-2 and LIST C-5 (execution initialization method on the C-1 server side) and LIST C-9 (C-1 server-side resource accessing section attribute) are inserted in LIST C-1. Furthermore, in the case of optional item 4, LIST C-a (C-1 client application setting method) is inserted in LIST C-1. Thereafter, as many LIST C-7 (C-1, C-60, C-b0 method definition) as are needed are inserted in LIST C-1.

Next, for the source of the common interface 25, LIST C-10 (the interface definition of common interface) is first prepared. Then, as many LIST C-1 (C-10, C-50 method definition) as are necessary are inserted. In the case of optional item 4, LIST C-1 is inserted in LIST C-10.

Next, for the RMI interface 24a of the server-side adapter 24, LIST C-20 (the RMI interface definition of server-side adapter) is first prepared. Then, as many LIST C-21 (C-20 relay method definition) as are needed are inserted in LIST C-20. In the case of optional item 3 or item 4, LIST C-22 (C-20 client resource accessing section setting method) is inserted in LIST C-20.

Next, for the source of the server-side adapter 24, LIST C-30 (the class definition of the server-side adapter) is first prepared. In the case of optional item 3 or item 4, LIST C-31 (C-30 client-side resource accessing section setting method) and LIST C-34 (C-30 server initialization) are inserted in LIST C-30. Thereafter, as many LIST C-32 (the relay method definition of C-30, C-80 server-side adapters (when the type of returned value is non-void)) as are needed or as many LIST C-33 (the relay method definition of C-30, C-80 server-side adapters (when the type of returned value is void)) as are necessary are inserted in LIST C-30.

Next, for the source of the client-side adapter 22, LIST C-40 (the class definition of the client-side adapter) is first prepared. In the optional item 3 or item 4, LIST C-41 (C-40 client-side resource accessing section attribute), LIST C-42 (the creation of C-40 client-side resource accessing section), and LIST C-43 (setting section for C-40 client-side adapter body) are inserted in LIST C-40. In the case of optional item 4, LIST C-44 (C-40 client application setting section) is inserted in LIST C-40. Thereafter, as many LIST C-45 (the relay method definition of C-40, C-90 client-side adapters (when the type of returned value is non-void)) as are needed or as many LIST C-46 (the relay method definition of C-40, C-90 client-side adapters (when the type of returned value is void)) as are necessary are inserted.

Next, the source of the server-side resource accessing section common interface 58 is created in the case of optional item 2. LIST C-50 (the common interface definition of the server-side resource accessing section) is first prepared. Then, as many LIST C-11 (C-10, C50 method definition) as are needed are inserted in C-50.

Next, the source of the server-side resource accessing section 57 is created in the case of optional item 2. LIST C-60 (the class definition of the server-side resource accessing section) is first prepared. Then, as many LIST C-7 (C-1, C-60, Cb0 method definition) as are needed are inserted in LIST C-60.

Next, the source of the RMI interface 56a of the server-side resource accessing server-side adapter 56 is created in the case of optional item 2. LIST C-70 (the RMI interface definition of the server-side resource accessing server-side adapter) is first prepared. Then, as many LIST C-21 (C-20 relay method definition) as are needed are inserted in LIST C-70.

Next, the source of the server-side resource accessing server-side adapter 56 is created in the case of optional item 2. LIST C-80 (the class definition of the server-side resource accessing server-side adapter) is first prepared. Then, as many LIST C-32 (the relay method definition of C-30, C80 server-side adapters) as are needed and as many LIST C-33 (the relay method definition of C-30, C80 server-side adapters) as are needed are inserted in LIST C-80 (see FIG. 54).

Next, the source of the server-side resource accessing client-side adapter 54 is created in the case of optional item 2. LIST C-90 (the class definition of the server-side resource accessing client-side adapter) is first prepared. Then, as many LIST C-45 (the relay method definition of C-40, C90 client-side adapters) as are needed and as many LIST C-46 (the relay method definition of C-40, C90 client-side adapters) as are needed are inserted in LIST C-90.

Next, the source of the RMI interface 53a of the client-side resource accessing section 53 is created in the case of optional item 3 or item 4. LIST C-a0 (the class definition of the client-side resource accessing client-side adapter) is first prepared. Then, as many LIST C-21 (C-20 relay method definition) as are needed are inserted in LIST C-a0. In the case of optional item 4, LIST C-a1 (C-a0 client application setting method) is inserted in LIST C-a0.

Next, the source of the client-side resource accessing section 53 is created in the item 3 or item 4. LIST C-b0 (the class definition of the client-side resource accessing section) is first prepared. Then, as many LIST C-32 (the delay method definition of C-30, C-80 server-side adapters) as are needed are inserted in LIST C-b0. In the case of optional item 4, LIST C-b1 (C-b0 client application attribute) and C-b2 (C-b0 client application setting method) are inserted in LIST C-a0.

With each class/interface created, the component developer can develop the server component 5 by causing the body content offering section 77 to implement the part in which LIST C-7 (method definition for C-1, C-60, C-b0) has been inserted.

While in the eighth embodiment, programs have been written in the Java language, only minor changes would be required even when CORBA is used for distributed inter-object communication or the C++ language is used.

Ninth Embodiment

With the eighth embodiment, it is possible to construct a distributed system which enables a dynamic system configuration that allows a decision at the time of execution as to whether the execution place of a process should be placed on the server host or the client host. In contrast, Java applets are designed for a static system configuration where the execution place of a process is always on the client host. In the eighth embodiment, however, it is one type of computer that acts as a server that provides a server component. The other computers in the network excluding the computers acting as clients and those acting as servers cannot be used as places (servers) to execute processes. In this connection, an embodiment which enables any computer in the network to allow server process implementation will be explained.

In a ninth embodiment of the present invention, one computer acting as a server host is allowed to deal with the server component from the viewpoints of the maintenance and management of the server component and the alleviation of implementing work.

To execute the server component on another computer (referred to as a sub-server host), the server host delivers the server component for execution. The sub-server host receives the processing component from the server host, makes it executable, and makes the other necessary preparations.

To allow a specific computer resource to access the delivered server component, the server component is composed of a basic section, a client-side resource accessing section, and a server-side resource accessing section.

To decide the execution place, deliver the server component to the place, carry out the process, and thereafter change the execution position, if necessary, there are provided an execution position specifying section and a callback interface for client-side application programs.

Figure 37:
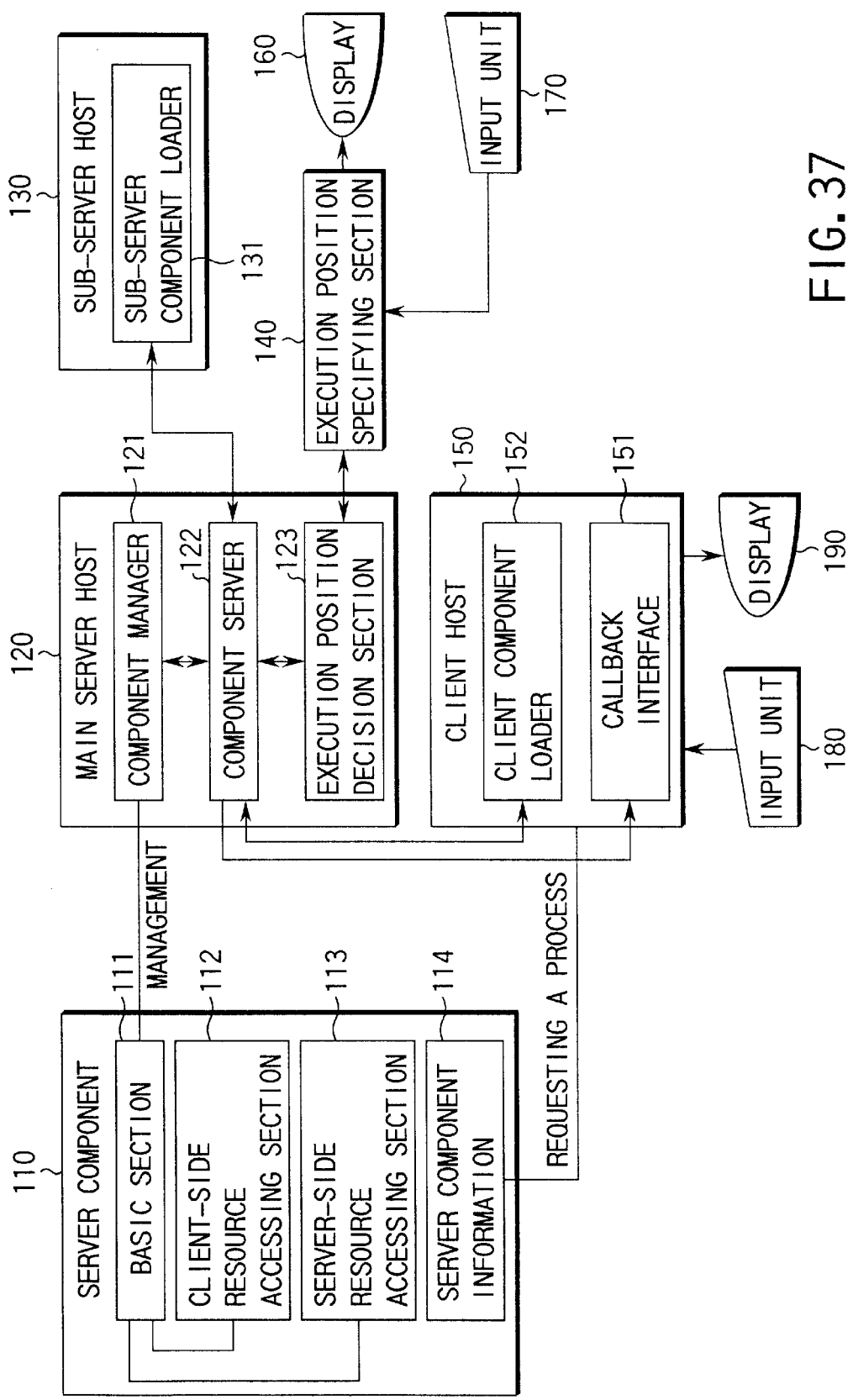
FIG. 37 is a block diagram showing an example of the hardware configuration of a distributed system according to a ninth embodiment of the present invention.

FIG. 37 shows the configuration of a distributed system according to the ninth embodiment of the present invention, including the hardware configuration and software resources.

In this system, a client host 150, a main server host 120, and a sub-server host 130 are connected to each other via a network.

The main server host 120 is connected to a server component 110. The server component 110 is composed of a basic section 111 as shown in FIG. 4, a client-side resource accessing section 112 and a server-side resource accessing section 113 shown in FIGS. 6 and 19, and server component information 114.

The client host 150 is composed of a client component loader 152 and a callback interface 151. An input unit 180 and a display 190 are connected to the client host 150.

The main server host 120 is composed of a component manager 121, a component server 122, and an execution position decision section 123. The component server 122 is connected to the client component loader 152 and the callback interface 151.

The sub-server host 130 has a sub-server component loader 131. The sub-server component loader 131 is connected to the component server 122.

An execution position specifying section 140 to which the input unit 170 and display 160 are connected is connected to the execution position decision section 123.

The application user operates the client host 150 using the input unit 180 and display 190. The client host 150 requests the server component that carries out the process corresponding to the user's request from the main server host 120. Specifically, the client component loader 152 in the client host 150 requests the server component 110 from the component server 122 in the main server host 120. At that time, the component loader 152 hands over a callback interface 118 to the component server 122.

The component sever 122 requests the server component 110 specified by the component manager 121 and receives it. In addition, the component server 122 causes the execution position decision section 123 to decide the computer that is to execute the specified server component 110.

When the main server host 120 executes the server component 110, the component server 122 makes the basic section 112 of the server component 110 executable (or creates its instance) and makes preparations, including initialization.

When the sub-server host 130 executes the server component 110, the component server 122 delivers the basic section 112 of the server component 110 to the sub-server component loader 131. The sub-server component loader 131 receives the necessary class from the component server 122, creates its instance, and makes preparations, including initialization.

When the client host 150 executes the server component 110, the component server 122 delivers the basic section 112 of the server component 110 to the client component loader 152 of the client host 150. The client component loader 152 receives the necessary class from the component server 122, creates its instance, and makes preparations, including initialization.

The client host 150 connects to the basic section 112 of the server component 110 instance-created in one of the above cases, by way of the network or in process and executes the process making use of the basic section.

When the server component 110 has the client-side resource accessing section 112, the component server 122 delivers it to the client component loader 152 of the client host 150. The client component loader 152 creates its instance and sets it in the basic section 112 of the server component 110. When server component 110 has the server-side resource accessing section 113, the server-side resource accessing section 113 is delivered to the sub-server component loader 131 of the sub-server host 130 on the "computer that executes the server-side resource accessing section 113" written in the server component information 114. The sub-server component loader 131 creates its instance and sets it in the basic section 112 of the server component 110. When the main server host 120 runs the server-side resource accessing section 113, the component server 122 creates its instance and sets it in the basic section 112 of the server component 110.

To decide (specify) the execution position, the system manager gives an instruction to the execution position specifying section 140 via the input unit 170 and display 160. The execution position specifying section 140 conveys the system manager's instruction to the execution position decision section 123. The execution position decision section 123 judges the execution position on the basis of the information in a subsequent execution position judgment. After having decided the execution position requested by the component server 122, the execution position decision section 123 also informs the execution position specifying section 140 of the decision. On the basis of the information, the execution position specifying section 140 displays the server component 110 currently being executed and its execution position on the display 160.

On the basis of the information, the system manager can specify the next execution position via the input unit 170 for the component now being executed. After the execution position specifying section 140 has conveyed information on "the next execution position" specified by the system manager to the execution position decision section 123, the execution position decision section 123 notifies the component server 122 of the information and carries out the process of relocating the server component 110. Specifically, the server component 110 now being executed is ended temporarily. The server component 110 is delivered to the newly specified place, which creates its instance. Then, using the callback interface 118, the component server 122 tells the client host 150 that the server component 110 has been relocated and specifies the new place. On the basis of the information, the client host 150 carries out an initializing process of the new server component 110, such as reconnection.

As described above, in addition to the effects of the first to eighth embodiments, the ninth embodiment enables server processing programs to run not only on any computer in the network but also on a specific computer.

Tenth Embodiment

Figure 38:
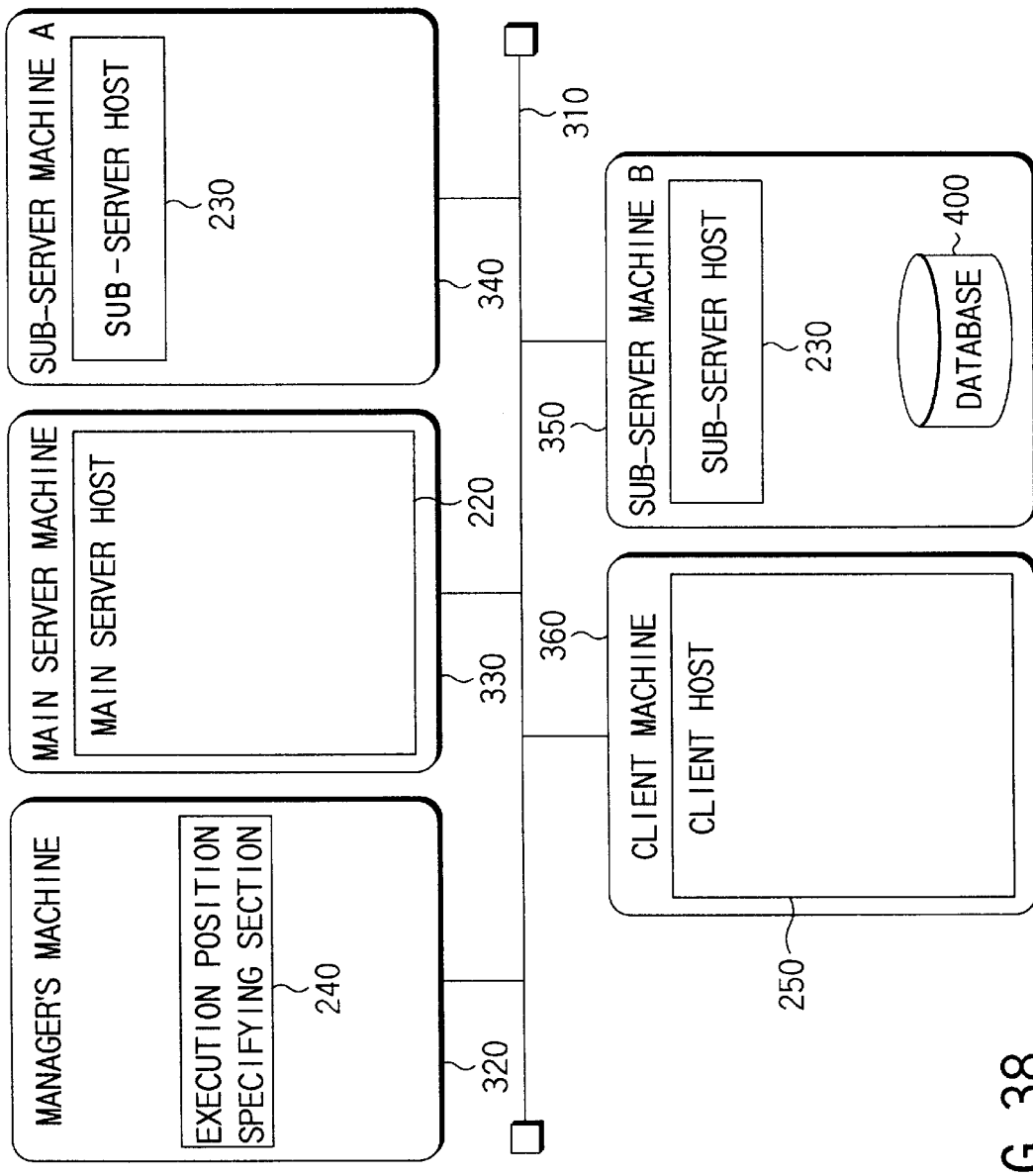
FIG. 38 is a block diagram showing an example of the physical configuration of a distributed system according to a tenth embodiment of the present invention.
Figure 39:
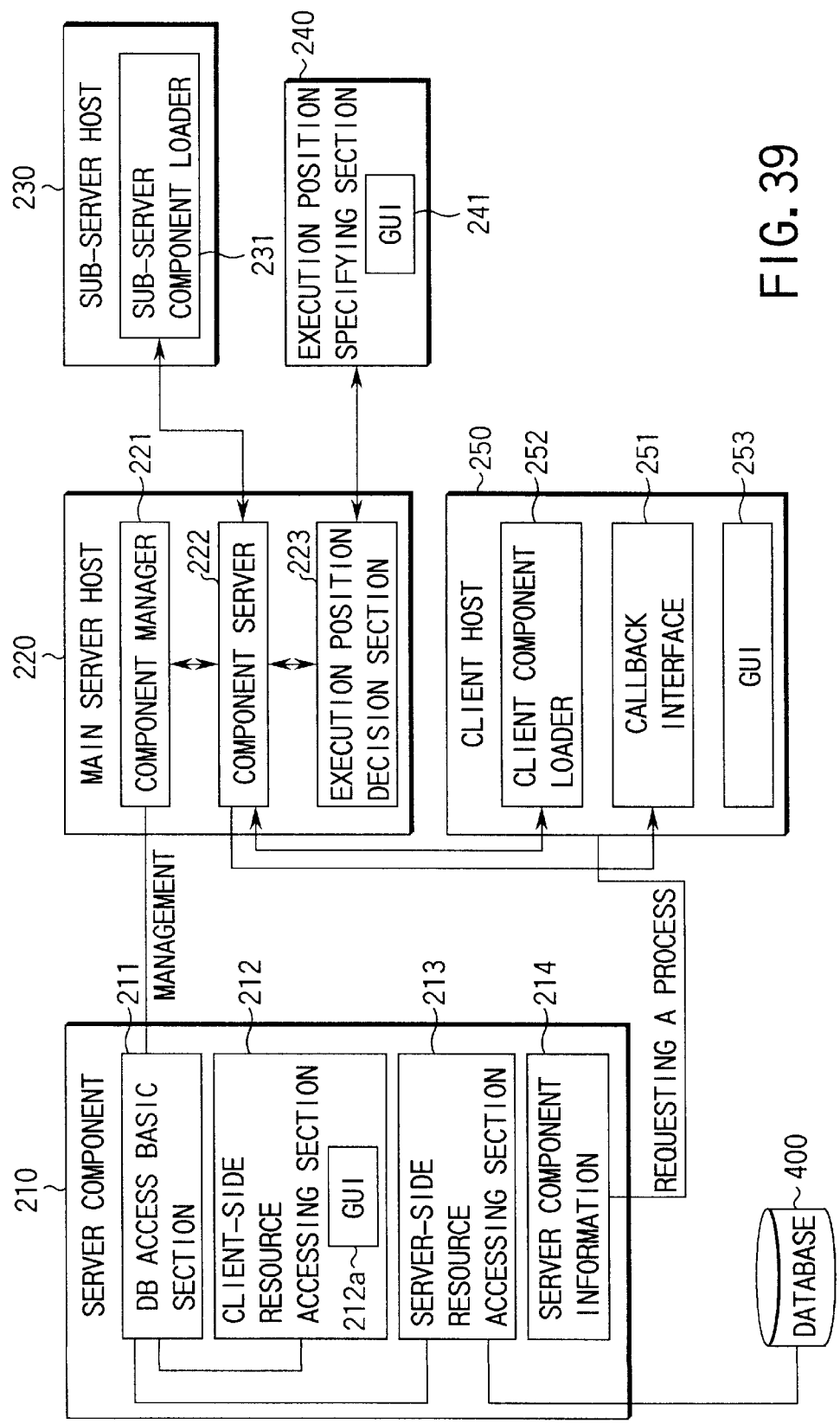
FIG. 39 is a block diagram showing an example of the logical configuration of the distributed system according to the tenth embodiment.

FIG. 38 is a block diagram showing an example of the physical configuration of a distributed system according to a tenth embodiment of the present invention. FIG. 39 is a block diagram showing an example of the logical configuration of the tenth embodiment. An application program that accesses a database and carries out a simple process is taken as example.

As shown in FIG. 38, in the distributed system according to the tenth embodiment, a main server host 120 is implemented in a main server machine 330 connected to a network 310, a sub-server host 230 in a sub-server machine (A) 340, a sub-server host 230 and a database 400 in a sub-server machine (B) 350, an execution position specifying section 240 in a manager machine 320, and a database accessing client server host 250 in a client machine 360. Here, the word implement means incorporating a program into a computer and making preparations for execution.

As shown in FIG. 39, the distributed system comprises a database accessing server component 210, a main server host 220, a sub-server host 230, an execution position specifying section 240, a database accessing client server host 250, and a database 400. The server component 210 is composed of a database (DB) accessing basic section 211, a client-side resource accessing section 212, a server-side resource accessing section 213, and server component information 214. The client-side resource accessing section 212 includes GUI 212a. The client-side resource accessing section 212 and server-side resource accessing section 213 are not necessarily provided. They may be omitted under certain conditions.

One example of the server component information 214 is shown in FIG. 40. The server component information 214 includes the component name, the execution position of the server-side resource accessing section, the presence or absence of the client-side resource accessing section.

The main server host 220 is composed of a component manager 221, a component server host 222, and an execution position decision section 223.

The server host 230 includes a sub-server component loader 231.

The execution position display section 240 includes GUI 241.

The database accessing client server host 250 is composed of a client component loader 252, a callback interface 253, and GUI 250.

The operation of the distributed system constructed as described above will be explained in terms of the decision, arrangement, and execution of the server component 210 and the relocation after execution, following the sequence through which the database accessing application program of FIG. 39 is executed. The database accessing application program taken as example is assumed to be such an application program as accesses a simple sales management database as shown in FIG. 41 and displays the total amount of money spent for purchase about a specific customer.

FIG. 42 shows GUI 253 for the client server host 250 in the application program.

Figure 43:
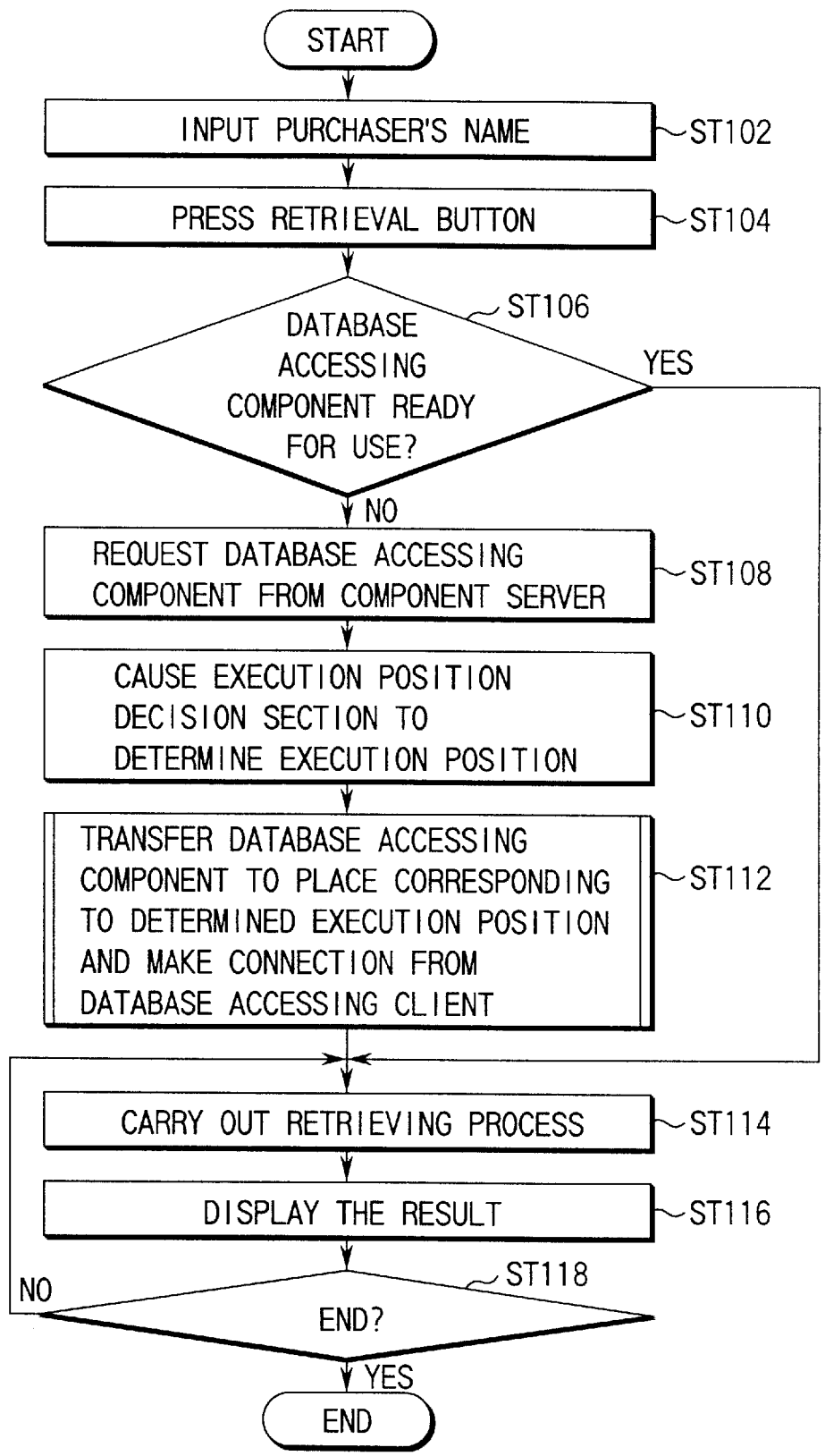
FIG. 43 is a flowchart for the entire operation of the tenth embodiment.

FIG. 43 shows the flow for the determination, arrangement, execution, and relocation of the execution position of the server component 210 in the tenth embodiment. In execution position decision, for the user of the application program to access the database, the client server host 250 requests the server component 210 from the main server host 220 and the execution position decision section 223 judges the execution position. Arrangement includes the delivery of the server component 210 according to the determined execution position, instance creation, preparation, and connection to the client server host 250. Execution is the process of actually accessing the database. Relocation is rearrangement after the manager has executed the server component 210. The database accessing application program is illustrative and not restrictive. The present invention is applicable to any type of application program.

(1) [Execution position decision] the flow up to requesting the server component 210

The user of the database application program first enters the name of the customer that he wants to retrieve into a customer name input section 610 (step ST102). Then, he presses a retrieval button 506 (step ST104). The client server host 250 checks to see if the server component 210 is ready for use (step ST106). If it is ready for use, the client host will carry out processes including retrieval using the server component (step ST114) and display the result (step ST16).

If it is not ready for use, the client server host 250 will request the server component 210 from the component server host 222 (step ST108). The component server host 222 asks the execution position decision section 223 to determine the execution position of the server component 210 the client server host 250 has requested from the component server host 220 (step ST110).

(2) [Arrangement] the flow from when the execution position decision has been completed until the server component 210 has become usable The flow from when the execution position decision has been completed until the server component 210 has become usable will be described by reference to FIGS. 44A and 44B. FIG. 45 shows an example of the server component information 214 the server component 210 has during the process. In the server component information 214, the server component 210 is stored as the component name, the sub-server machine (B) 350 as the execution place of the server-side resource accessing section, and presence as the presence or absence of the client-side resource accessing section.

To determine the execution position of the server component 210 requested, the component server host 222 refers to the server component information 214 in the server component 210 via the component manager 221 and checks to see if the computer that runs the DB accessing basic section 211 has been specified. The information is optional and therefore may be absent. In the tenth embodiment, it is not particularly specified.

Next, the component server asks the execution position decision section 223 for the execution position. In this embodiment, it is assumed to be the sub-server machine (A) 340. When the execution position of the server component basic section (database accessing basic section 211) is specified in the server component information 214 and the specified place differs from the result of the decision by the execution position decision section 223, the system can decide whether the former or the latter should be the execution place. For example, the system may give priority to the server component information 214.

Figure 44A:
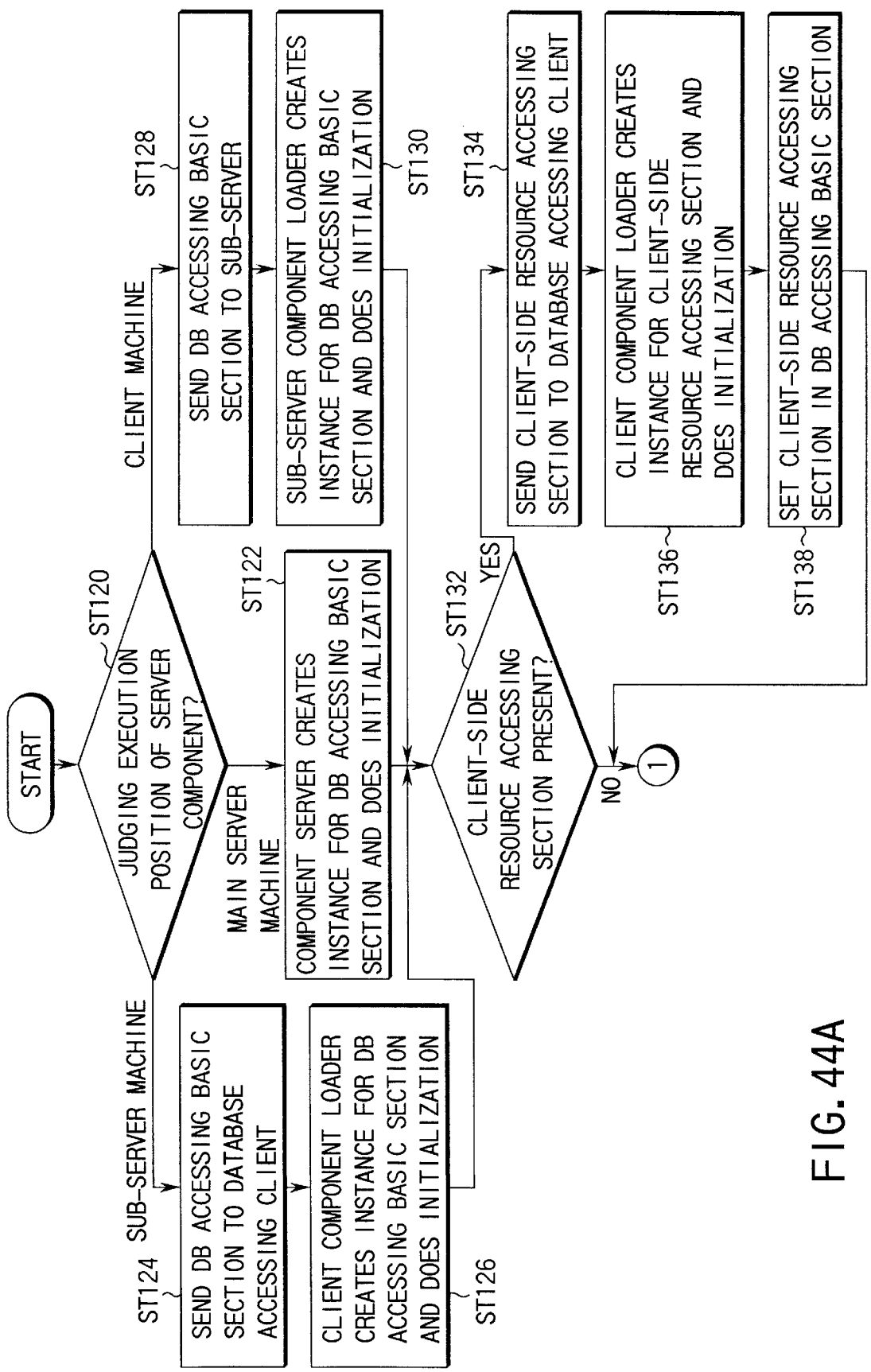
FIGS. 44A and 44B show a flowchart for the operation in dynamically allocating the server component.
Figure 44B:
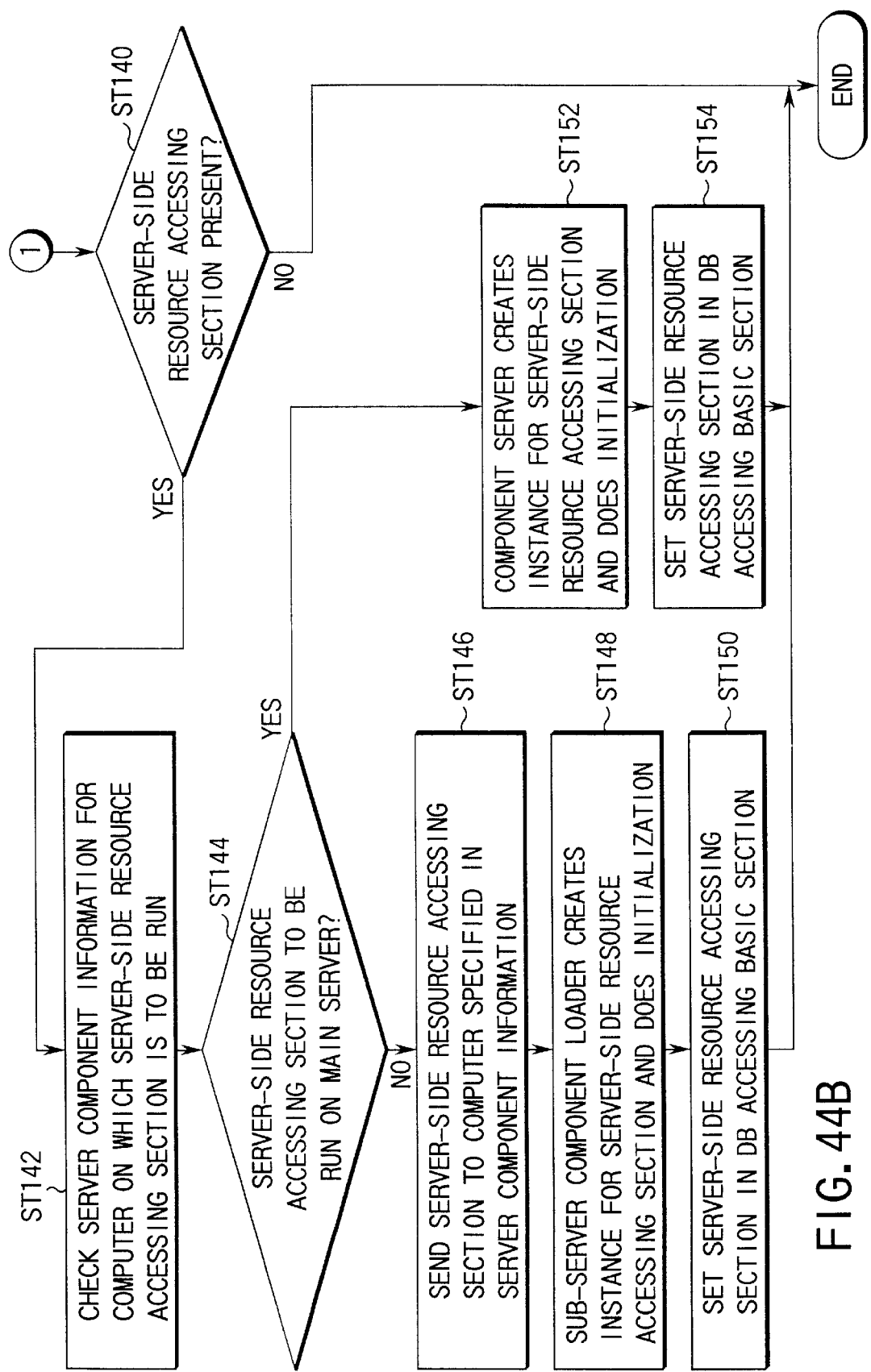
Figures 45, 46:
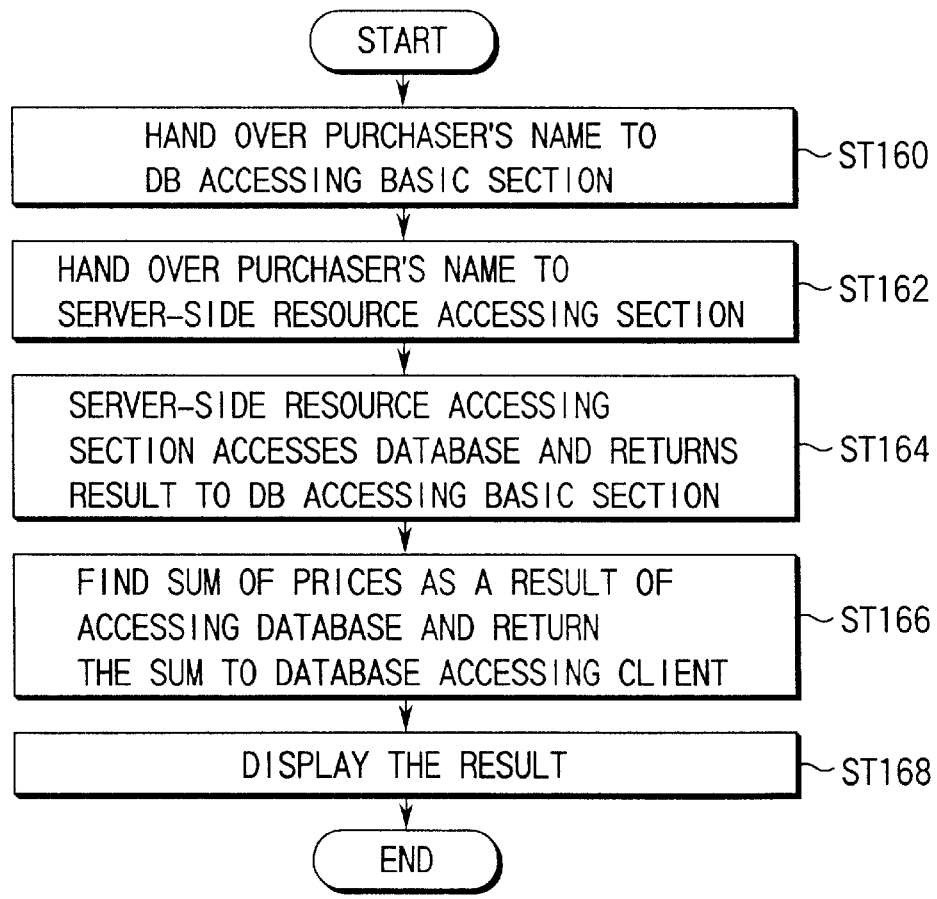
FIG. 45 shows an example of the server component information in dynamically allocating the server component.
FIG. 46 is a flowchart for the operation in accessing the database.

In FIGS. 44A and 44B, because the result of judging the execution position of the server component 210 (step ST120) has shown that the execution position of the DB accessing basic section 211 is the server host 230, the component server host 222 receives the DB accessing basic section 211 from the component manager 221 and delivers it to the sub-server component loader 231 of the sub-server machine (A) 340 (step ST124). The sub-server component loader 231 creates an instance for the received DB accessing basic section 211 and does initialization (makes preparations to set an initial value and to receive the connection from the client server host 250) (step ST126). Then, the component server host 222 informs the client component loader 252 that it has run the requested server component 210 on the sub-server machine (A) 340. On the basis of the information, the client server host 250 connects to the DB access basic section 211 running on the sub-server machine (A) 340.

Because it is known from the server component information 214 that the server component 210 has the client-side resource accessing section 212 (step ST132), the component server host 222 sends the client-side resource accessing section 212 to the client component loader 252 of the client server host 250 (step ST134). The client component loader 252 creates an instance for the received client-side resource accessing section 212 and make initialization (step S136). Then, the loader 252 sets it in the DB accessing basic section 211 being executed on the sub-server machine (A) 340 (step ST138).

Similarly, because the server component information 214 specifies "the execution place of the server-side resource accessing section 213," it is known that the server component 210 also has the server-side resource accessing section 213 (step ST140). Therefore, the component server host 222 checks the server component information 214 for the computer on which the server-side resource accessing section 213 should be run (step ST142). If "the execution place of the server-side resource accessing section 213" has not been specified, this means that the server component 210 does not have the server-side resource accessing section 213. In this example, because the server-side resource accessing section 213 is run on the sub-server host 230, the component server host 222 sends the server-side resource accessing section 213 to the sub-server component loader 231 of the sub-server host 230 (step ST146). Receiving the server-side resource accessing section 213, the sub-server component loader 231 creates its instance and does initialization (step ST148). Then, the loader 231 sets it in the DB accessing basic section 211 being executed on the sub-server machine (A) 340.

Following the above flow, all the system configuration necessary for database accessing in the tenth embodiment (the client-server relationship) have been completed.

(3) [Execution] Flow of the process of actually accessing the database

Although not directly related to the present invention, database accessing in the tenth embodiment will be described by reference to FIG. 46.

The client server host 250 sends the purchaser's name entered into a purchaser's name input section to the DB accessing basic section 211 (step ST160). The DB accessing basic section 211 hands over the purchaser's name to the server-side resource accessing section 213 and instructs it to access the database (step ST162). The server-side resource accessing section 213 acquires data items including the handed-over purchaser's name from the database and returns the results to the DB accessing basic section 211 (step ST164). The DB accessing basic section 211 sums the resulting prices and returns the total value to the client server host 250 (step ST166). Receiving the result, the client server host 250 displays the result on the total purchase price display section of the GUI (step ST168).

(4) [Relocation] Relocation after the manager has executed the server component 210

When the component server host 222 creates an instance for the DB accessing basic section 211 or delivers the basic section 211 to another component loader, it informs the execution position decision section 223 of the corresponding server component 210 (DB accessing basic section 211) and the place in which the component has been executed. The execution position decision section 223 holds these pieces of information in list form, informs the execution position specifying section 240 of them, and displays them using GUI. The GUI in the tenth embodiment is shown in FIG. 47.

Figure 48:
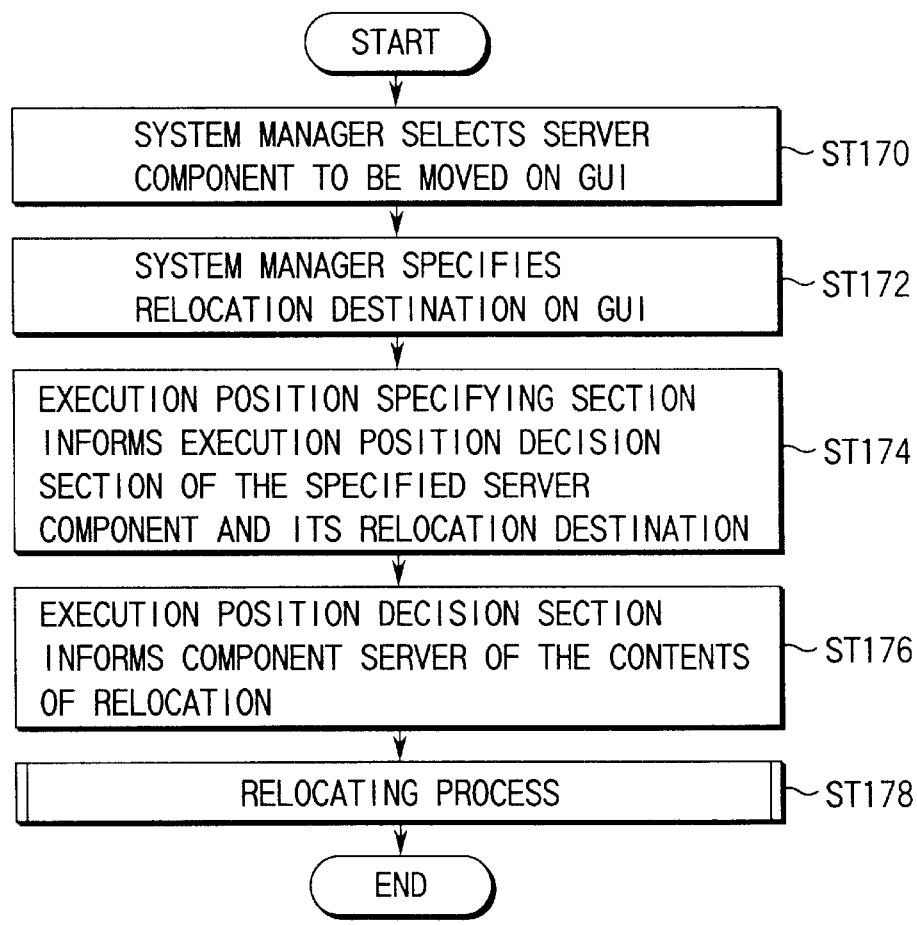
FIG. 48 is a flowchart for the entire process of reallocation.

The operation of GUI will be described by reference to the flowchart of FIG. 48.

Figure 47:
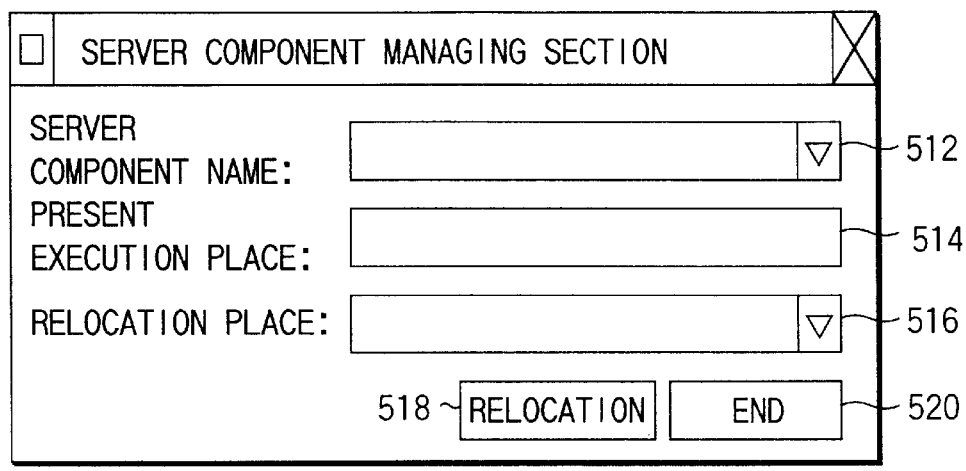
FIG. 47 shows an example of GUI for the component manager.

To display information on the server component 210 now being executed and held in the execution position decision section 233 as shown in FIG. 47, the GUI has a server component name display section, a present execution place display section, a relocation place specifying section, a relocation execute button, and an end button. Each of the server component name display section and relocation place specifying section provides a pull-down menu. When the button to the right of each section is pressed, a list of choices appears. The system manager selects from the display. When the manager specifies the server component 210 on the server component name display section, the place in which the selected server component 210 is running appears on the present execution place display section (step ST170). This information is stored in the execution position decision section 223.

Next, the system manger specifies the main server host 220 machine as a place of relocation on the relocation place specifying section of GUI (step ST172). Data on the choices for relocation place is stored in the execution position decision section 223. In the tenth embodiment, the main server machine 330, sub-server machine (A) 340, sub-server machine (B) 230, and client machine 360 are to be selected. These data items are acquired through data exchange between the main server host 220, sub-server host 230, and client server host 250 at the system start-up. For example, when being started up, the main server host 220 searches for a sub-server host 230 in the network and informs the execution position decision section 223 of the found sub-server host. When being started up, the sub-server host 230 communicates with the main server host 220 and informs the execution position decision section 223 via the component of its start-up. When requesting the server component 210 from the main server host 220, the client server host 250 informs the execution position decision section 223 via the component server host 222 of the request.

When the system manager presses the relocation button, the execution position specifying section sends the specified server component 210 and information on the relocation place (main server host 220) to the execution position decision section 223 (step ST174). The execution position decision section 223 notifies the component server host 222 of the contents (step ST176) and starts the relocating process (step ST178).

Figure 49A:
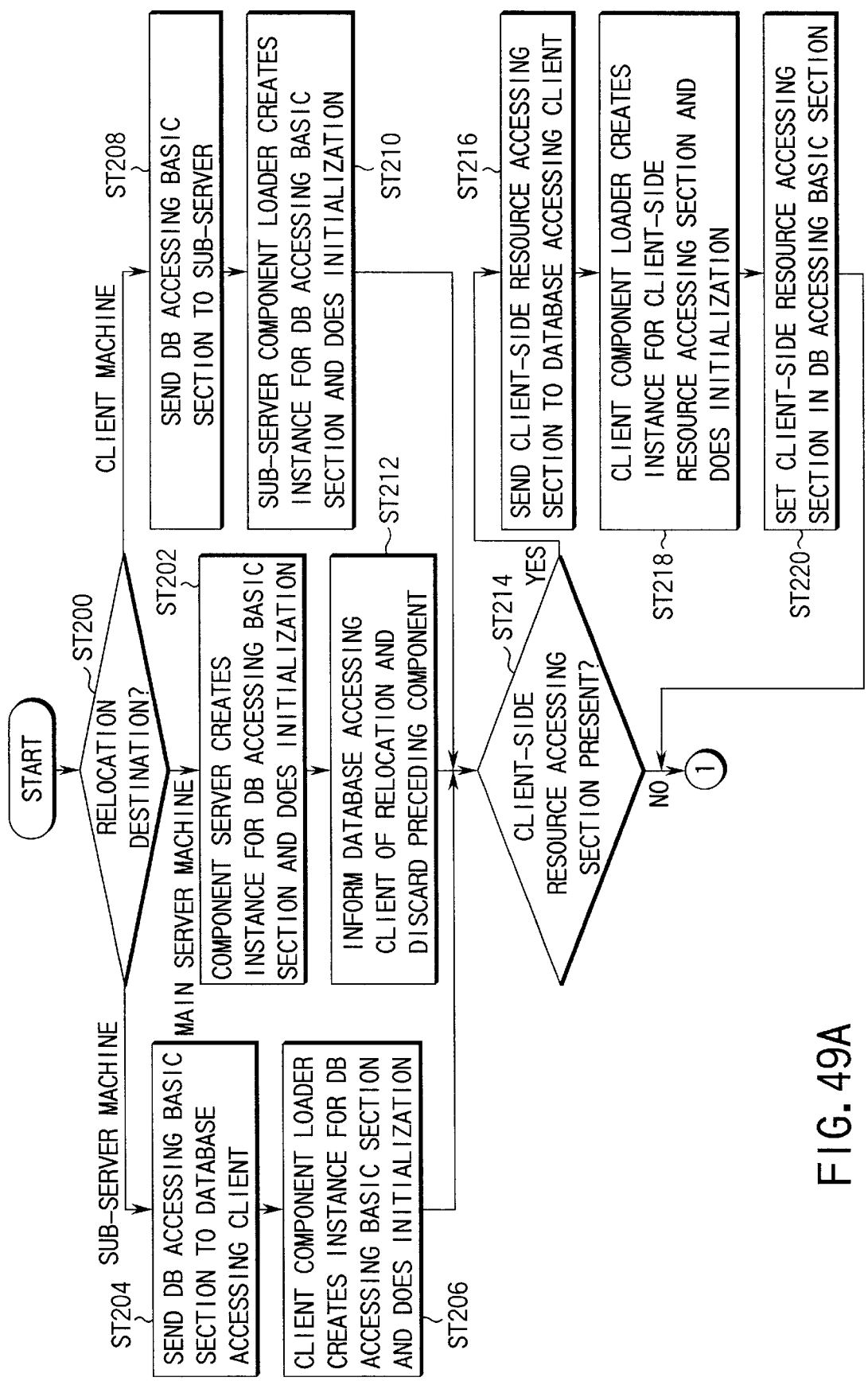
FIGS. 49A and 49B show a detailed flowchart for the reallocating process in FIG. 48.
Figure 49B:
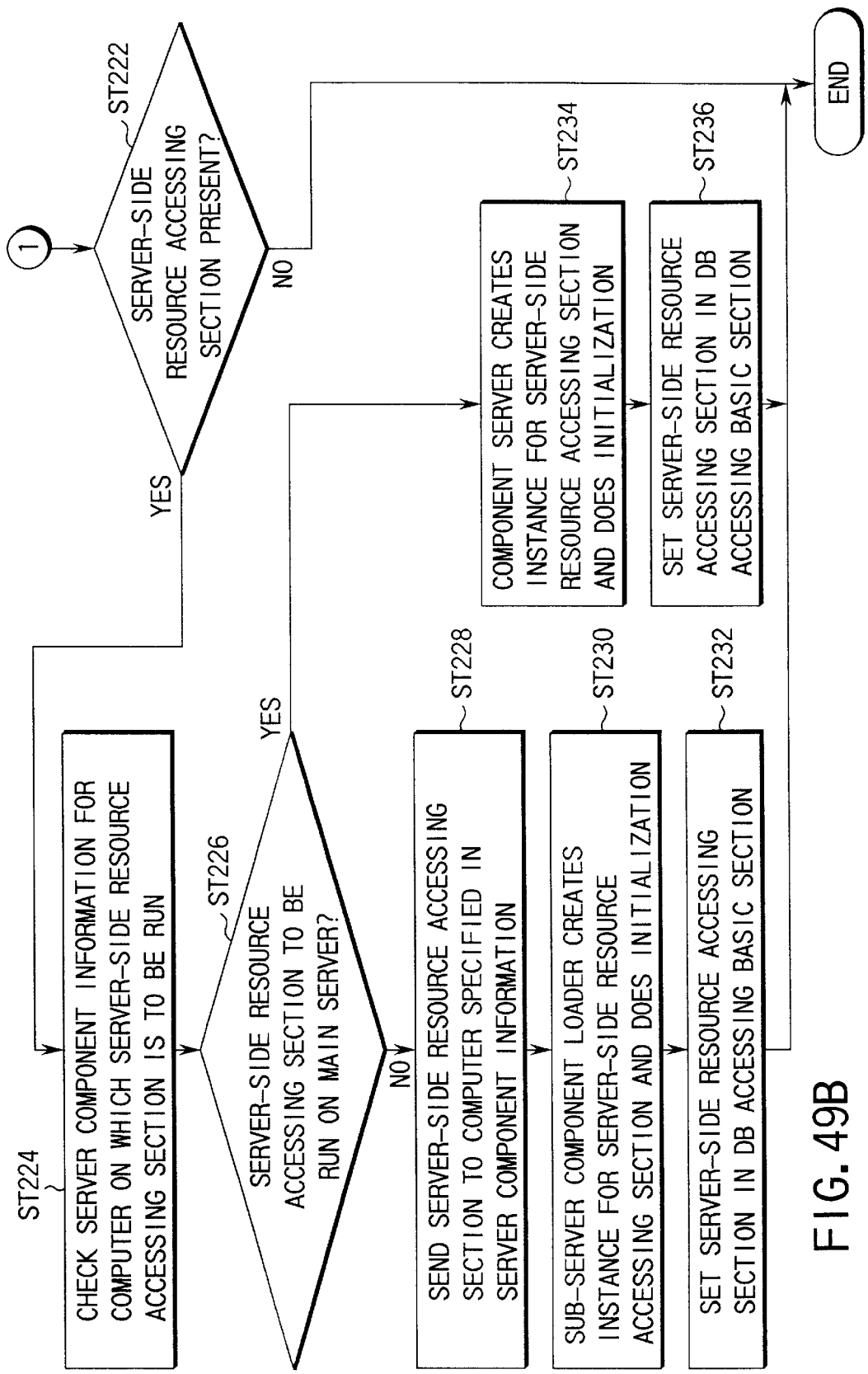

FIGS. 49A and 49B show is a flowchart for a case where the system manager displaces the server component 210 from the sub-server machine (A) 340 to the main server machine 330. Basically, the flowchart is almost the same as the process explained in item (2) "the flow from when the execution position decision has been completed until the server component 210 has become usable." Therefore, the process will be described briefly.

Because the relocation place is the main machine, the component server host 222 creates an instance for the DB access basic section 211 and does initialization (step ST204). The occurrence of relocation is notified to the client server host 250 and the server component 210 that has been in operation until now is discarded (step ST212). When what is discarded is another sub-server host 230 or client, a message to discard it is sent. The side that has received the message discards it.

Since the server component 210 has the client-side resource accessing section 212, it make preparations (steps ST214 to ST220). Similarly, since the server component 210 has the server-side resource accessing section 213, it makes preparation (steps ST222 to ST232).

This completes the relocation.

After the relocation has been completed, the database accessing process described in item (3) can be resumed.

In addition to the effects of the first to ninth embodiments, the tenth embodiment can change (relocate) the execution position of the server process executed.

The present invention is not restricted to the above-described embodiments and may be practiced or embodied in still other ways without departing from the spirit or essential character thereof. For instance, the techniques described in the embodiments may be stored in a recording medium, such as a magnetic disk (e.g., a floppy disk or a hard disk), an optical disk (e.g., CD-ROM or DVD), or semiconductor memory, in the form of programs executable on a computer and be distributed through a communication medium. The programs stored on the recording medium includes a setting program that enables executable software means (including not only executable programs but also tables and data structures) to be constructed within the computer. The computer realizing this system reads the programs recorded on the recording medium, constructs software means using the setting program, if necessary, and executes the aforementioned processes under the control of the software means.

Next, applications of the distributed system of the present invention will be explained.

(Application 1)

An distributed system of the present invention can be applied to an image processing application program.

In an image processing application program, the amount of transferred data (including arguments and returned values) for processing is enormous but the processing itself includes many simple repetitions, which often enables the size of the server component body to be decreased. As a result, the execution position is changed in the image processing application program so that the processing result may be obtained faster, depending on the computing capability of the client host and sever host and the state of the network. Thus, applying the present system to the image processing application program improves the throughput.

One of the concrete applications of the system to a server component is the process of smoothing images as described in the embodiments.

(Application 2)

A distributed system of the present invention can be applied to component business in a mobile environment.

In the distribution of components, use of networks has been considered to be one of the most effective means. When the distributed system is used as an infrastructure, an effective component sales system can be constructed.

In such usage, the system can be considered applicable to the Internet connection at ordinary homes through a mobile environment or a public communication network rather than to a constantly connected network environment, such as a LAN.

The user (the client host 1) connects to a component provider that provides components and purchases the necessary components. At that time, in the case of a user who wants to try the component before buying it, the server component body is allowed to run on only the server host 2. Restrictions are placed on the number of uses and the using time, if necessary. The restricting mechanism is provided on the client-side adapter 22, for example. Then, when the user has decided to buy the component, the server component body is downloaded into the client host 1 so that it may be stored in a local disk on the client host 1.

Since the component developer can develop server components without taking into account in what situation it is used, the burden on the component developer is almost the same as in developing conventional components, even when the component developer uses the system as described above, in parallel with the aforementioned automatic creating technique.

In such usage, what corresponds to the server component includes not only executable processes but also various types of data. For example, the offering of new map components in a strategic simulation game, news components (the headline is sent to a client and the text is treated as the component body), released new song components (what is sent to a client is only part of the song or a low-sound-quality version of the song (roughly sampled version)) can be considered.

The sale of news components is taken as example. In a news component selling system, the client-side adapter 22 provides only simple pieces of information, such as headlines or summaries. Then, the component body 21 provides the detailed contents of news and photographs. With the system, the server-side adapter 24 almost does not need to operate. For example, when pieces of information in the server component body, such as part of the audio information, is accessed by the client-side adapter 22, the serve-side adapter 24 has to operate.

When the user tries the desired news component from the client host 150, he can see only simple contents he can refer to via the client-side adapter 22. At the time when he actually buys the component and downloads it at hand, he is allowed to refer to detailed information.

Furthermore, combining the above-described technique with software delivery, such as PUSH techniques, provides a wide variety of services.

(Application 3)

The present distributed system can be applied to a distributed component development system.

In the development of applications and components supposed to be used via a network, they are considered to be developed efficiently by using the distributed system as an infrastructure.

For example, the component developer registers components in the system on condition that those of β version should be run on only the server host 2. Because the β version can be executed on only the server host 2, it is easy to collect error logs and the client host 1 is relatively safe. Of course, users of clients capable of carrying out β tests can be limited. The finished components can be distributed as ordinary components by just changing the condition (condition that components of the β version should be executable on only the server host 2). This eliminates the need of creating special stubs at the test stage or others, which makes the system effective in terms of development efficiency.

(Application 4)

The present distributed system can be applied to the development of a system capable of absorbing the difference in an execution environment.

In the constantly advancing language environment, such as Java, there is a possibility that API will be added or modified depending on the difference in version or differ from one execution environment to another. The present system is considered to be effective in absorbing the difference in execution environment.

For example, it is assumed that, when a server host, a first client host, and a second client host are connected to a network, the first client host supports all the Java API and the second client host does not support the Java expanded API.

In a case where the processing component requested by the user requires a certain expanded API, when the first client issues a request for a process, any of the client and server hosts can execute the expanded API. Therefore, the process can be executed on the host with the lower load, for example. When the second client issues the request, the client host cannot execute the process. Therefore, the process is always caused to be executed on the server host.

By doing this, the process can be executed flexibly even when there is a difference in the execution environment. This enables the present system to be used effectively even in a limited execution environment used in a built-in microcomputer system.

(Application 5)

Application of the present invention to an ordinary DB system decreases network traffic.

When usual business application programs are considered, there are a lot of server hosts and client hosts constituting a database, and the physical configuration of the network takes various forms.

For example, consider a case where a LAN is composed of two segments, a component server that provides server components is on a second segment of the LAN, a provided component is a processing component that accesses a specific DB, and a client uses it.

In this case, for example, the first client on the first segment requests a component for accessing a DB server on the first segment, executing it on the first client on the first segment is better than executing the component on the component server on the second segment from the viewpoint of network traffic.

Usually, when this type of distributed application system is constructed, such a physical configuration is taken into consideration at the stage of designing the overall system. It is difficult, however, to cope with frequent addition and deletion of client hosts and DB to modify the network configuration. Constructing a distributed application system on the basis of the present client system makes it possible to cope with the modification of the network configuration by just changing the execution position of the component. This enables the optimum distributed system to be used continuously.

As described above, with the distributed system of the present invention, the following is possible in a network environment where two or more computers are connected:

(1) Because a server manages the process execution body and determines its execution position, the execution position of the executable process can be modified dynamically and the system configuration be changed flexibly.

(2) Because the server component developer has only to implement processing logic or the server-side process in only one place (server host), he or she not only need not develop executable processes running on the client host and those running on the server host separately, but also decreases the burden of maintaining and managing the processing logic and implementing programs.

(3) Because the server component is composed of the basic section, client-side resource accessing section, and server-side resource accessing section, this enables a specific computer resource to access the server component.

(4) There are sub-servers in addition to the main server. When a component is executed on a sub-server, the main server delivers a server component to a sub-server. Receiving the component, the sub-server makes it executable.

(5) The execution position is determined. A server component is delivered to the determined position, where the component is executed. Thereafter, the execution position can be further changed (relocated).

The present invention is not restricted to the above-described embodiments and may be practiced or embodied in still other ways without departing from the spirit or essential character thereof. For example, although each of the above embodiments has been explained independently, two or more of them may be combined suitably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed system comprising a client and a server, wherein said client comprises an application basic part that issues a request for a process, and said server comprises management means that manages a server component for executing the process requested by said application basic part, network monitor means for detecting a performance of the distributed system, execution position decision means that receives the request from said application basic part and decides whether the server component should be executed on said client or said server based on a detected performance of the distributed system, and server component handover means that obtains the server component and hands over the obtained server component to said client or said server according to a result of decision at said execution position decision means, wherein the network monitor means acquires at least one of load information about said server and said client, information on the processing capability of said server and said client, a data transfer speed of a network connecting said server and said client, size information about said server component, and information on an amount of calculation at said server component, and offers the acquired information to said execution position decision means, and wherein said execution position decision means determines the execution position of said server component based on the information offered by said network monitor means.

2. The distributed system according to claim 1, wherein said server comprises access control monitoring means that judges whether or not to accept the request for a process issued by the application basic part, based on user information about said client or identification information in said application basic part, and said execution position decision means decides whether or not said server component should be executed based on a result of judgment at said access control monitoring means.

3. The distributed system according to claim 1, wherein said server component comprises a server component body in which the requested process has been implemented, a client-side adapter that communicates with said server, a server-side adapter that communicates with said client, and a common interface that defines an interface between said server component body and said client-side adapter.

4. The distributed system according to claim 1, wherein said server component comprises a client resource accessing section that accesses a client resource, a server resource accessing section that accesses a server resource, a server resource accessing client-side adapter and a server resource accessing server-side adapter that for communicating with the server resource accessing section when the server component body is executed on said client.

5. The distributed system according to claim 1, wherein said server component comprises a client resource accessing section that accesses a client resource, a server resource accessing section that accesses a server resource, a server resource accessing client-side adapter and a server resource accessing server-side adapter that are for communicating with the server resource accessing section when the server component body is executed on said client, and a client resource accessing client-side adapter and a client resource accessing server-side adapter that are for communicating with the client resource accessing section when the server component body is executed on said server.

6. The distributed system according to claim 1, in which the executed position decision means decides whether the server component should be executed on said client or said server in order to improve a throughput.

7. The distributed system according to claim 1, in which the execution position decision means decides whether the server component should be executed on said client or said server in order to minimize an amount of data transferred between the client and the server.

8. A server component creating device which creates a server component used in a distributed system comprising:
   a client including an application basic part that issues a request for a process, and
   a server including management means that manages a server component for executing the process requested by said application basis part, execution position decision means that receives the request from said application basis part and decides whether a server component for executing the process should be executed on said client or said server, and server component handover means that obtains the server component for executing the process requested by said application basis part and hands over the obtained server component to said client or said server according to a result of decision at said execution position decision means, the server component creating device comprising:
   template offering means that offers templates for the server component;
   information offering means that offers information on said server component; and
   program creating means that creates a server component by combining said templates and/or applying said information to the templates.

9. A distributed system comprising computers connected to each other, the system comprising:
   a client; and
   a main server which determines an arbitrary computer before execution as an execution position of a process requested by the client, obtains a server component for executing the process from management means for managing the server component for executing the process, hands over the acquired server component to a determined computer, receives a result of processing from the determined computer, and hands over the result to the main server.

10. The distributed system according to claim 9, wherein said main server comprises means that determines the execution position temporarily and changes the execution position of the server component being executed on the determined computer to another computer.

11. A computer-readable recording medium on which a program for controlling a distributed system comprising a client and a server is recorded, said program comprising:
   a management program code that manages a server component for executing the process requested by an application basic part of said client;
   a network monitor code that acquires at least one of load information about said server and said client, information on the processing capability of said server and said client, a data transfer speed of a network connecting said server and said client, size information about said server component, and information on an amount of calculation at said server component;
   an execution position decision program code that receives the request from said application basic part and decides whether said server component should be executed on said client or said server based on the information acquired by the network monitor code; and
   a server component handover program code that obtains said server component from said management program code and hands over the obtained server component to said client or said server according to a result of decision at said execution position decision program code.

12. A computer-readable recording medium on which a program for controlling a distributed system comprising a client and a server and capable of dynamically changing the decision whether the process requested by an application basic part on said client should be executed on said client or said server is recorded, said program comprising:
   a management program code that manages a server component for executing the process requested by the application basic part on said client;
   a network monitor code that acquires at least one of load information about said server and said client, information on the processing capability of said server and said client, a data transfer speed of a network connecting said server and said client, size information about said server component, and information on an amount of calculation at said server component;
   a server component program code that enables the process requested by the application basic part on said client to be executed on both of said client and said server based on the information acquired by the network monitor code; and
   a communicating program code that is for securing communication with said application basic part when the server component program code is executed on said server.

13. A method of determining the execution position of a server component for executing a process requested by a client host in a distributed system comprising a client host and a server host, wherein the client host requests a desired server component, a component loader for the client host checks whether the server component requested has already been loaded into a component cache of the client host, if the server component has not been loaded yet, the request of the specified server component is transmitted to the component server for the server host and simultaneously client host information, including a load average of the client host, a remaining amount of memory, and enable/disable of swap, is notified to the component server, the component server acquires server host information and information on a network connecting said client host and said server host, and not only notifies the acquired server host information and network information to the execution position decision section but also asks the execution position decision section whether the specified server component should be executed on the client host or the server host, and the execution position decision section acquires not only information on both of the hosts handed over from the component server but also server component information about the specified server component, and decides based on these pieces of information whether the specified server component should be run on the client host or the server host.

14. The method according to claim 13, wherein said execution position decision section calculates the processing time necessary for each of the cases where the server component is executed on the client host and where the server component is executed on the server host and decides that the component should be executed on the host with the shorter processing time.

15. The method according to claim 13, wherein when said execution position decision section has decided that the server component should be executed on the client host, the component server reads the server component specified by a storage unit and sends the server component to the component loader that has issued the request, the component loader creates an executable server component object from the obtained server component and hands over its pointer to a client application basic part, and the client application basic part executes the specified process by using the handed-over server component.

16. The method according to claim 13, wherein when said execution position decision section has decided that the server component should be executed on the server host, the component server receives the client-side adapter of the specified server component and the server component and creates an executable server component object from the server component on the server host, the component server creates an object for the server-side adapter to enable distributed interobject communication, the component server sends the client-side adapter as a server component to the component loader that has issued the request, the component loader creates an executable stub object for the received client-side adapter, the component loader hands over the pointer of the created stub object to the client application basic part, and the client application basic part accesses the created remote server component on the server host via the stub object of the client-side adapter and executes the process.

* * * * *

UNITED STATES PATENT AND TRADEMARK OFFICE
CERTIFICATE OF CORRECTION

PATENT NO. : 6,678,715 B1
DATED : January 13, 2004
INVENTOR(S) : Ando

It is certified that error appears in the above-identified patent and that said Letters Patent is hereby corrected as shown below:

<u>Column 51,</u>
Line 20, change "that for" to -- that are for --.
Lines 50, 52 and 57, change "basis" to -- basic --.

Signed and Sealed this

Thirteenth Day of April, 2004

JON W. DUDAS
*Acting Director of the United States Patent and Trademark Office*